US011068475B2

(12) United States Patent
Boutros et al.

(10) Patent No.: US 11,068,475 B2
(45) Date of Patent: Jul. 20, 2021

(54) COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS

(71) Applicants: Joseph Boutros, Austin, TX (US); Sharon Brener, Austin, TX (US); Alexander John Zelenak, Austin, TX (US); Robert Thomas Grochowicz, Austin, TX (US); Mark Joseph DiMarco, Austin, TX (US); Bryon Kristen Jacob, Austin, TX (US); David Lee Griffith, Austin, TX (US); Shad William Reynolds, Austin, TX (US)

(72) Inventors: Joseph Boutros, Austin, TX (US); Sharon Brener, Austin, TX (US); Alexander John Zelenak, Austin, TX (US); Robert Thomas Grochowicz, Austin, TX (US); Mark Joseph DiMarco, Austin, TX (US); Bryon Kristen Jacob, Austin, TX (US); David Lee Griffith, Austin, TX (US); Shad William Reynolds, Austin, TX (US)

(73) Assignee: data.world, Inc., Austin, TX (US)

( * ) Notice: Subject to any disclaimer, the term of this patent is extended or adjusted under 35 U.S.C. 154(b) by 461 days.

(21) Appl. No.: 15/985,702

(22) Filed: May 22, 2018

(65) Prior Publication Data

US 2019/0121807 A1   Apr. 25, 2019

Related U.S. Application Data

(63) Continuation-in-part of application No. 15/186,514, filed on Jun. 19, 2016, now Pat. No. 10,102,258, and
(Continued)

(51) Int. Cl.
*G06F 16/242* (2019.01)
*G06F 16/901* (2019.01)
(Continued)

(52) U.S. Cl.
CPC ........ *G06F 16/2428* (2019.01); *G06F 16/248* (2019.01); *G06F 16/258* (2019.01); *G06F 16/9024* (2019.01); *G06F 21/6218* (2013.01)

(58) Field of Classification Search
None
See application file for complete search history.

(56) References Cited

U.S. PATENT DOCUMENTS 6,144,962 A    11/2000  Weinberg et al.
6,317,752 B1   11/2001  Lee et al.
(Continued)

FOREIGN PATENT DOCUMENTS

CA        2820994 A1    1/2014
CN      103425734 B     6/2017
(Continued)

OTHER PUBLICATIONS

Angles, R., Gutierrez. C., "The Expressive Power of SPARQL," Proceedings of the 7th International Semantic Web Conference (ISWC2008). 2008.
(Continued)

*Primary Examiner* — Kim T Nguyen
(74) *Attorney, Agent, or Firm* — Kokka & Backus, PC

(57) ABSTRACT

Various embodiments relate generally to data science and data analysis, computer software and systems, network communications to interface among repositories of disparate datasets and computing machine-based entities that seek access to the datasets, and, more specifically, to a computing and data storage platform configured to provide one or more computerized tools that facilitate data projects by providing
(Continued)

an interactive, project-centric workspace interface that may include, for example, a unified view in which to identify data sources, generate transformative datasets, and/or disseminate insights to collaborative computing devices and user accounts. For example, a method may include identifying a subset of derived from one or more queries applied against a graph data arrangement, generating data representing a data project user interface to present, for example, a collaborative query editor to receive a query, and generating data to access an external third-party computerized data analysis tool to perform an action.

20 Claims, 29 Drawing Sheets

Related U.S. Application Data a continuation-in-part of application No. 15/186,516, filed on Jun. 19, 2016, now Pat. No. 10,452,677, and a continuation-in-part of application No. 15/454,923, filed on Mar. 9, 2017, now Pat. No. 10,353,911, and a continuation-in-part of application No. 15/926,999, filed on Mar. 20, 2018, and a continuation-in-part of application No. 15/927,004, filed on Mar. 20, 2018.

(51) Int. Cl.
  *G06F 21/62* (2013.01)
  *G06F 16/25* (2019.01)
  *G06F 16/248* (2019.01)

(56) References Cited

U.S. PATENT DOCUMENTS

| | | | |
|---|---|---|---|
| 6,529,909 B1 | 3/2003 | Bowman-Amuah | |
| 6,768,986 B2 | 7/2004 | Cras et al. | |
| 6,961,728 B2 | 11/2005 | Wynblatt et al. | |
| 7,080,090 B2 | 7/2006 | Shah et al. | |
| 7,146,375 B2 | 12/2006 | Egilsson et al. | |
| 7,680,862 B2 | 3/2010 | Chong et al. | |
| 7,702,639 B2 * | 4/2010 | Stanley | G06F 16/20 707/999.1 |
| 7,761,407 B1 | 7/2010 | Stern | |
| 7,836,063 B2 | 11/2010 | Salazar et al. | |
| 7,853,081 B2 | 12/2010 | Thint | |
| 7,856,416 B2 | 12/2010 | Hoffman et al. | |
| 7,877,350 B2 | 1/2011 | Stanfill et al. | |
| 7,953,695 B2 | 5/2011 | Roller et al. | |
| 7,987,179 B2 | 7/2011 | Ma et al. | |
| 8,037,108 B1 | 10/2011 | Chang | |
| 8,060,472 B2 | 11/2011 | Itai et al. | |
| 8,099,382 B2 | 1/2012 | Liu et al. | |
| 8,170,981 B1 | 5/2012 | Tewksbary | |
| 8,275,784 B2 | 9/2012 | Cao et al. | |
| 8,429,179 B1 | 4/2013 | Mirhaji | |
| 8,521,565 B2 | 8/2013 | Faulkner et al. | |
| 8,538,985 B2 | 9/2013 | Betawadkar-Norwood et al. | |
| 8,583,631 B1 | 11/2013 | Ganapathi et al. | |
| 8,616,443 B2 | 12/2013 | Butt et al. | |
| 8,719,252 B2 | 5/2014 | Miranker et al. | |
| 8,762,160 B2 | 6/2014 | Lulla | |
| 8,799,240 B2 | 8/2014 | Stowe et al. | |
| 8,831,070 B2 | 9/2014 | Huang et al. | |
| 8,843,502 B2 | 9/2014 | Elson et al. | |
| 8,892,513 B2 | 11/2014 | Forsythe | |
| 8,935,272 B2 | 1/2015 | Ganti et al. | |
| 8,943,313 B2 | 1/2015 | Glew et al. | |
| 8,965,915 B2 | 2/2015 | Ganti et al. | |
| 8,990,236 B2 | 3/2015 | Mizrahy et al. | |
| 8,996,559 B2 | 3/2015 | Ganti et al. | |
| 9,002,860 B1 | 4/2015 | Ghemawat | |
| 9,218,365 B2 | 12/2015 | Irani et al. | |
| 9,244,952 B2 | 1/2016 | Ganti et al. | |
| 9,396,283 B2 | 7/2016 | Miranker et al. | |
| 9,495,429 B2 | 11/2016 | Miranker | |
| 9,607,042 B2 | 3/2017 | Long | |
| 9,690,792 B2 | 6/2017 | Bartlett et al. | |
| 9,696,981 B2 | 7/2017 | Martin et al. | |
| 9,710,526 B2 | 7/2017 | Couris et al. | |
| 9,710,568 B2 | 7/2017 | Srinivasan et al. | |
| 9,720,958 B2 | 8/2017 | Bagehorn et al. | |
| 9,798,737 B2 | 10/2017 | Palmer | |
| 10,102,258 B2 | 10/2018 | Jacob et al. | |
| 10,176,234 B2 | 1/2019 | Gould et al. | |
| 10,216,860 B2 | 2/2019 | Miranker et al. | |
| 10,324,925 B2 | 6/2019 | Jacob et al. | |
| 10,346,429 B2 | 7/2019 | Jacob et al. | |
| 10,353,911 B2 | 7/2019 | Reynolds et al. | |
| 10,438,013 B2 | 10/2019 | Jacob et al. | |
| 10,452,677 B2 | 10/2019 | Jacob et al. | |
| 10,452,975 B2 | 10/2019 | Jacob et al. | |
| 10,673,887 B2 * | 6/2020 | Crabtree | G06F 11/3495 |
| 2002/0143755 A1 | 10/2002 | Wynblatt et al. | |
| 2003/0093597 A1 | 5/2003 | Marshak et al. | |
| 2003/0120681 A1 | 6/2003 | Baclawski | |
| 2003/0208506 A1 | 11/2003 | Greenfield et al. | |
| 2004/0064456 A1 | 4/2004 | Fong et al. | |
| 2005/0010550 A1 | 1/2005 | Potter et al. | |
| 2005/0010566 A1 | 1/2005 | Cushing et al. | |
| 2005/0234957 A1 | 10/2005 | Olson et al. | |
| 2005/0246357 A1 | 11/2005 | Geary et al. | |
| 2005/0278139 A1 | 12/2005 | Glaenzer et al. | |
| 2006/0129605 A1 | 6/2006 | Doshi | |
| 2006/0168002 A1 | 7/2006 | Chesley | |
| 2006/0218024 A1 | 9/2006 | Lulla | |
| 2006/0235837 A1 | 10/2006 | Chong et al. | |
| 2007/0027904 A1 | 2/2007 | Chow et al. | |
| 2007/0139227 A1 | 6/2007 | Speirs et al. | |
| 2007/0179760 A1 | 8/2007 | Smith | |
| 2007/0203933 A1 | 8/2007 | Iversen et al. | |
| 2008/0046427 A1 | 2/2008 | Lee et al. | |
| 2008/0091634 A1 | 4/2008 | Seeman | |
| 2008/0162550 A1 | 7/2008 | Fey | |
| 2008/0162999 A1 | 7/2008 | Schlueter et al. | |
| 2008/0216060 A1 | 9/2008 | Vargas | |
| 2008/0240566 A1 | 10/2008 | Thint | |
| 2008/0256026 A1 | 10/2008 | Hays | |
| 2008/0294996 A1 | 11/2008 | Hunt et al. | |
| 2008/0319829 A1 | 12/2008 | Hunt et al. | |
| 2009/0006156 A1 | 1/2009 | Hunt et al. | |
| 2009/0018996 A1 | 1/2009 | Hunt et al. | |
| 2009/0106734 A1 | 4/2009 | Riesen et al. | |
| 2009/0132474 A1 | 5/2009 | Ma et al. | |
| 2009/0132503 A1 | 5/2009 | Sun et al. | |
| 2009/0138437 A1 | 5/2009 | Krishnamoorthy et al. | |
| 2009/0150313 A1 | 6/2009 | Heilper et al. | |
| 2009/0157630 A1 | 6/2009 | Yuan | |
| 2009/0182710 A1 | 7/2009 | Short et al. | |
| 2009/0234799 A1 | 9/2009 | Betawadkar-Norwood et al. | |
| 2009/0300054 A1 | 12/2009 | Fisher et al. | |
| 2010/0114885 A1 | 5/2010 | Bowers et al. | |
| 2010/0235384 A1 | 9/2010 | Itai et al. | |
| 2010/0241644 A1 | 9/2010 | Jackson et al. | |
| 2010/0250576 A1 | 9/2010 | Bowers et al. | |
| 2010/0250577 A1 | 9/2010 | Cao et al. | |
| 2011/0202560 A1 | 8/2011 | Bowers et al. | |
| 2012/0016895 A1 | 1/2012 | Butt et al. | |
| 2012/0036162 A1 | 2/2012 | Gimbel | |
| 2012/0102022 A1 | 4/2012 | Miranker et al. | |
| 2012/0154633 A1 | 6/2012 | Rodriguez | |
| 2012/0179644 A1 | 7/2012 | Miranker | |
| 2012/0254192 A1 | 10/2012 | Gelbard | |
| 2012/0278902 A1 | 11/2012 | Martin et al. | |
| 2012/0284301 A1 | 11/2012 | Mizrahy et al. | |
| 2012/0310674 A1 | 12/2012 | Faulkner et al. | |
| 2012/0330908 A1 | 12/2012 | Stowe et al. | |
| 2012/0330979 A1 | 12/2012 | Elson et al. | |
| 2013/0031208 A1 | 1/2013 | Linton et al. | |
| 2013/0031364 A1 | 1/2013 | Glew et al. | |
| 2013/0110775 A1 | 5/2013 | Forsythe | |
| 2013/0114645 A1 | 5/2013 | Huang et al. | |

(56) References Cited

U.S. PATENT DOCUMENTS

| | | |
|---|---|---|
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2014/0006448 A1 | 1/2014 | McCall |
| 2014/0019426 A1 | 1/2014 | Palmer |
| 2014/0067762 A1 | 3/2014 | Carvalho |
| 2014/0198097 A1 | 7/2014 | Evans |
| 2014/0214857 A1 | 7/2014 | Srinivasan et al. |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2015/0052125 A1 | 2/2015 | Ellis et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0269223 A1 | 9/2015 | Miranker et al. |
| 2016/0055184 A1* | 2/2016 | Fokoue-Nkoutche ........ G06F 16/213 707/809 |
| 2016/0063017 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0117362 A1 | 4/2016 | Bagehorn et al. |
| 2016/0132572 A1 | 5/2016 | Chang et al. |
| 2016/0147837 A1 | 5/2016 | Nguyen et al. |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0371288 A1* | 12/2016 | Le Biannic ........ G06F 16/90324 |
| 2016/0371355 A1 | 12/2016 | Massari et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0177729 A1 | 6/2017 | Duke et al. |
| 2017/0228405 A1 | 8/2017 | Ward et al. |
| 2017/0316070 A1 | 11/2017 | Krishnan et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2018/0025027 A1 | 1/2018 | Palmer |
| 2018/0032327 A1 | 2/2018 | Adami et al. |
| 2018/0210936 A1 | 7/2018 | Reynolds et al. |
| 2018/0262864 A1 | 9/2018 | Reynolds et al. |
| 2018/0314705 A1 | 11/2018 | Griffith et al. |
| 2019/0005104 A1 | 1/2019 | Prabhu et al. |
| 2019/0034491 A1* | 1/2019 | Griffith ................. G06F 16/258 |
| 2019/0042606 A1 | 2/2019 | Griffith et al. |
| 2019/0050445 A1* | 2/2019 | Griffith ................. G06F 16/213 |
| 2019/0050459 A1 | 2/2019 | Griffith et al. |
| 2019/0065567 A1 | 2/2019 | Griffith et al. |
| 2019/0065569 A1* | 2/2019 | Boutros ................ G06F 16/212 |
| 2019/0066052 A1* | 2/2019 | Boutros ................ G06F 16/248 |
| 2019/0079968 A1 | 3/2019 | Griffith et al. |
| 2019/0095472 A1 | 3/2019 | Griffith |
| 2019/0121807 A1* | 4/2019 | Boutros .............. G06F 16/2428 |
| 2019/0155852 A1 | 5/2019 | Miranker et al. |
| 2019/0266155 A1 | 8/2019 | Jacob et al. |
| 2019/0272279 A1 | 9/2019 | Jacob et al. |
| 2019/0317961 A1 | 10/2019 | Brener et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0117665 A1 | 4/2020 | Jacob et al. |
| 2020/0117688 A1 | 4/2020 | Sequeda et al. |

FOREIGN PATENT DOCUMENTS

| | | |
|---|---|---|
| EP | 2631817 A1 | 8/2013 |
| EP | 2631819 A1 | 8/2013 |
| EP | 2685394 A3 | 6/2017 |
| GB | 2519779 A | 5/2015 |
| JP | 2013175181 A | 9/2013 |
| JP | 2013246828 A | 12/2013 |
| WO | 2012054860 A1 | 4/2012 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |

OTHER PUBLICATIONS

Arenas, M., et al., "A Direct Mapping of Relational Data to RDF," W3C Recommendation, Sep. 27, 2012, Retrieved from the Internet [retrieved Mar. 7, 2019].

Beckett, D., Berners-Lee, T., "Turtle—Terse RDF Triple Language," W3C Team Submission, Jan. 14, 2008, Retrieved from the Internet [retrieved Mar. 7, 2019].

Beckett, D., Broekstra, J., "SPARQL Query Results XML Format," W3C Recommendation, Jan. 15, 2008, Retrieved from the Internet [retrieved Mar. 7, 2019].

Beckett, Dave, "RDF/XML Syntax Specification (Revised)," W3C Recommendation, Feb. 10, 2004, Retrieved from the Internet [retrieved Mar. 7, 2019].

Berners-Lee, Tim, "Notation 3," 2006, Retrieved from the Internet [retrieved on Mar. 7, 2019].

Berners-Lee, Tim, "Linked Data," 2009, Retrieved from the Internet [retrieved on Mar. 7, 2019].

Brener et al., "Computerized Tools Configured to Determine Subsets of Graph Data Arrangements for Linking Relevant Data to Enrich Datasets Associated With a Data-Driven Collaborative Dataset Platform," U.S. Appl. No. 16/395,036, filed Apr. 25, 2019.

Brickley, D., Guha, R.V., "RDF Vocabulary Description Language 1.0: RDF Schema," W3C Recommendation, Feb. 10, 2004, Retrieved from the Internet [retrieved Mar. 7, 2019].

Buche et al., "Flexible SPARQL Querying of Web Data Tables Driven by an Ontology," FQAS 2009, LNAI 5822, Springer, 2009, pp. 345-357.

Bullock, Joshua, Final Office Action dated Jan. 22, 2019 for U.S. Appl. No. 15/439,908.

Bullock, Joshua, Final Office Action dated Jan. 22, 2019 for U.S. Appl. No. 15/439,911.

Clark, K., Feigenbaum, L., Torres, E., "SPARQL Protocol for RDF," W3C Recommendation, Jan. 15, 2008, Retrieved from the Internet [retrieved Mar. 7, 2019].

Czajkowski, K., et al., "Grid Information Services for Distributed Resource Sharing," 10th IEEE International Symposium on High Performance Distributed Computing, pp. 181-184. IEEE Press, New York (2001).

(56) References Cited

OTHER PUBLICATIONS

Dean, M., Schreiber, G., "OWL Web Ontology Language Reference," W3C Recommendation, Feb. 10, 2004, Retrieved from the Internet [retrieved Mar. 7, 2019].
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet [retrieved Mar. 7, 2019].
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].
Hoang, Hau Hai, Final Office Action dated Jul. 30, 2019 for U.S. Appl. No. 15/186,515.
Hoang, Hau Hai, Non-Final Office Action dated Apr. 16, 2019 for U.S. Appl. No. 15/186,515.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation via Distributed Computer Networks," U.S. Appl. No. 16/287,967, filed Feb. 27, 2019.
Jacob et al., "Dataset Analysis and Dataset Attribute Inferencing to Form Collaborative Datasets," U.S. Appl. No. 16/292,120, filed Mar. 4, 2019.
Jacob et al., "Dataset Analysis and Dataset Attribute Inferencing to Form Collaborative Datasets," U.S. Appl. No. 16/271,263, filed Feb. 8, 2019.
Jacob et al., "Management of Collaborative Datasets via Distributed Computer Networks," U.S. Appl. No. 16/271,687, filed Feb. 8, 2019.
Jacob et al., "Management of Collaborative Datasets via Distributed Computer Networks," U.S. Appl. No. 16/292,135, filed Mar. 4, 2019.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Khong, Alexander, Non-Final Office Action for U.S. Appl. No. 15/165,775, dated Jun. 14, 2018.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
Langedgger, Andreas, "XL Wrap—Spreadsheet-to-RDF Wrapper," 2009, Retrieved from the Internet [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet [retrieved Mar. 7, 2019].
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet [retrieved Mar. 7, 2019].
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet [retrieved Mar. 7, 2019].
Nguyen, Kim T., Non-Final Office Action dated Mar. 20, 2019 for U.S. Appl. No. 15/454,923.
Nguyen, Kim T., Notice of Allowance and Fee(s) Due, dated May 15, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet [retrieved Mar. 7, 2019].
RDB2RDF Working Group Charter, Sep. 2009, Retrieved from the Internet [retrieved Mar. 7, 2019].
Sahoo, S., et al., "A Survey of Current Approaches for Mapping of Relational Databases to RDF," W3C RDB2RDF XG Report, Incubator Group, Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.
Smith, M., Welty, C., McGuiness, D., "OWL Web Ontology Language Guide," W3C Recommendation, Feb. 10, 2004, Retrieved from the Internet [retrieved Mar. 7, 2019].
Smith, T.F., Waterman, M.S., "Identification of Common Molecular Subsequences," J. Mol. Biol. 147, 195-197 (1981).
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.
Ultrawrap Mapper, U.S. Appl. No. 62/169,268, filed Jun. 1, 2015 (Expired).
Vy, Hung T., Final Office Action for U.S. Appl. No. 13/180,444 dated Dec. 3, 2014.
Vy, Hung T., Final Office Action for U.S. Appl. No. 13/180,444 dated Dec. 9, 2015.

(56) References Cited

OTHER PUBLICATIONS

Vy, Hung T., Final Office Action for U.S. Appl. No. 13/180,444 dated Feb. 22, 2013.
Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Vy, Hung T., Non-Final Office Action for U.S. Appl. No. 15/273,930 dated Dec. 20, 2017.
Yen, Syling, Final Office Action dated Apr. 10, 2019 for U.S. Appl. No. 15/186,519.
Yen, Syling, Non-Final Office Action dated Feb. 8, 2019 for U.S. Appl. No. 15/186,519.
Yen, Syling, Non-Final Office Action dated Sep. 12, 2019 for U.S. Appl. No. 15/186,519.
Young, Lee W., Notification of Transmittal of the International Search Report and the Written Opinion of the International Searching Authority, or the Declaration for International Application No. PCT/US2011/057334, dated Mar. 22, 2012.
Miranker, Daniel Paul, "Accessing Relational Databases as Resource Description Framework Databases," U.S. Appl. No. 61/406,021, filed Oct. 22, 2010.
Bullock, Joshua, Final Office Action dated Oct. 30, 2018 for U.S. Appl. No. 15/186,517.
Bullock, Joshua, Non-Final Office Action dated Jul. 12, 2018 for U.S. Appl. No. 15/186,517.
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog by Crowd-Sourcing."
Ganti et al., U.S. Appl. No. 61/802,743, filed Mar. 18, 2013 and entitled, "Creating a Data Catalog by Mining Queries."
Ganti et al., U.S. Appl. No. 61/802,744, filed Mar. 18, 2013 and entitled, "Auto-Completion of Queries With Data Object Names and Data Profiles."
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Griffith et al., "Localized Link Formation to Perform Implicitly Federated Queries Using Extended Computerized Query Language Syntax," U.S. Appl. No. 16/036,836, filed Jul. 16, 2018.
Griffith, David Lee, "Determining a Degree of Similarity of a Subset of Tabular Data Arrangements to Subsets of Graph Data Arrangements at Ingestion Into a Data-Driven Collaborative Dataset Platform," U.S. Appl. No. 16/137,297, filed Sep. 20, 2018.
Griffith, David Lee, "Matching Subsets of Tabular Data Arrangements to Subsets of Graphical Data Arrangements at Ingestion Into Data Driven Collaborative Datasets," U.S. Appl. No. 16/137,292, filed Sep. 20, 2018.
Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.

Hoang, Hau Hai, Final Office Action dated Nov. 26, 2018 for U.S. Appl. No. 15/186,515.
Htay, Lin Lin M., Non-Final Office Action dated Sep. 14, 2018 for U.S. Appl. No. 15/186,516.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.
Jacob et al., "Collaborative Dataset Consolidation via Distributed Computer Networks," U.S. Appl. No. 16/120,057, filed Aug. 31, 2018.
Pandit et al., "Using Ontology Design Patterns to Define SHACL Shapes," CEUR Workshop Proceedings, Proceedings of the 9th Workshop on Ontology Design and Patterns (WOP 2018), Monterey, USA, Oct. 9, 2018.
Raab, Christopher J., Notice of Allowance and Fee(s) Due and Notice of Allowability for U.S. Appl. No. 15/186,520, dated Jan. 2, 2019.
Young, Lee W., International Searching Authority, Notification of Transmittal of the International Search Report and the Written Opinion of the International Searching Authority, or the Declaration for International Patent Application No. PCT/US2018/020812, dated Aug. 8, 2018.
Young, Lee W., Invitation to Pay Additional Fees and, Where Applicable, Protest Fee, dated Jun. 14, 2018 for International Application No. PCT/US2018/020812.
"Data.World Comes Out of Stealth to Make Open Data Easier." Americaninno.com, AustinInno, Jul. 11, 2016, www.americaninno.com/austin/open-data-tech-brett-hurts-startup-data-world-launches/.
Dwivedi, Mahesh H., Non-Final Office Action dated Jan. 30, 2020 for U.S. Appl. No. 15/454,955.
Gillin, Paul, "Neo4j Connector Integrates Graph Data With Business Intelligence Tools," SiliconANGLE, Published Mar. 24, 2020, Retrieved from on Mar. 25, 2020.
Hu, Xiaoqin, Final Office Action dated Oct. 31, 2019 for U.S. Appl. No. 15/454,969.
Hu, Xiaoqin, Final Office Action dated Sep. 24, 2019 for U.S. Appl. No. 15/454,981.
Woo, Isaac M., Non-Final Office Action dated May 5, 2020 for U.S. Appl. No. 16/137,292.
Yen, Syling, Final Office Action dated Oct. 25, 2019 for U.S. Appl. No. 15/186,519.
Yotova, Polina, Supplementary European Search Report and Examiner Search Opinion for European Patent Application No. 17815970.3, dated Feb. 21, 2020.
Bullock, Joshua, Non-Final Office Action dated Jun. 28, 2018 for U.S. Appl. No. 15/439,908.
Bullock, Joshua, Non-Final Office Action dated Jun. 28, 2018 for U.S. Appl. No. 15/439,911.
Nguyen, Kim T., Non-Final Office Action dated Jun. 14, 2018 for U.S. Appl. No. 15/186,514.
Raab, Christopher J., Non-Final Office Action dated Jun. 28, 2018 for U.S. Appl. No. 15/186,520.
Boutros et al., "Computerized Tools to Facilitate Data Project Development via Data Access Layering Logic in a Networked Computing Platform Including Collaborative Datasets," U.S. Appl. No. 15/985,704, filed May 22, 2018.
Boutros et al., "Dynamic Composite Data Dictionary to Facilitate Data Operations via Computerized Tools Configured to Access Collaborative Datasets in a Networked Computing Platform," U.S. Appl. No. 15/985,705, filed May 22, 2018.
Boutros et al., "Graphical User Interface for a Display Screen or Portion Thereof," U.S. Appl. No. 29/648,465, filed May 22, 2018.
Boutros et al., "Graphical User Interface for a Display Screen or Portion Thereof," U.S. Appl. No. 29/648,466, filed May 22, 2018.
Boutros et al., "Graphical User Interface for a Display Screen or Portion Thereof," U.S. Appl. No. 29/648,467, filed May 22, 2018.
Copenheaver, Blaine R., Notification of Transmittal of the International Search Report and the Written Opinion of the International Searching Authority, or the Declaration dated Jul. 5, 2017 for International Patent Application No. PCT/US2017/030474.

(56) References Cited

OTHER PUBLICATIONS

Griffith et al., "Aggregation of Ancillary Data Associated With Source Data in a System of Networked Collaborative Datasets," U.S. Appl. No. 15/927,006, filed Mar. 20, 2018.
Griffith et al., "Data Ingestion to Generate Layered Dataset Interrelations to Form a System of Networked Collaborative Datasets," U.S. Appl. No. 15/926,999, filed Mar. 20, 2018.
Griffith et al., "Layered Data Generation and Data Remediation to Facilitate Formation of Interrelated Data in a System of Networked Collaborative Datasets," U.S. Appl. No. 15/927,004, filed Mar. 20, 2018.
Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.
Griffith et al., "Transmuting Data Associations Among Data Arrangements to Facilitate Data Operations in a System of Networked Collaborative Datasets," U.S. Appl. No. 15/943,629, filed Apr. 2, 2018.
Hoang, Hau Hai, Non-Final Office Action dated May 3, 2018 for U.S. Appl. No. 15/186,515.
Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.
Joshi, Amit Krishna et al., "Alignment-based Querying of Linked Open Data," Lecture Notes in Computer Science, 7566, 807-824, 2012.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Krishnan et al., U.S. Appl. No. 15/583,966, filed May 1, 2017 and titled "Automatic Generation of Structed Data from Semi-Structured Data."
Martin et al., U.S. Appl. No. 13/457,925, filed Apr. 27, 2012 and titled "Incremental Deployment of Computer Software Program Logic."
Martin et al., U.S. Appl. No. 61/479,621, filed Apr. 27, 2011 and titled "Incremental Deployment Computer Software Program Logic."
Parashar et al., U.S. Appl. No. 62/329,982, filed Apr. 29, 2016 and titled "Automatic Parsing of Semi-Structured Data and Identification of Missing Delimiters."
Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.
Reynolds et al., "Computerized Tools to Discover, Form, and Analyze Dataset Interrelations Among a System of Networked Collaborative Datasets," International Patent Application No. PCT/US2018/020812 filed Mar. 3, 2018.
Reynolds et al., "Interactive Interfaces to Present Data Arrangement Overviews and Summarized Dataset Attributes for Collaborative Datasets," U.S. Appl. No. 15/454,969, filed Mar. 9, 2017.
Skevakis, Giannis et al., Metadata management, interoperability and Linked Data publishing support for Natural History Museums, Int J Digit Lib (2014), published online: Apr. 11, 2014; Springer-Verlag Berlin Heidelberg.
Young, Lee W., International Searching Authority, Notification of Transmittal of the International Search Report and the Written Opinion of the International Searching Authority, or the Declaration for International Patent Application No. PCT/US2017/037846, dated Nov. 9, 2017.
Young, Lee W., Notification of Transmittal of the International Search Report and the Written Opinion of the International Searching Authority, or the Declaration dated May 29, 2018 for International Patent Application No. PCT/US2018/018906.

\* cited by examiner

Data Project Interface 890

< Lake Muttonchop Fishery Data, 2001-2005 / workspace — 803 data.world

DATA SOURCES — Hide
Data Source Links 891 import ▾   851

▾ Project files
2 files, 2 tables

812 — 1North_Fish_Capture... [CSV]
814 — 3North_Basin_Species_Taxon... [CSV]

Document Links 892

DOCUMENTS (2)   Hide
822
Project summary   [342]
Data dictionary

QUERIES (5)   Hide

New query ▾

First 25 Samples   [SQL]
@User_1

Return first 1,000 Samples   [SQL]
@User_1

Fish Species and Age Capture...   [SQL]
@User_1

Location and Species of Botto...   [SQL]
@User_1 north_basin_catch   [SQL]
sample

Composite Data Dictionary 895b

User_1/lake-muttonchop-fishery-data-2001-2005 ← 830

1North_Basin_Fish_Capture.csv ← 840    Edit
+ Add a description   842

| # | id_number | + Add column description | ← 844
| # | lat | + Add column description |
| # | long | + Add column description |
| ⊙ | location ← 845 | + Add column description |
| ▦ | species | + Add column description |
| ▦ | season | + Add column description |
| ▦ | year | + Add column description |
| # | month | + Add column description |
| # | day | + Add column description |
| ▦ | date | + Add column description |
| # | time | + Add column description |
| # | fishing_depth_m | + Add column description |
| # | area_sq_meter | + Add column description |
| ▦ | life_cycle | + Add column description |
| # | fish_density_numb_acre | + Add column description |
| # | fish_weight_weight_acre | + Add column description |
| # | count | + Add column description |
| # | weight_kg | + Add column description |

} 841

3North_Basin_Species_Taxonomic_Names.csv ← 860   Edit
+ Add a description   862

| # | alphanumeric_code | + Add column description |
| ▦ | species | + Add column description |
| ▦ | latin_taxonomic_name | + Add column description |

Data Project
Interface Portion
1190a

Add files via URL

Source URL — 1110

`https://pasteur.epa.gov/uploads/XTI9115/4Stream_fish_data_into_Muttonchop.csv`  [Add]

File name — 1112

`Stream fish data into Muttonchop`

ADVANCED OPTIONS                                                        Hide
*Set the method, request body, custom headers and auth for this URL* — 1114

Method

`GET`

Headers

`Header name`    `Header value`    ✕

[Add]

Auth — 1116
⦿ None   ○ OAuth   ○ Username/Password   ○ Token

? Learn more about adding files via URL          [Cancel]  [Save]

FIG. 11

COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS

CROSS-REFERENCE TO APPLICATIONS

This application is a continuation-in-part application of U.S. patent application Ser. No. 15/186,514, filed on Jun. 19, 2016, titled "COLLABORATIVE DATASET CONSOLIDATION VIA DISTRIBUTED COMPUTER NETWORKS," U.S. patent application Ser. No. 15/186,516, filed on Jun. 19, 2016, titled "DATASET ANALYSIS AND DATASET ATTRIBUTE INFERENCING TO FORM COLLABORATIVE DATASETS," U.S. patent application Ser. No. 15/454,923, filed on Mar. 9, 2017, titled "COMPUTERIZED TOOLS TO DISCOVER, FORM, AND ANALYZE DATASET INTERRELATIONS AMONG A SYSTEM OF NETWORKED COLLABORATIVE DATASETS," U.S. patent application Ser. No. 15/926,999, filed on Mar. 20, 2018, titled "DATA INGESTION TO GENERATE LAYERED DATASET INTERRELATIONS TO FORM A SYSTEM OF NETWORKED COLLABORATIVE DATASETS," and U.S. patent application Ser. No. 15/927,004, filed on Mar. 20, 2018, titled "LAYERED DATA GENERATION AND DATA REMEDIATION TO FACILITATE FORMATION OF INTERRELATED DATA IN A SYSTEM OF NETWORKED COLLABORATIVE DATASETS," all of which are herein incorporated by reference in their entirety for all purposes. This application is also related to U.S. patent application Ser. No. 15/943,633, filed on Apr. 2, 2018, titled "LINK-FORMATIVE QUERIES APPLIED AT DATA INGESTION TO FACILITATE DATA OPERATIONS IN A SYSTEM OF NETWORKED COLLABORATIVE DATASETS."

FIELD

Various embodiments relate generally to data science and data analysis, computer software and systems, and wired and wireless network communications to interface among repositories of disparate datasets and computing machine-based entities configured to access datasets, and, more specifically, to a computing and data storage platform configured to provide one or more computerized tools that facilitate development and management of data projects by providing an interactive, project-centric workspace interface that may include, for example, a unified view in which to identify data sources, generate transformative datasets, and/ or disseminate insights to collaborative computing devices and user accounts.

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide an ability to store an increasing amount of generated data. Consequently, traditional data storage and computing technologies have given rise to a phenomenon in which numerous desperate datasets have reached sizes and complexities that tradition data-accessing and analytic techniques are generally not well-suited for assessing conventional datasets.

Conventional technologies for implementing datasets typically rely on different computing platforms and systems, different database technologies, and different data formats, such as CSV, TSV, HTML, JSON, XML, etc. Known data-distributing technologies are not well-suited to enable interoperability among datasets. Thus, many typical datasets are warehoused in conventional data stores, which are known as "data silos." These data silos have inherent barriers that insulate and isolate datasets. Further, conventional data systems and dataset accessing techniques are generally incompatible or inadequate to facilitate data interoperability among the data silos.

Various, ad hoc and non-standard approaches have been adopted, but each standard approach is driven by different data practitioners who favor different processes. Thus, the various ad hoc approaches further exacerbate drawbacks in generating and managing datasets to review, consume, and re-use collected data, among other things. FIG. 1 is a diagram 100 depicting various multiple interfaces 100 associated with different applications, each of which is typically used in traditional data analyzation techniques. It is not uncommon for a data practitioner to begin accessing data in a variety of different formats, such as receiving data in a spreadsheet format 103 in window 102. Spreadsheet formats 103 are usually cobbled together to serve an immediate purpose of a data practitioner and may include inherent deficiencies that may hinder dissemination, since data in spreadsheet format 103 may not impact the originator's data efforts. An example of an inherent deficiency is a number of cells that may be empty. Or, one or more rows of data in spreadsheet format 103 may be duplicates, and the like. In a typical data procurement process, a data practitioner may wish to access and use data in another format, such as in a .CSV format 105 of interface 122. In this case, a user needs to transition to another interface 122, which may be presented as data implemented in a different data format, application, protocol, etc.

Data practitioners generally are required to intervene to manually standardize the data arrangements, especially since a predominant amount of common analyzation tools are focused narrowly on data and arrangements of data in datasets. Further, manual intervention by data practitioners is typically required to decide how to group data based on types, attributes, etc. Manual interventions for the above, as well as other known conventional techniques, generally cause sufficient friction to dissuade the use of such data files. The disparities between the different formats in interfaces 102 and 122 usually increase requirements to manually manage data gathering and analyzing activities. Such interventions by a data practitioner to manage data may induce friction in applying conventional data procurement processes. As an example, in the event that a user needs to reconcile data among the different data formats, a user may need to "ping pong" or "pogo stick" between windows 102 and 122, as well as among any other window, such as windows 112 and 132, to apply data in queries to support or prove a data-driven hypothesis.

Conventionally, a data practitioner may transition from interface 102 to interface 112 to create a query for application against datasets depicted in either interface 102 or interface 122. Different query languages may be required to query the different formats in interfaces 102 and 122, thereby requiring additional resources. Upon generating results of a query, a user yet again may need to transition to another interface 132 to generate visualization imagery, such as a histogram or bar chart, to convey or explain whether the query results support a particular assumption or thesis for which the data processing is performed. By requiring a user to interact with multiple interfaces 102, 112, 122, and 132, the multiple-stage, back-and-forth process interrupts the user experience of a user during conventional data procurement and analysis. The repeated back-and-forth on coordinated transitions between interfaces 102, 112, 122, and 132 and are development of data projects due to a number of disparate tools or applications for processing datasets. Thus, a user experiences numerous transitions and disruptions in a typical process of procuring a result of data mining in accordance with conventional approaches. It is also expected that, after each stage, some data practitioners decide not to continue with the relatively cumbersome processes, resulting in the loss of potential data and conclusions relating to solving a particular problem. Thus, potential data practitioners may be discouraged from exploring and evaluating solutions other than a principal purpose of performing specific data analysis.

Moreover, a data practitioner may turn to an ad hoc reporting system 115, such as a word processor, to memorialize the results of a data analysis process. The output may be data 196 representing an electronic document or email. Generally, such reports may be tailored or directed to specific audiences rather than being accessible to different individuals having different skill sets, roles, and responsibilities in an organization. For example, a product manager positing that various product defects may be linked to a manufacturing process may not have the technical ability to digest technical reports detailing chemical and electrical statistical variances during the manufacturing process. Thus, otherwise valuable information may not be readily available for dissemination to key stakeholders or anyone who might find value in such results.

Moreover, traditional dataset generation and management are not well-suited to reducing efforts by data scientists and data practitioners to interact with data, such as via user interface ("UI") metaphors, over complex relationships that link groups of data in a manner that serves desired objective. Further, traditional dataset generation and management are not well-suited to collaboratively exchange data with third-party (e.g., external) applications or endpoints processes, such as different statistical applications, visual applications, query programming language applications, etc.

Thus, what is needed is a solution for facilitating techniques to optimize data operations applied to datasets, without the limitations of conventional techniques.

BRIEF DESCRIPTION OF THE DRAWINGS

Various embodiments or examples ("examples") of the invention are disclosed in the following detailed description and the accompanying drawings:

FIGS. 3A and 3B depict portions of a data project interface, according to some examples;

FIG. 7 is an example of a data project interface implementing a computerized tool configured to at least import, inspect, analyze, and/or modify data of a data source as a dataset, according to some examples;

FIGS. 8 to 10 are diagrams depicting various examples of a data project interface implemented to form a composite data dictionary, according to some embodiments;

FIG. 11 is a diagram depicting a data project interface portion configured to link an external dataset into a data project, according to some examples;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
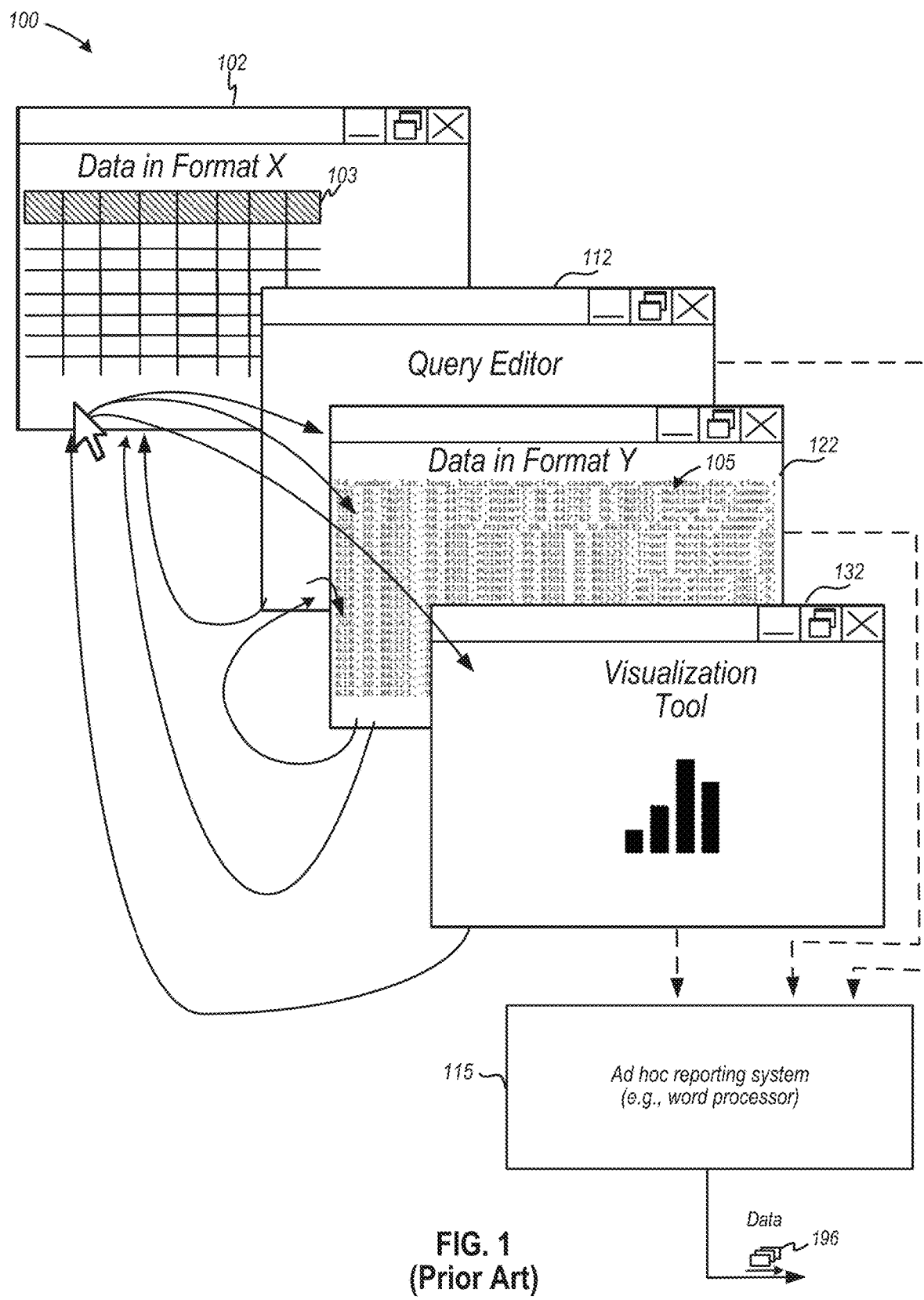
FIG. 1 is a diagram 100 depicting various multiple interfaces 100 associated with different applications that are typically used in traditional data analyzation techniques.
Figure 2A:
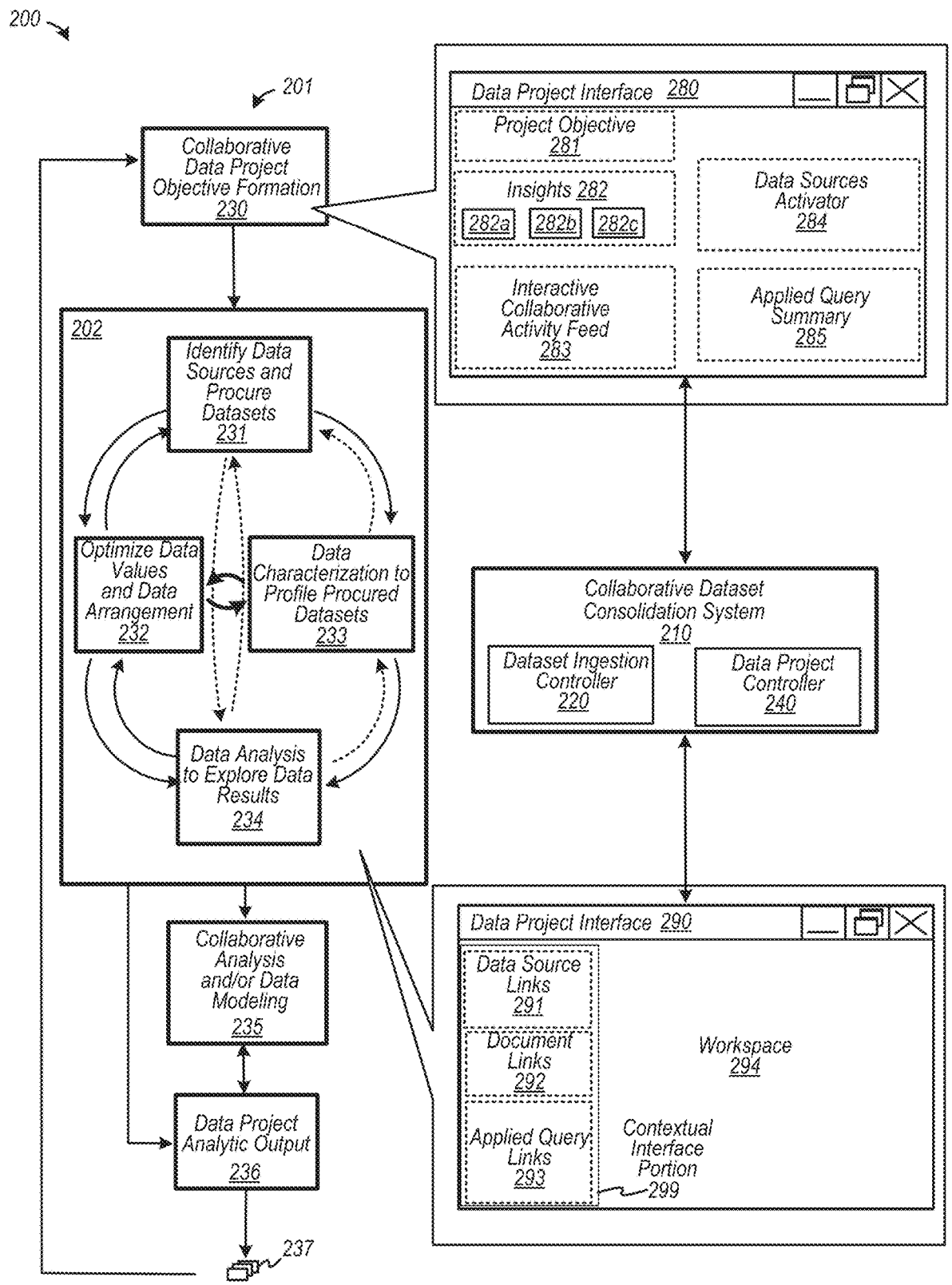
FIG. 2A is an overview block diagram depicting an example of a collaborative dataset consolidation system including a data project controller to facilitate data project formation and collaboration, according to some embodiments.

FIG. 2A is an overview block diagram depicting an example of a collaborative dataset consolidation system including a data project controller to facilitate data project formation and collaboration, according to some embodiments. Diagram 200 depicts an example of a collaborative dataset consolidation system 210 that may be configured to consolidate one or more datasets to form collaborative datasets for a data project directed to analyzing collaborative datasets in view of a particular project objective or purpose. Collaborative dataset consolidation system 210 is shown to include a dataset ingestion controller 220 and a data project controller 240, and may include other structures and/or functionalities (not shown). Dataset ingestion controller 220 may be configured to transform a tabular data arrangement in which a dataset may be introduced into collaborative dataset consolidation system 210 as another data arrangement (e.g., a graph data arrangement) in a second format (e.g., a graph). Dataset ingestion controller 220 also may be configured to perform other functionalities with which to form, modify, query and share collaborative datasets according to various examples. In at least some examples, dataset ingestion controller 220 and/or other components of collaborative dataset consolidation system 210 may be configured to implement linked data as one or more canonical datasets with which to modify, query, analyze, visualize, and the like.

Data project controller 240 may be configured to control components of collaborative dataset consolidation system 210 to provision computerized tools to facilitate interoperability of canonical datasets with other datasets in different formats or with various external computerized analysis tools (e.g., via application programming interfaces, or APIs), whereby external computerized analysis tools may be disposed external to collaborative dataset consolidation system 210. Examples of external computerized analysis tools include external statistical and visualization applications.

Data project controller 240 may be configured to provision and control a data project interface 280 and a data project interface 290 as computerized tools, or as controls for implementing computerized tools to procure, generate, manipulate, and share datasets, as well as to share query results and insights (e.g., conclusions or subsidiary conclusions) among any number of collaborative computing systems (and collaborative users of system 210). In some examples, data project interface 280 may be configured to provide computerized tools (or access thereto) to establish a data project, as well as invite collaboration and provide real-time (or near real-time) information as to insights to data analysis (e.g., conclusions) relating to a dataset or data project. As shown, a portion of data project interface 280 may include a project objective 281 identifying a potential resolution, aim, goal, or hypothesis through, for example, application one or more queries against a dataset (e.g., canonical dataset). Data project interface 290 may be configured to provide computerized tools (or access thereto) to provide an electronic "workspace" in which multiple datasets may be aggregated, analyzed (e.g., queried), and summarized through generation and publication of insights.

As shown in diagram 200, data project controller 240 may be configured to guide or drive collaboration in resolving an objective of a data project through an innovative "life cycle" process 201. By progressing through process 201, data may be characterized, linked, and prepared to facilitate data manipulation and reproducibility by data practitioners collaborating on resolving a project objective (e.g., testing a hypothesis) of a data project. Data project controller 240 and other components of collaborative dataset consolidation system 210 may further be configured to memorialize and archive one or more datasets, and corresponding collaborative interactions, at any point in time as a dataset evolves over time. Such datasets may be preserved or otherwise stored as new datasets are linked or created, and new queries and insights are created to drive the process from question to conclusion. Data 237 that is output from life cycle process 201 may represent new datasets, queries, insights, etc., which, in turn, may be shared among new collaborative computing devices, and may subsequently fuel data activities to expedite resolution of the data project.

A life cycle 201 of a data project may begin, or "kick off," with a formation of an objective at 230 of a data project with which to guide collaborative data mining and analyzation efforts. In some examples, a project objective may be established by a stake holder, such as by management personnel of an organization, or any role or individual who may or may not be skilled as a data practitioner. For example, a chief executive officer ("CEO") of a non-profit organization may desire to seek an answer to a technical question that the CEO is not readily able to resolve. The CEO may launch a data project through establishing a project objective 281 to invite skilled data practitioners within the organization, or external to the organization, to find a resolution of a question and/or proffered hypotheses.

An evolutionary or development stage 202 for a data project may include one or more processes 231, 232, 233, and 234, any of which may be performed serially, sequentially, repeatedly, nonlinearly, and/or in any order to procure, clean, re-purpose, inspect, format, test, revise, modify, and explore one or more datasets to determine, for example, an insight and associated implications drawn from data analysis, regardless whether the insight is an interim or final conclusion. According to some embodiments, data project interface 290 may be configured to provide computerized tools to facilitate functionalities of each of processes 231, 232, 233, and 234. At 231, for example, sources of data may be identified and procured, via ingestion, into collaborative dataset consolidation system 210. Data may be sourced from universities databases, government databases, or any accessible networked data portal, which, in some cases, may be restricted to authorized computing devices or user accounts. At 232, procured data may be profiled or characterized to identify, for example, one or more dataset attributes for assessing, for example, the quality or suitability of using a procured dataset in a data project. At 232, for example, data ingestion controller 220 or any other component of system 210 may be configured to determine a "shape" or distribution of data values in a dataset, as well as determining datatypes for one or more subsets of data (e.g., columns of at least one of numeric, text, string, boolean, or other datatypes), classification of one or more subsets of data (e.g., geolocation data, zip code data, etc.), metadata, such as annotations, etc. and other aspects or characteristics of data in a dataset or a consolidated dataset. Data attributes may also be determined at 232.

Further to development stage 202, datasets, including dataset values and arrangements of data, may be optimized by "cleaning" data, as well as by providing other "data wrangling"-like functions. For example, a subset of data may include duplicative data or null (e.g., empty) data values, or may include data values exceeding a certain range of values (e.g., greater than four degrees of standard deviation), which may be indicative of an errant value. Depending on a data arrangement format in which data may be arranged prior to ingestion into system 210, artifacts evading conversion into a second data format (e.g., into a graph) may be identified for removal. Examples of such artifacts may include HTML tags (e.g., from scraped data), unexpected ASCII characters yielded from "optical character recognition" of data tables in PDF, etc. Further to process 232, datasets may be linked to form aggregated or consolidated datasets as a basis for collaborative datasets. For example, datasets including subsets of data representing values or classifications (e.g., columns of zip codes or city names) may be linked or otherwise joined at those subsets of data. At 232, a subset of data may be annotated, responsive to detecting a user input signal received from data project interface 290, whereby the annotation may be included in, for example, a composite data dictionary. In some cases, a dataset (or subsets of data thereof) may be recast or adapted to accommodate a particular query tool, visualization tool, or any other data analysis application.

At 234, data analysis may be performed to explore data values of datasets developed in processes 231, 232, and 233 to determine whether the datasets provide insight into resolving a project objective for the data project. In some examples, one or more queries may be performed in relational-based query languages (e.g., SQL), in graph-based query languages (e.g., SPARQL), or the like. Further, relationships among subsets of data may be explored via statistical applications or other applications (e.g., visualization applications) residing in system 210. In some examples, collaborative dataset consolidation system 210 or its components may provide an applications programming interface (e.g., an API), connectors or web connectors, and/or integration applications to access external third-party computerized data analysis tools. Examples of external applications and/or programming languages to perform external statistical and data analysis include "R," which is maintained and controlled by "The R Foundation for Statistical Computing" at www(dot)r-project(dot)org, as well as other like languages or packages, including applications that may be integrated with R (e.g., such as MATLAB™, Mathematica™, etc.). Or, other applications, such as Python programming applications, MATLAB™, Tableau® application, etc., may be used to perform further analysis, including visualization or other queries and data manipulation. From process 234, a development life cycle 201 may flow back to one or more processes 231, 232, and 233 for additional data refinement and analysis. Note that data project interface 290 includes a workspace interface portion ("workspace") 294 that may provide a unified view to facilitate transitioning from process 234 to any other process 231, 232, and 232.

At 235, which may be optional, further analysis may be performed by building and training data models, or by using data generated at development stage 202 to apply to, for example, machine learning applications. Further, feedback and additional analysis by collaborative computing systems and users may be received to supplement the analysis. At 236, an output of analyses of a data project may be generated as data 237. Examples of data 237 may include data representing reports (e.g. in any format, such as PDF, Word® document, Powerpoint™ document, etc.), data visualizations, presentations, data communicated via activity feeds, blog posts, emails, text messages, etc. Further, output data 237 may include date representing an "endpoint," and may include a new dataset for consumption by other computing devices. Or, output data 237 may be used for integration into other datasets (and other data projects). As shown in diagram 200, data 237 may include data that may be published as an insight 282 or may be otherwise returned to process 231 as a conclusion, or interim conclusion, for a data project. One or more interactive actions described above in development stage 202 may be preserved in a data repository, as different version of data, for subsequent evaluation.

Further to diagram 200, data project interface 280 is shown to include an interface portion including a project objective 281, and an interface portion including insights 282, which may include any number of insights, such as 282a, 282b, and 282c. Insights 282 may include data representing visualized (e.g., graphical) or textual results as examples of analytic results (including interim results) for a data project. Interactive collaborative activity feed 283 may provide information regarding collaborative interactions with one or more datasets associated with a data project, or with one or more collaborative users or computing devices. As an example, interactive collaborative activity feed 283 may convey one or more of a number of queries that are performed relative to a dataset, a number of dataset versions, identities of users (or associated user identifiers) who have analyzed a dataset, a number of user comments related to a dataset, the types of comments, etc.), and the like. Thus, interactive collaborative activity feed 283 may provide for "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets." Collaboration among users via collaborative user accounts (e.g., data representing user accounts for accessing a collaborative dataset consolidation system) and formation of collaborative datasets therefore may expedite analysis of data to drive toward resolution or confirmation of a hypothesis based on up-to-date information provided by interactive collaborative activity feed 283. An example of an interactive collaborative activity feed 283 is described in U.S. patent application Ser. No. 15/454,923, filed on Mar. 9, 2017, and titled "COMPUTERIZED TOOLS TO DISCOVER, FORM, AND ANALYZE DATASET INTERRELATIONS AMONG A SYSTEM OF NETWORKED COLLABORATIVE DATASETS, which is hereby incorporated by reference.

Data project interface 280 is also shown to include an interface portion including a data sources activator 284, and an interface portion including an applied query summary 285. Data sources activator 284 interface portion may include a list of dataset identifiers (e.g., file names) associated with a data project, each dataset identifier including a link to a corresponding dataset. Activating a link may provide access to data project interface 290, and, in response, a dataset may be presented in workspace 294. Applied query summary 285 may include a list of query identifiers associated with the data project. A query identifier may include a link to provide access to a query providing a particular insight, whereby activation of the query link identifier may provide access to the query in workspace 294 of data project interface 290. In view of the above, data project interface 280 may provide an overview level at a hierarchical level (e.g., a higher hierarchical level) of a data project that includes insights 282a to 282c as conclusive summaries of data analysis that support, contradict, or provides additional information. This information may assist in computing or determining validity of a proffered hypothesis set forth as project objective 281 without requiring access to lower hierarchical levels of a data project, at least in some cases. For example, a manufacturing supervisor or a director of a governmental health agency need not access data at a lower level to determine or understand one or more underlying bases for conclusions within insight 282. However, should one wish to evaluate or investigate the underlying bases, one may activate a user input to access workspace 294 of data project interface 290.

Data project interface 290 presents an interface portion including a data source links 291, an interface portion including document links 292, and an interface portion including applied query links 293, one or more of which may constitute a contextual interface portion 299 that provides descriptive context for data undergoing a data operation with respect to a computerized tool in workspace 294. Data source links 291 may include one or more dataset identifiers that may be configured as user inputs (e.g., hyperlinks) that, when activated, surfaces or presents a dataset (or a portion thereof) in workspace 294, as well as optionally presenting contextual dataset information.

Document links 292 may include one or more document identifiers to corresponding documents associated with the data project, including a composite data dictionary. Document identifiers of document links 292 each may be selectable to provide access via workspace 294. Applied query links 293 may include one or more query identifiers to corresponding queries associated with a data project, each of which may be activated to expose a query and, optionally, corresponding query results and contextual query information in workspace 294. Applied query links 293 may also include one or more user inputs to activate creation of one or more insights based on query results.

In some examples, data representing a user input disposed in one or more interface portions of data project interface 280 may cause access, upon activation of the user input, to other hierarchical levels of data associated with, for example, data project interface 290. Data project interface 290 may include a workspace user interface 294 that includes a contextual user interface portion 299 including at least a subset of linked references 291 to datasets as data sources, and a subset of linked references 293 to data queries, each of which may include executable commands of a query language applied to one or more collaborative datasets.

Figure 2B:
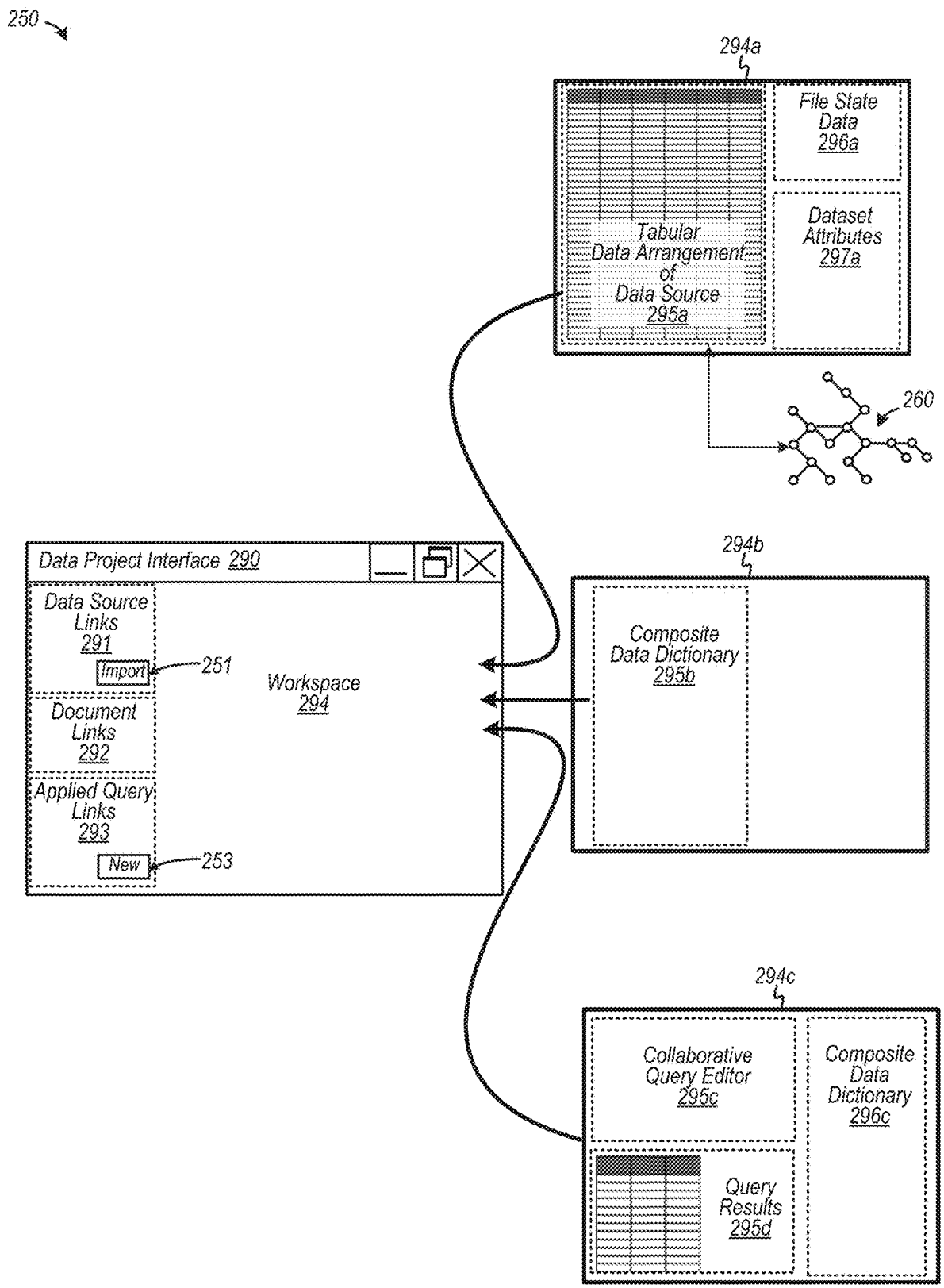
FIG. 2B is a diagram depicting versatility of a workspace interface portion, according to some examples.

FIG. 2B is a diagram depicting versatility of a workspace interface portion, according to some examples. As shown in diagram 250, a data project interface 290 may include data source links 291, document links 292, and applied query links 293. One or more elements depicted in diagram 250 of FIG. 2B may include structures and/or functions as similarly-named or similarly-numbered elements depicted in other drawings, or as otherwise described herein, in accordance with one or more examples. In one example, workspace 294 may be implemented as a monolithic interface configured to provide multiple computerized tools to perform multiple data operations, such as described as processes 231, 232, 233, and 234 of FIG. 2A, as well as other data operations (e.g., process 236 of FIG. 2A to generate an insight as an output).

According to some examples, activation of a user input associated with a dataset identifier link in data sources activator 284 in data project interface 280 of FIG. 2A may cause presentation of data project interface 290 of FIG. 2B, as well as data source links 291, document links 292, and applied query links 293, each of which may be presented simultaneously (or nearly simultaneously) with workspace 294 (e.g., as a contextual interface portion). Responsive to activation of a dataset identifier link, workspace 294 may include computerized tools as workspace 294 to inspect, analyze, modify, etc. data associated with a selected dataset. As shown, workspace 294a may include a presentation of a data source (e.g., dataset) as a tabular data arrangement 295a (e.g., in rows and columns), which includes data (e.g., data values) that correspond to at least one data point (e.g., a node) in a graph data arrangement 260.

According to some examples, file state data 296a and dataset attributes 297a may be presented coextensively (or substantially coextensively) with tabular data arrangement 295a. In some examples, presentation of one or more of interface portions including file state data 296a and dataset attributes 297a. File state data 296a and dataset attributes 297a interface portions may constitute a contextual user interface portion (e.g., a second contextual user interface portion) in addition to a first contextual user interface portion, which may include data source links 291 interface portion, document links 292 interface portion, and applied query links 293 interface portion. File state data 296a may include data representing a status of a dataset selected by activating the corresponding dataset identifier link. Further, file state data 296a may include data representing an identifier that identifies a user account that "owns" the dataset (e.g., has authorization to modify access permissions), as well as data representing a date of dataset creation (or ingestion into a collaborative dataset consolidation system), data representing a file size, data representing labels or descriptive tags, data representing a description of the dataset, and the like. In some examples, file state data 296a may include an interface portion configured to identify and generate notifications regarding likely deficiencies or errors in a dataset. For example, file state data 296a may include a "warning" notification that, when selected, may provide access to an underlying dataset to resolve whether data in the dataset ought to be modified (or "cleaned") to reduce errors or ambiguities. According to further examples, data from the dataset presented in tabular data arrangement 295a may be retrieved from an external data source, whereby the data of the dataset need not reside in a collaborative dataset consolidation system. In this case, file state data 296a may include an indication of a last date of synchronization with the external dataset, as well as an identifier indicating a location (e.g., a URL) at which the data of the dataset resides.

Dataset attributes 297a may include a list of dataset attributes, including at least an identifier describing a subset of data in a dataset. In some examples, each identifier may describe a subset of data that may relate to an annotation (e.g., a derived annotation from a column header) that describes data and/or data values in a column of tabular data arrangement 295a. Further, other data attributes for at least one identifier in dataset attributes 297a may be presented. For example, the other data attributes may describe, for example, various aspects of a dataset, in summary form, such as, but not limited to, annotations (e.g., of columns, cells, or any portion of data), data classifications (e.g., a geographical location, such as a zip code, etc.), datatypes (e.g., string, numeric, categorical, boolean, integer, etc.), a number of data points, a number of columns, a number of rows, a "shape" or distribution of data and/or data values (e.g., in a graphical representation, such as in a histogram), a number of empty or non-empty cells in a tabular data structure, a number of non-conforming data (e.g., a non-numeric data value in column expecting a numeric data, an image file, etc.) in cells of a tabular data structure, a number of distinct values, etc.

In one example, activation of a user input associated with a document identifier link in data sources activator 284 of FIG. 2A may cause presentation of data project interface 290 of FIG. 2B, as well as data source links 291, document links 292, and applied query links 293, each of which may be displayed or presented simultaneously (or nearly simultaneously) with workspace 294. Responsive to activation of a document identifier link in data project interface 280, workspace 294 may include computerized tools as workspace 294b to inspect, analyze, and/or modify data associated with a composite data dictionary 295b, which may include data descriptors, or identifiers, to describe data in each subset of data of dataset associated with a data project, regardless of whether the data resides locally or external to a collaborative dataset consolidation system. In some examples, data descriptors or subset identifiers may be derived from a column annotation or heading.

In yet another example, activation of a user input associated with a query identifier link in applied query summary 285 of FIG. 2A may cause presentation of data project interface 290 of FIG. 2B, which includes as data source links 291, document links 292, and applied query links 293, each of which may be presented simultaneously (or nearly simultaneously) with workspace 294. Responsive to activation of a query identifier link in data project interface 280, workspace 294 may include computerized tools as workspace 294c to inspect, analyze, or modify data associated with a query. For example, data source links 291, document links 292, and applied query links 293 may be presented coextensive with a collaborative query editor 295c, query results 295d, and an interactive composite data dictionary 296c with which to form queries. Collaborative query editor 295c may include data representing query-related elements, such as query statements, clauses, parameters, etc. The query in collaborative query editor 295c may be formed as either a relational-based query (e.g., in an SQL-equivalent query language) or a graph-based query (e.g., in a SPARQL-equivalent query language). Query results 295d may be presented in tabular form, or in graphical form (e.g., in the form of a visualization, such as a bar chart, graph, etc.). In some implementations, a user input (not shown) may accompany query results 295d to open a connector or implement an API to transmit the query results to an external third-party computerized data analysis tool. Interactive composite data dictionary 296c may include references to subsets of data (e.g., columns of data) associated with each dataset (e.g., each table or graph), and, as such, interactive composite data dictionary 296c may be used to form a query by "copying" or "dragging and dropping" a reference (e.g., a column annotation) into collaborative query editor 295c.

Further to diagram 250, data source links 291 may include a user input 251 configured to generate a signal to import a dataset into a data project, whereby importation of a dataset may coincide with process 231 of FIG. 2A. Also, applied query links 293 of FIG. 2B may include a user input 253 to generate a new query relating to one or more local or remote datasets, whereby generation of a new query may relate to process 232 (e.g., a transformational query to generate a derivative dataset based on one or more datasets) or to process 234, which may form query results as a basis, for example, to generate an insight. In some examples, activation of a user input in applied query links 293 or activation of user input ("new query") 253 may be configured to form a query that may be applied against a collaborative atomized dataset. Executable commands in a query language may be generated in response to activation of one or more user inputs associated with forming a query via, for example, a user input disposed in a composite data dictionary 296c. A query may be "ran," or performed, by applying executable commands to a collaborative atomized dataset to generate results of the query in interface portion 295d.

Moreover, user inputs to access any of workspace 294a, workspace 294b, and workspace 294c may be related to any of the processes in development life cycle 201. Thus, multiple processes of FIG. 2A may be addressed or accessed simultaneously (nearly simultaneously) by way of implementing, or providing access to, multiple concurrent user inputs. Concurrent access to the user inputs may facilitate activation or presentation of activation inputs in-situ (e.g., within a unified view or interface) of multiple functions associated in the development and evolution of a data project, thereby reducing friction and disruptive events, among other things, that may otherwise be associated with working with datasets. In various examples, data project interface 290 may facilitate simultaneous access to multiple computerized tools. In view of the foregoing, and in subsequent descriptions, data project interface 290 provides, in some examples, a unified view and an interface (e.g., a single interface) with which to access multiple functions, applications, data operations, and the like, for analyzing and publicizing multiple collaborative datasets.

Figure 2C:
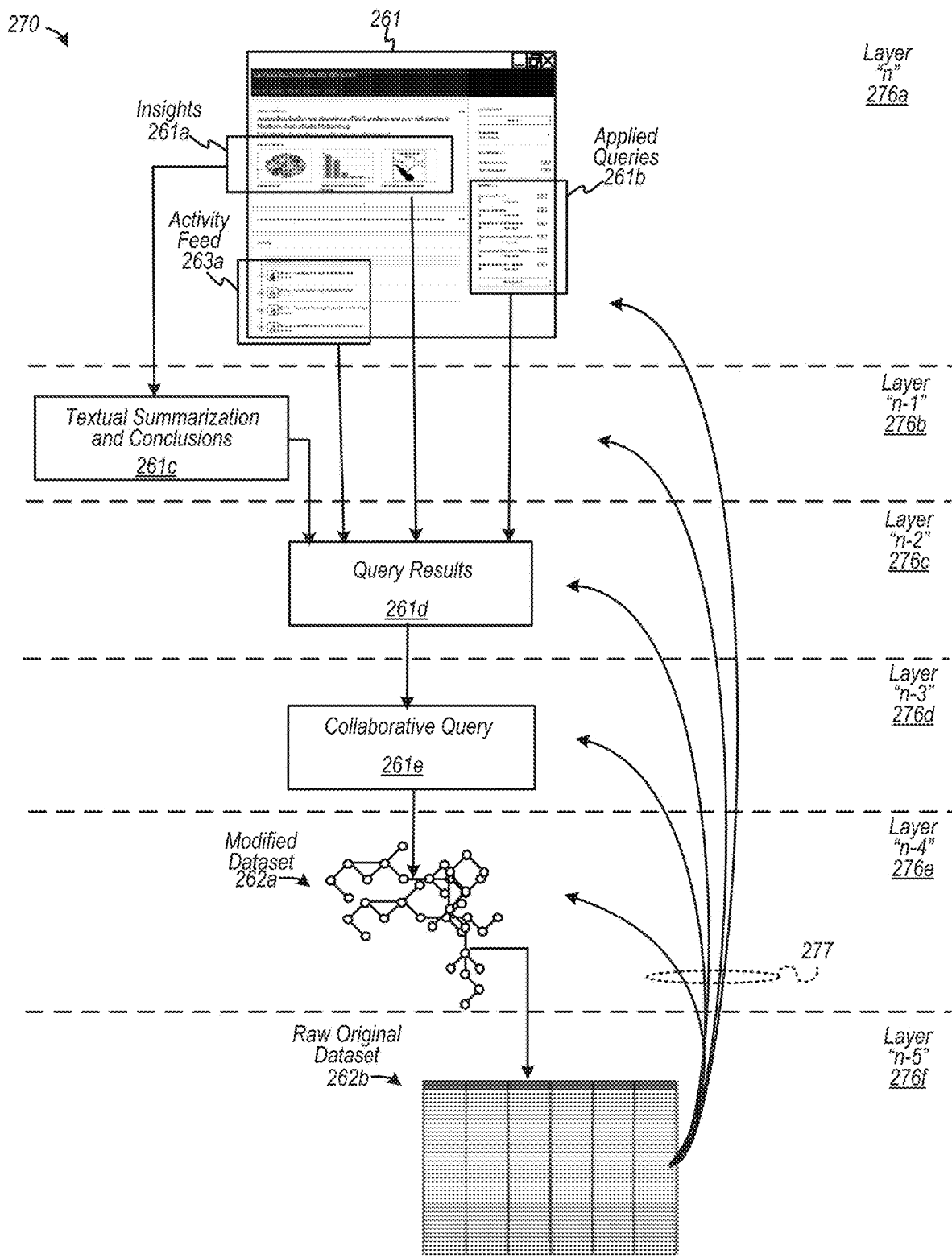
FIG. 2C is a diagram depicting hierarchical levels of data accessible via a data project interface, the levels of data including access to underlying data from which insight data or other information may be formed, according to some examples.

FIG. 2C is a diagram depicting hierarchical levels of data accessible via a data project interface, the levels of data including access to underlying data from which insight data or other information may be formed, according to some examples. Diagram 270 includes a number of layers, such as layer ("n") 276a to layer ("n−5") 276f, each of which may include data that may be accessible to determine, examine, review, test, and perform any data operation on data (e.g., preceding data) upon which one or more layers 276 may be formed. For example, a higher hierarchical level of data disposed at layer 276a may include insight data 261a presented in a data project interface 261, whereby insight data 261a may provide visualizations as conclusions or interim conclusions based on analysis of data in view of a project objective (not shown) set forth in layer 276a. In one example, at least one insight (e.g., descriptive insight) may be derived from executing a query at layer 276d against, for example, a graph data arrangement as a collaborative atomized dataset. Activation of a user input (e.g., via a hyperlink) associated with an insight 261a at layer 276a may provide text-based summarization and conclusions 261c in layer ("n–1") 276b relative to the project objective.

Further, a user input associated with text-based summarization and conclusions 261c may be configured to present query results 261d in a data project interface, whereby query results 261d provide data at layer ("n–2") 276c from which insights 261a are determined. Note, too, that query results 261d may be accessed via activation of user inputs associated with insights 261a, user inputs associated with an activity feed 263a, or user inputs associated with applied queries 261b.

Origination of query results 261d may be further explored by activating a user input to cause presentation of a collaborative query 261e created in a query language that may generate query results 261d. Further exploration of a collaborative query 261 may be effectuated by drilling down into one or more datasets, such as modified dataset 262a, which may be a "cleaned" or enhanced dataset formed from an original, raw dataset at layer ("n–5") 276f, which may be accessible for examination. In view of the foregoing, various layers or levels of a data project may be accessed (e.g., via a data project interface) for investigating accuracy and reliability of insights and conclusions based on underlying data and analyses. As shown, user inputs at a data project interface at any lower layer or level of data may provide access 277 to higher levels of data. According to various examples, more or fewer levels or layers may be accessible via a data projects interface.

Figure 3A:
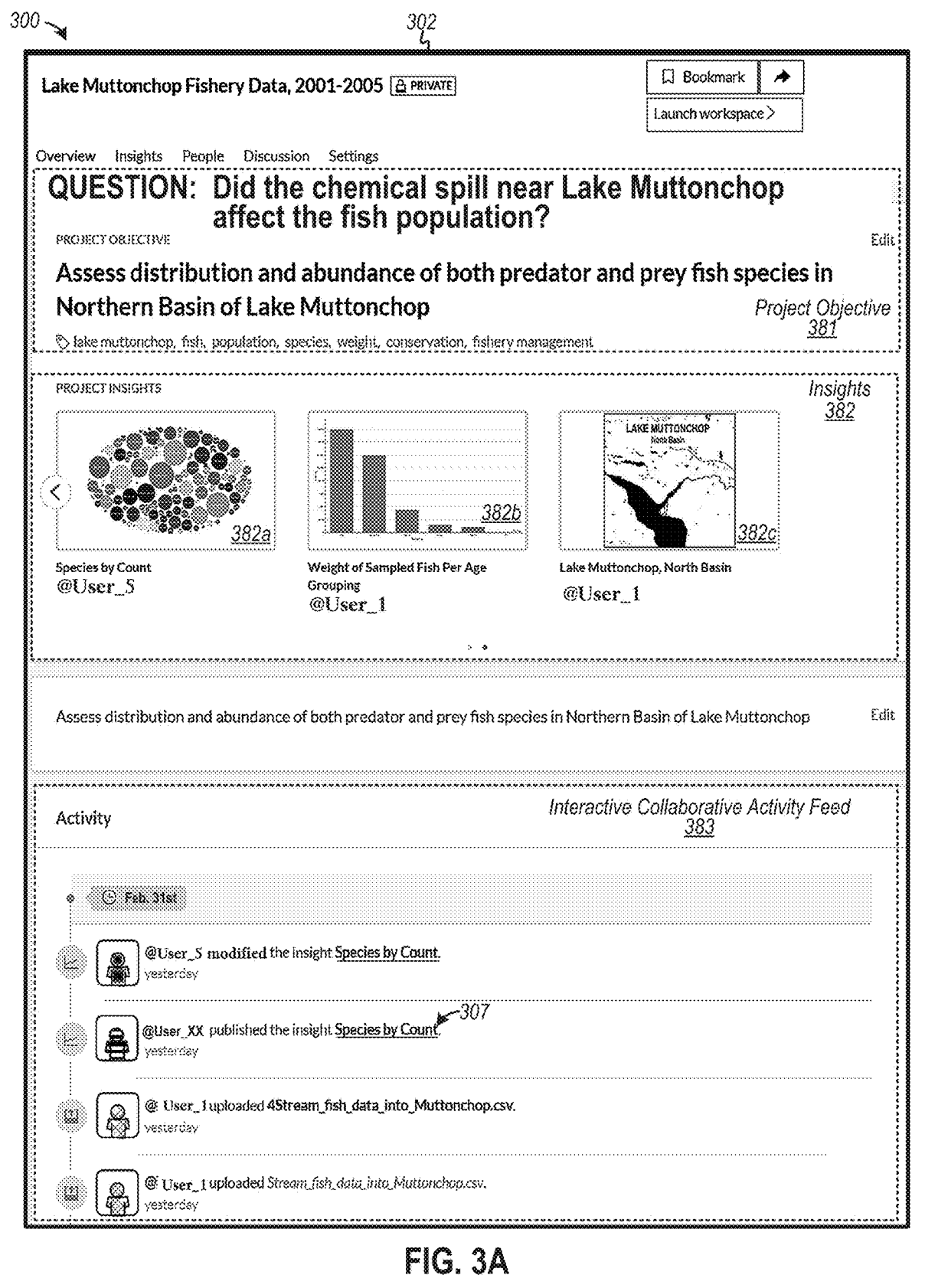
Figure 3B:
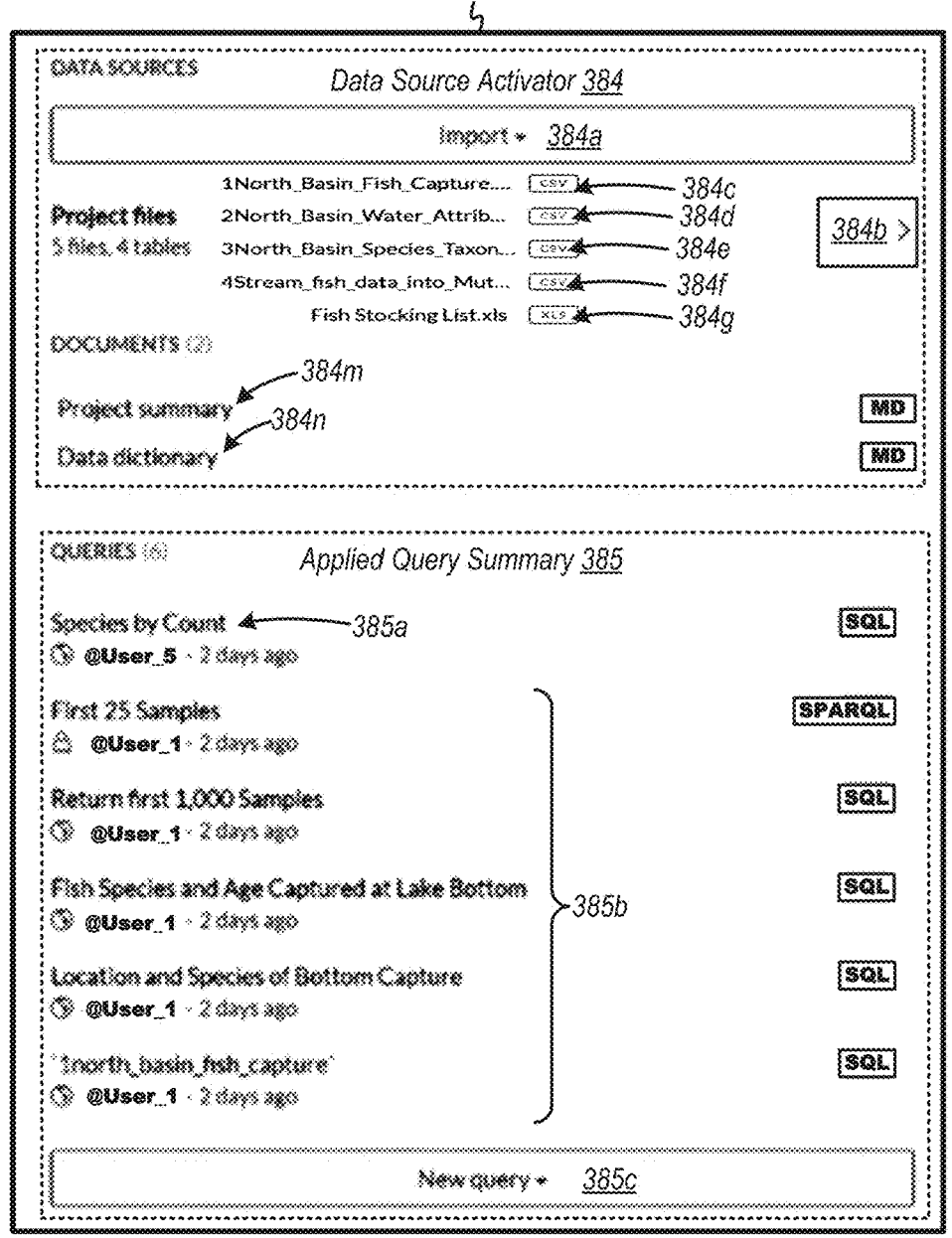

FIGS. 3A and 3B depict portions of a data project interface, according to some examples. Diagram 300 includes an interface portion 302 presenting examples of a project objective 381, insights 382, and an interactive collaborative activity feed 383. In this example, a director of a national park might wonder whether a chemical spill near a Lake Muttonchop affected the fish population, whereby a project objective may be described as "accessing distribution and abundance of both predator and prey fish species in the Northern Basin of Lake Muttonchop." This project objective may be an aim for procuring, configuring, and assessing data. Insights 382 may provide answers or conclusions, whether final or interim. For example, user "@User_1," who is owner of a data project may publish insight 382b regarding relative "weights" of each sampled fish species. That same user may include a map of Lake Muttonchop as a graphic image for insight 382c. Another user "@User_5," as collaborator, may assess or query differently one or more datasets of the data project, or may add additional datasets. Or, the other user may generate another insight, such as insight 382a. Interactive collaborative activity feed 383 depicts interactions over time with the datasets of the data project by collaborative users. Further to this example, @User_1 is shown to have uploaded a dataset identified as "4Stream_fish_data_into_Muttonchop.csv," and @User_XX has published an insight relating to a query identified as "Species by Count," which includes a user input 307 (e.g., via a hyperlink) that may be linked to a lower hierarchical level at which a query may be accessed in association with, for example, a workspace interface.

Diagram 350 of FIG. 3B includes an interface portion 352 presenting examples of a data source activator 384 and an applied query summary 385. Data source activator 384 includes at least a user input 384a configured to initiate importation of a dataset into a data project (e.g., ingest a dataset via a dataset ingestion controller, which is not shown). Data source activator 384 also includes user input 384b configured to activate collective access to one or more datasets in a workspace interface. Additionally, dataset identifiers 384c to 384g in data source activator 384 may be implemented as user inputs that are each configured to link to respective datasets, whereby selection of any of dataset identifiers 384c to 384g may trigger access to underlying levels of data in the datasets, including data representing a composite data dictionary. By contrast, applied query summary 385 may include query identifiers 385a and 385b that are each linked to a query applied against one or more datasets associated with a data project. Upon selection of a user input (e.g., selection of a link) associated with one of query identifiers 385a and 385b, a collaborative query editor and query results may be presented in a workspace interface. In some examples, a query is automatically performed, or run, each time a query is accessed, thereby providing, for example, a latest (or "freshest") query result. Another user input 385c, upon activation, may cause access to a collaborative query editor via links to datasets for creating a new query.

Figure 4:
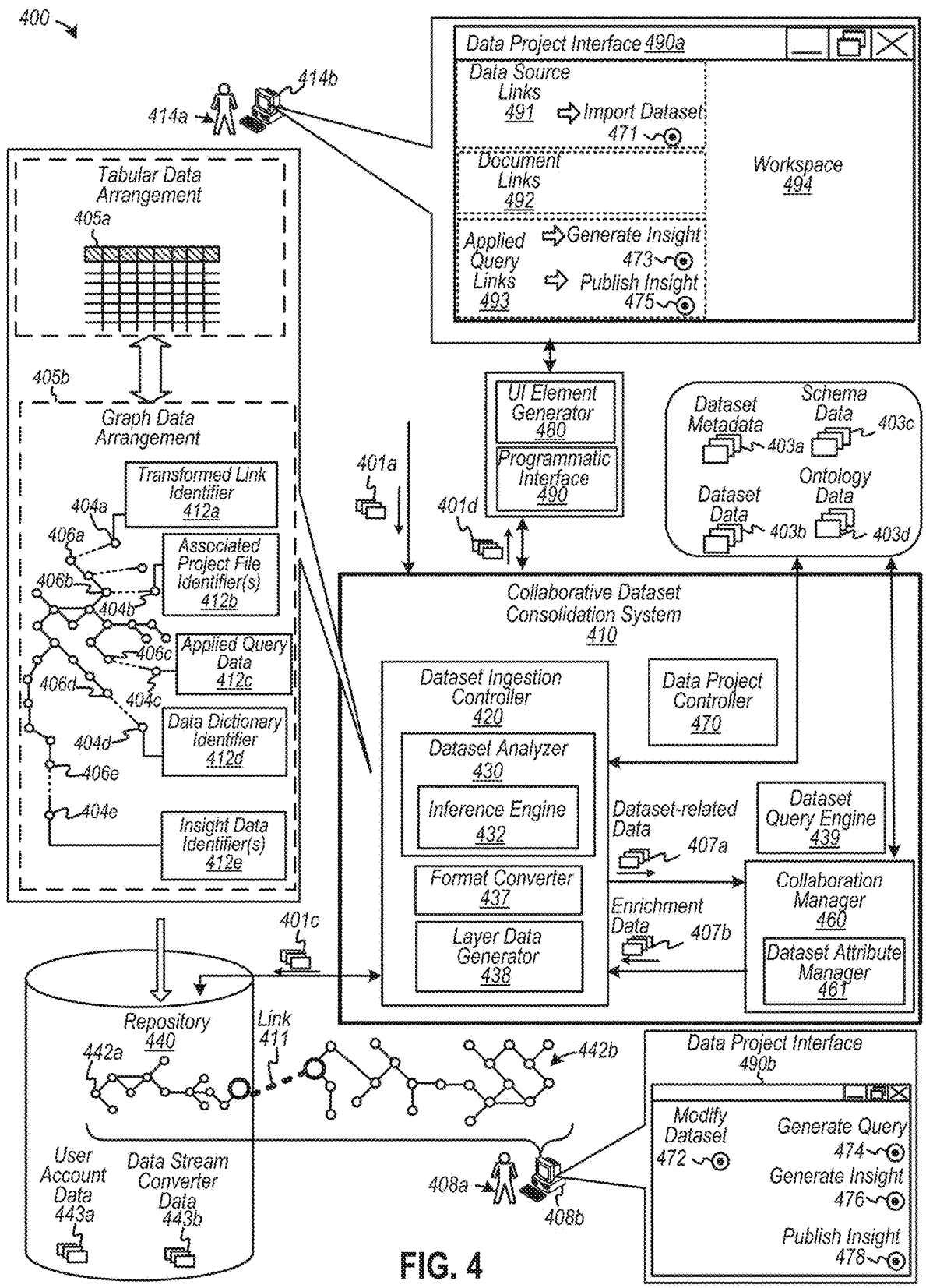
FIG. 4 is a diagram depicting an example of a data project controller configured to form data projects based on one or more datasets, according to some embodiments.

FIG. 4 is a diagram depicting an example of a data project controller configured to form data projects based on one or more datasets, according to some embodiments. Diagram 400 depicts an example of a collaborative dataset consolidation system 410 that may be configured to consolidate one or more datasets to form collaborative datasets as, for example, a canonical dataset. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets and multiple layers of layered data, whereby attribute data may be used to determine correlations (e.g., data patterns, trends, etc.) among the collaborative datasets. In some examples, data project controller 470 may be configured to control creation and evolution of a data project for managing collaborative datasets. Also data project controller 470 may also initiate importation (e.g., ingestion) of dataset 405a via dataset ingestion controller 420. Implementation of data project controller 470 to access, modify, or improve a data project may be activated via a user account associated with a computing device 414b (and/or user 414a). Data representing the user account may be disposed in repository 440 as user account data 443a. In this example, computing device 414b and user 414a may each be identified as a creator or "owner" of a dataset and/or a data project. However, initiation of data project controller 470 to access, modify, or improve a data project may originate via another user account associated with a computing device 408b (and/or user 408a), who, as a collaborator, may access datasets, queries, and other data associated with a data project to perform additional analysis and information augmentation.

Collaborative dataset consolidation system 410 may be configured to generate data for presentation in a display to form computerized tools in association with data project interface 490a, which is shown in this example to include a data source links 491 interface portion including a user input 471 to import a dataset, and a document links 492 interface portion. Data project interface 490a is also shown to include an applied query links 493 interface portion that includes a user input 473 to generate an insight, and also includes another user input 475 to publish an insight. Further, data project interface 490a also may present an interactive workspace interface portion 494. Consider that computing device

414*b* may be configured to initiate importation of a dataset 405*a* (e.g., in a tabular data arrangement) into a data project as a dataset 405*b* (e.g., in a graph data arrangement). Dataset 405*a* may be ingested as data 401*a*, which may be received in the following examples of data formats: CSV, XML, JSON, XLS, MySQL, binary, free-form, unstructured data formats (e.g., data extracted from a PDF file using optical character recognition), etc., among others. Consider further that dataset ingestion controller 420 may receive data 401*a* representing a dataset 405*a*, which may be formatted a table in data 401*a* (as shown) or may be disposed in any data format, arrangement, structure, etc., or may be unstructured (not shown). Dataset ingestion controller 420 may arrange data in dataset 405*a* into a first data arrangement, or may identify that data in dataset 405*a* is formatted in a particular data arrangement, such as in a first data arrangement. In this example, dataset 405*a* may be disposed in a tabular data arrangement that format converter 437 may convert into a second data arrangement, such as a graph data arrangement 405*b*. As such, data in a field (e.g., a unit of data in a cell at a row and column) of a table 405*a* may be disposed in association with a node in a graph 405*b* (e.g., a unit of data as linked data). A data operation (e.g., a query) may be applied as either a query against a tabular data arrangement (e.g., based on a relational data model) or graph data arrangement (e.g., based on a graph data model, such using RDF). Since equivalent data are disposed in both a field of a table and a node of a graph, either the table or the graph may be used interchangeably to perform queries and other data operations. Similarly, a dataset disposed in one or more other graph data arrangements may be disposed or otherwise mapped (e.g., linked) as a dataset into a tabular data arrangement.

Collaborative dataset consolidation system 410 is shown in this example to include a dataset ingestion controller 420, a collaboration manager 460 including a dataset attribute manager 461, a dataset query engine 439 configured to manage queries, and a data project controller 470. Dataset ingestion controller 420 may be configured to ingest and convert datasets, such as dataset 405*a* (e.g., a tabular data arrangement) into another data format, such as into a graph data arrangement 405*b*. Collaboration manager 460 may be configured to monitor updates to dataset attributes and other changes to a data project, and to disseminate the updates to a community of networked users or participants. Therefore, users 414*a* and 408*a*, as well as any other user or authorized participant, may receive communications, such as in an interactive collaborative activity feed (not shown) to discover new or recently-modified dataset-related information in real-time (or near real-time). Thus, collaboration manager 460 and/or other portions of collaborative dataset consolidation system 410 may provide collaborative data and logic layers to implement a "social network" for datasets. Dataset attribute manager 461 may include logic configured to detect patterns in datasets, among other sources of data, whereby the patterns may be used to identify or correlate a subset of relevant datasets that may be linked or aggregated with a dataset. Linked datasets may form a collaborative dataset that may be enriched with supplemental information from other datasets. Dataset query engine 439 may be configured to receive a query via applied query links 493 to apply against a combined dataset, which may include at least graph data arrangement 405*b*. In some examples, a query may be implemented as either a relational-based query (e.g., in an SQL-equivalent query language) or a graph-based query (e.g., in a SPARQL-equivalent query language). Further, a query may be implemented as either an implicit federated query or an explicit federated query.

According to some embodiments, a data project may be implemented as an augmented dataset including supplemental data, including as one or more transform link identifiers 412*a*, one or more associated project file identifiers 412*b*, one or more applied query data links 412*c*, one or more data dictionary identifiers 412*d*, and one or more insight data identifiers 412*e*. One or more transform link identifiers 412*a* may include transformed link identifiers that include transform dataset names or locations that are transformed from a global namespace into a local namespace. Examples of transform link identifiers 412*a* are described in FIG. 13, among others. A transform link identifier 412*a* may be linked to a graph data arrangement 405*b* between nodes 404*a* and 406*a*. One or more associated project file identifiers 412*b* may include data representing other dataset identifiers (e.g., identifiers set forth in data source links 491), whereby a collection of linked dataset identifiers constitute the data associated with a data project, according to at least one example. An example of another linked dataset identifier relates to dataset 442*b*, which may be linked via link 411 to graph data arrangement 405*b*. Note that graph data arrangement 405*b* may be stored as dataset 442*a* in repository 440. One or more associated project file identifiers 412*b* may be linked to a graph data arrangement 405*b* between nodes 404*b* and 406*b*. One or more applied query data identifiers 412*c* may include link identifiers that each identify a query and/or query results as set forth in applied query links 493. An applied query link identifier 412*c* may be linked to a graph data arrangement 405*b* between nodes 404*c* and 406*c*. One or more data dictionary identifiers 412*d* may include one or more identifiers of subsets of data in datasets that may constitute a composite data dictionary for a data project defined by augmented graph data arrangement 405*b*. Examples of data dictionary identifiers 412*d* are described in FIGS. 8 to 15, among others. A data dictionary identifier 412*d* may be linked to a graph data arrangement 405*b* between nodes 404*d* and 406*d*. One or more insight data identifiers 412*e* may include one or more identifiers for descriptive insights (e.g., visualizations or other graphical representation of query results), one or more of which may be associated to graph data arrangement 405*b* between nodes 404*e* and 406*e*. An insight data identifier 412*e* may include an identifier at which an insight (e.g., a published insight) may be located (e.g., via a URL), whereby the insight may be generated in association with graph data arrangement 405*b* and/or an associated data project.

In at least one example, a collaborative user 408 may access via a computing device 408*b* a data project interface 490*b* in which computing device 408*b* may activate a user input 472 to modify a dataset owned by user 414*a*, activate a user input 474 to generate a query against graph data arrangement 405*b*, activate a user input 476 to generate an insight, or activate a user input 478 to publish an insight.

Note that in some examples, an insight or related insight information may include, at least in some examples, information that may automatically convey (e.g., visually in text and/or graphics) dataset attributes of a created dataset or analysis of a query, including dataset attributes and derived dataset attributes, during or after (e.g., shortly thereafter) the creation or querying of a dataset. In some examples, insight information may be presented as dataset attributes in a user interface (e.g., responsive to dataset creation) may describe various aspects of a dataset, such as dataset attributes, in summary form, such as, but not limited to, annotations (e.g., metadata or descriptors describing columns, cells, or any portion of data), data classifications (e.g., a geographical location, such as a zip code, etc.), datatypes (e.g., string, numeric, categorical, boolean, integer, etc.), a number of data points, a number of columns, a "shape" or distribution of data and/or data values, a number of empty or non-empty cells in a tabular data structure, a number of non-conforming data (e.g., a non-numeric data value in column expecting a numeric data, an image file, etc.) in cells of a tabular data structure, a number of distinct values, as well as other dataset attributes.

Dataset analyzer 430 may be configured to analyze data file 401a, as an ingested dataset 405a, to detect and resolve data entry exceptions (e.g., whether a cell is empty or includes non-useful data, whether a cell includes non-conforming data, such as a string in a column that otherwise includes numbers, whether an image embedded in a cell of a tabular file, whether there are any missing annotations or column headers, etc.). Dataset analyzer 430 then may be configured to correct or otherwise compensate for such exceptions. Dataset analyzer 430 also may be configured to classify subsets of data (e.g., each subset of data as a column of data) in data file 401a representing tabular data arrangement 405a as a particular data classification, such as a particular data type or classification. For example, a column of integers may be classified as "year data," if the integers are formatted similarly as a number of year formats expressed in accordance with a Gregorian calendar schema. Thus, "year data" may be formed as a derived dataset attribute for the particular column. As another example, if a column includes a number of cells that each includes five digits, dataset analyzer 430 also may be configured to classify the digits as constituting a "zip code."

In some examples, an inference engine 432 of dataset analyzer 430 can be configured to analyze data file 401a to determine correlations among dataset attributes of data file 401a and other datasets 442b (and dataset attributes, such as metadata 403a). Once a subset of correlations has been determined, a dataset formatted in data file 401a (e.g., as an annotated tabular data file, or as a CSV file) may be enriched, for example, by associating links between tabular data arrangement 405a and other datasets (e.g., by joining with, or linking to, other datasets) to extend the data beyond that which is in data file 401a. In one example, inference engine 432 may analyze a column of data to infer or derive a data classification for the data in the column. In some examples, a datatype, a data classification, etc., as well any dataset attribute, may be derived based on known data or information (e.g., annotations), or based on predictive inferences using patterns in data Further to diagram 400, format converter 437 may be configured to convert dataset 405a into another format, such as a graph data arrangement 442a, which may be transmitted as data 401c for storage in data repository 440. Graph data arrangement 442a in diagram 400 may be linkable (e.g., via links 411) to other graph data arrangements to form a collaborative dataset. Also, format converter 437 may be configured to generate ancillary data or descriptor data (e.g., metadata) that describe attributes associated with each unit of data in dataset 405a. The ancillary or descriptor data can include data elements describing attributes of a unit of data, such as, for example, a label or annotation (e.g., header name) for a column, an index or column number, a data type associated with the data in a column, etc. In some examples, a unit of data may refer to data disposed at a particular row and column of a tabular arrangement (e.g., originating from a cell in dataset 405a). In some cases, ancillary or descriptor data may be used by inference engine 432 to determine whether data may be classified into a certain classification, such as where a column of data includes "zip codes."

Layer data generator 436 may be configured to form linkage relationships of ancillary data or descriptor data to data in the form of "layers" or "layer data files." Implementations of layer data files may facilitate the use of supplemental data (e.g., derived or added data, etc.) that can be linked to an original source dataset, whereby original or subsequent data may be preserved. As such, format converter 437 may be configured to form referential data (e.g., IRI data, etc.) to associate a datum (e.g., a unit of data) in a graph data arrangement to a portion of data in a tabular data arrangement. Thus, data operations, such as a query, may be applied against a datum of the tabular data arrangement as the datum in the graph data arrangement. An example of a layer data generator 436, as well as other components of collaborative dataset consolidation system 410, may be as described in U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS."

According to some embodiments, a collaborative data format may be configured to, but need not be required to, format converted dataset 405a into an atomized dataset. An atomized dataset may include a data arrangement in which data is stored as an atomized data point that, for example, may be an irreducible or simplest data representation (e.g., a triple is a smallest irreducible representation for a binary relationship between two data units) that are linkable to other atomized data points, according to some embodiments. As atomized data points may be linked to each other, data arrangement 442a may be represented as a graph, whereby converted dataset 405a (i.e., atomized dataset 405b) may form a portion of a graph. In some cases, an atomized dataset facilitates merging of data irrespective of whether, for example, schemas or applications differ. Further, an atomized data point may represent a triple or any portion thereof (e.g., any data unit representing one of a subject, a predicate, or an object), according to at least some examples.

As further shown, collaborative dataset consolidation system 410 may include a dataset attribute manager 461. Dataset ingestion controller 420 and dataset attribute manager 461 may be communicatively coupled to dataset ingestion controller 420 to exchange dataset-related data 407a and enrichment data 407b, both of which may exchange data from a number of sources (e.g., external data sources) that may include dataset metadata 403a (e.g., descriptor data or information specifying dataset attributes), dataset data 403b (e.g., some or all data stored in system repositories 440, which may store graph data), schema data 403c (e.g., sources, such as schema.org, that may provide various types and vocabularies), ontology data 403d from any suitable ontology and any other suitable types of data sources. One or more elements depicted in diagram 400 of FIG. 4 may include structures and/or functions as similarly-named or similarly-numbered elements depicted in other drawings, or as otherwise described herein, in accordance with one or more examples. Dataset attribute manager 461 may be configured to monitor changes in dataset data and/or attributes, including user account attributes. As such, dataset attribute manager 460 may monitor dataset attribute changes, such as a change in number or identity of users sharing a dataset, as well as whether a dataset has been created, modified, linked, updated, associated with a comment, associated with a request, queried, or has been associated with any other dataset interactions. Dataset attribute manager 461 may also monitor and correlate data among any number of datasets, some other examples of dataset attributes described herein.

In the example shown if FIG. 4, dataset ingestion controller 420 may be communicatively coupled to a user interface, such as data project interface 490a, via one or both of a user interface ("UI") element generator 480 and a programmatic interface 490 to exchange data and/or commands (e.g., executable instructions) for facilitating data project modification to include dataset 405a. UI element generator 480 may be configured to generate data representing UI elements to facilitate the generation of data project interface 490a and graphical elements thereon. For example, UI generator 480 may cause generation UI elements, such as a container window (e.g., icon to invoke storage, such as a file), a browser window, a child window (e.g., a pop-up window), a menu bar (e.g., a pull-down menu), a context menu (e.g., responsive to hovering a cursor over a UI location), graphical control elements (e.g., user input buttons, check boxes, radio buttons, sliders, etc.), and other control-related user input or output UI elements. In some examples, a data project interface, such as data project interface 490a or data project interface 290 of FIG. 2B, may be implemented as, for example, a unitary interface window in which multiple user inputs may provide access to numerous aspects of forming or managing a data project, according to a non-limiting example.

Programmatic interface 490 may include logic configured to interface collaborative dataset consolidation system 410 and any computing device configured to present data ingestion interface 402 via, for example, any network, such as the Internet. In one example, programmatic interface 490 may be implemented to include an applications programming interface ("API") (e.g., a REST API, etc.) configured to use, for example, HTTP protocols (or any other protocols) to facilitate electronic communication. In one example, programmatic interface 490 may include a web data connector, and, in some examples, may include executable instructions to facilitate data exchange with, for example, a third-party external data analysis computerized tool. A web connector may include data stream converter data 443b, which, for example, may include HTML code to couple a user interface 490a with an external computing device to execute programmable instructions (e.g., JavaScript code) to facilitate exchange of data. According to some examples, user interface ("UI") element generator 480 and a programmatic interface 490 may be implemented in association with collaborative dataset consolidation system 410, in a computing device associated with data project interface 490a, or a combination thereof. UI element generator 480 and/or programmatic interface 490 may be referred to as computerized tools, or may facilitate employing data project interface 490a, or the like, as a computerized tool, according to some examples.

In at least one example, additional datasets to enhance dataset 442a may be determined through collaborative activity, such as identifying that a particular dataset may be relevant to dataset 442a based on electronic social interactions among datasets and users. For example, data representations of other relevant dataset to which links may be formed may be made available via an interactive collaborative dataset activity feed. An interactive collaborative dataset activity feed may include data representing a number of queries associated with a dataset, a number of dataset versions, identities of users (or associated user identifiers) who have analyzed a dataset, a number of user comments related to a dataset, the types of comments, etc.). Thus, dataset 442a may be enhanced via "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets."

According to various embodiments, one or more structural and/or functional elements described in FIG. 4, as well as below, may be implemented in hardware or software, or both. Examples of one or more structural and/or functional elements described herein may be implemented as set forth in one or more of U.S. patent application Ser. No. 15/186,514, filed on Jun. 19, 2016, and titled "COLLABORATIVE DATASET CONSOLIDATION VIA DISTRIBUTED COMPUTER NETWORKS," U.S. patent application Ser. No. 15/186,517, filed on Jun. 19, 2016, and titled "QUERY GENERATION FOR COLLABORATIVE DATASETS," and U.S. patent application Ser. No. 15/454,923, filed on Mar. 9, 2017, and titled "COMPUTERIZED TOOLS TO DISCOVER, FORM, AND ANALYZE DATASET INTERRELATIONS AMONG A SYSTEM OF NETWORKED COLLABORATIVE DATASETS," each of which is herein incorporated by reference.

Figure 5:
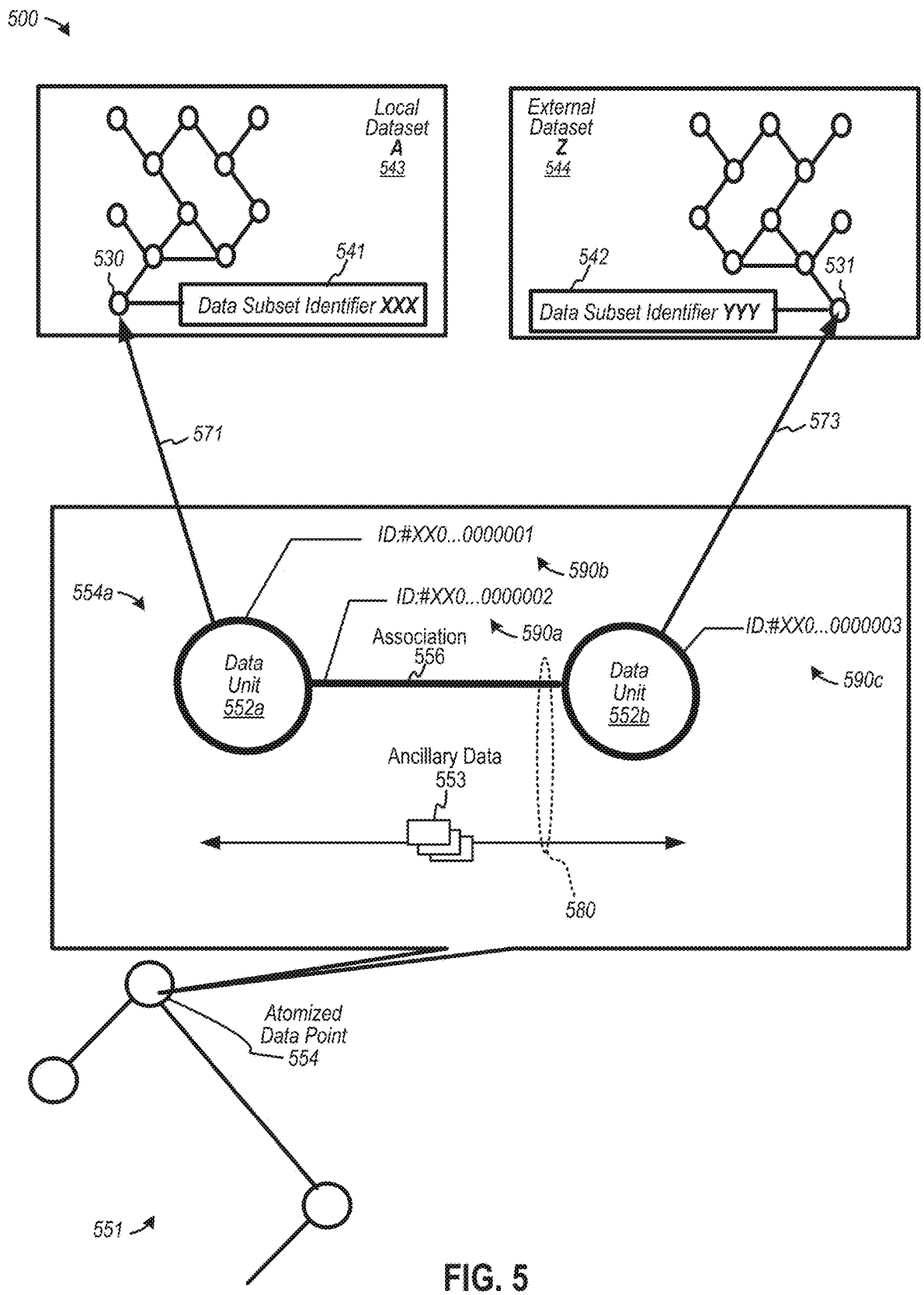
FIG. 5 is a diagram depicting an example of an atomized data point, according to some embodiments.

FIG. 5 is a diagram depicting an example of an atomized data point, according to some embodiments. In some examples, an atomized dataset may be formed by converting a tabular data format into a format associated with the atomized dataset. In some cases, portion 551 of an atomized dataset can describe a portion of a graph that includes one or more subsets of linked data. Further to diagram 550, one example of atomized data point 554 is shown as a data representation 554a, which may be represented by data representing two data units 552a and 552b (e.g., objects) that may be associated via data representing an association 556 with each other. One or more elements of data representation 554a may be configured to be individually and uniquely identifiable (e.g., addressable), either locally or globally in a namespace of any size. For example, elements of data representation 554a may be identified by identifier data 590a, 590b, and 590c (e.g., URIs, URLs, IRIs, etc.).

Diagram 550 depicts a portion 551 of an atomized dataset that includes an atomized data point 554, which includes links formed to populate a composite data dictionary. In this example, atomized data point 554 and/or its constituent components may facilitate implementation of a composite data dictionary, which includes data representing identifiers for each subset of data in each dataset. The data representing the identifiers may be disposed within a corresponding graph data arrangement based on a graph data model. According to some examples, identifiers for each subset of data in each dataset may refer to annotations or "column header" data associated with a corresponding tabular data arrangement. In diagram 550, at least one data subset identifier ("XXX") 541 is linked to a node 530 of a local dataset ("A") 543, whereas at least one data subset identifier ("YYY") 542 is linked to a node 531 of an external dataset ("Z") 544. Note that links 571 and 573 between atomized data point 554 and other atomized data points in local dataset 543 and 544 are each formed to populate a composite data dictionary when each of datasets 543 and 544 is ingested, imported, or otherwise included in a data project. Similarly, any of links 571 and 573 may be removed if a corresponding dataset 543 or dataset 544 is disassociated from a data project. In some examples, removal of one of links 571 and 573 generates a new version of a composite dictionary, whereby the removed link may be preserved for at least archival purposes. Note, too, that while a first entity (e.g., a dataset owner) may exert control and privileges over portion 551 of an atomized dataset that includes atomized data point 554, a collaborator-user or a collaborator-computing device may form any of links 571 and 573. In one example, data units 552a and 552b may represent any of node pairs 404a and 406a, 404b and 406b, 404c and 406c, 404d and 406d, and 404e and 406e in FIG. 4, according to at least one implementation.

In some embodiments, atomized data point 554a may be associated with ancillary data 553 to implement one or more ancillary data functions. For example, consider that association 556 spans over a boundary between an internal dataset, which may include data unit 552a, and an external dataset (e.g., external to a collaboration dataset consolidation), which may include data unit 552b. Ancillary data 553 may interrelate via relationship 580 with one or more elements of atomized data point 554a such that when data operations regarding atomized data point 554a are implemented, ancillary data 553 may be contemporaneously (or substantially contemporaneously) accessed to influence or control a data operation. In one example, a data operation may be a query and ancillary data 553 may include data representing authorization (e.g., credential data) to access atomized data point 554a at a query-level data operation (e.g., at a query proxy during a query). Thus, atomized data point 554a can be accessed if credential data related to ancillary data 553 is valid (otherwise, a request to access atomized data point 554a (e.g., for forming linked datasets, performing analysis, a query, or the like) without authorization data may be rejected or invalidated). According to some embodiments, credential data (e.g., passcode data), which may or may not be encrypted, may be integrated into or otherwise embedded in one or more of identifier data 590a, 590b, and 590c. Ancillary data 553 may be disposed in other data portion of atomized data point 554a, or may be linked (e.g., via a pointer) to a data vault that may contain data representing access permissions or credentials.

Atomized data point 554a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 554a may be expressed in accordance with Turtle (e.g., Terse RDF Triple Language), RDF/XML, N-Triples, N3, or other like RDF-related formats. As such, data unit 552a, association 556, and data unit 552b may be referred to as a "subject," "predicate," and "object," respectively, in a "triple" data point (e.g., as linked data). In some examples, one or more of identifier data 590a, 590b, and 590c may be implemented as, for example, a Uniform Resource Identifier ("URI"), the specification of which is maintained by the Internet Engineering Task Force ("IETF"). According to some examples, credential information (e.g., ancillary data 553) may be embedded in a link or a URI (or in a URL) or an Internationalized Resource Identifier ("IRI") for purposes of authorizing data access and other data processes. Therefore, an atomized data point 554 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Examples of triplestores suitable to store "triples" and atomized datasets (or portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, Md., U.S.A.), and the like.

Figure 6:
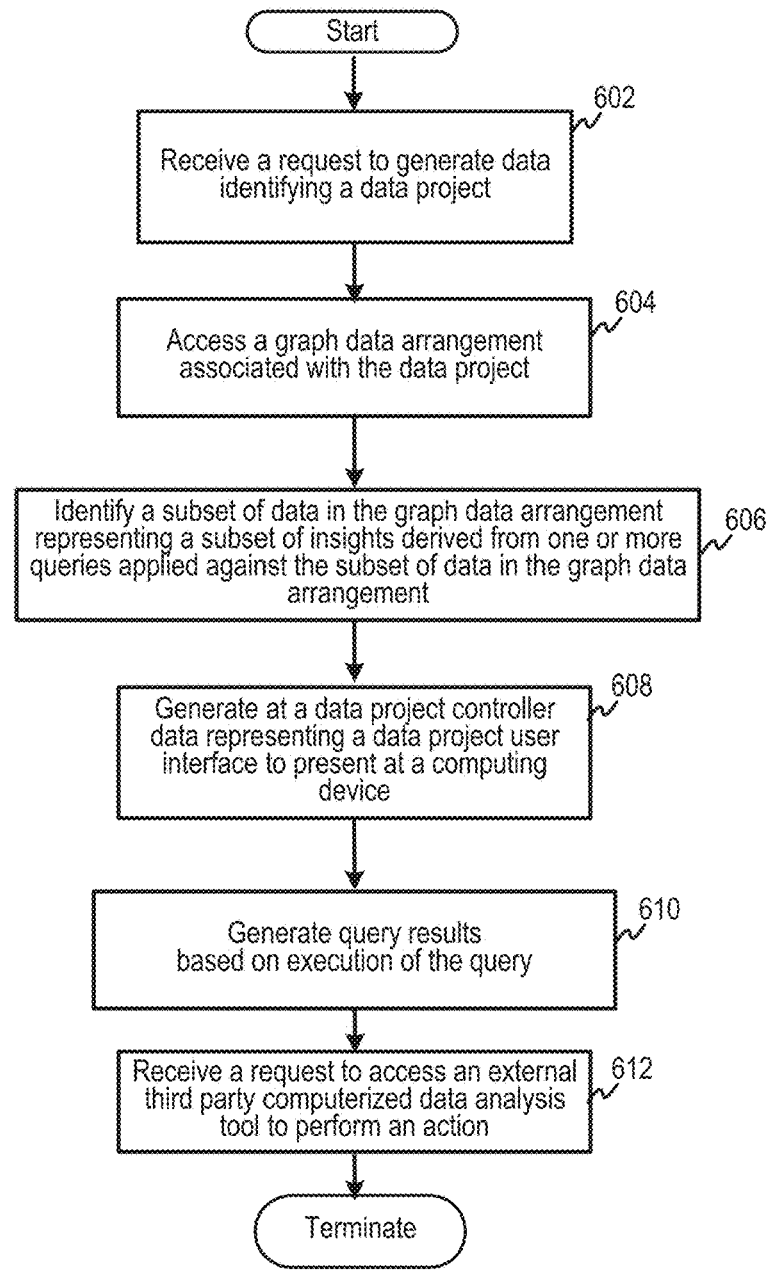
FIG. 6 is a flow diagram depicting an example of forming a data project, according to some embodiments.

FIG. 6 is a flow diagram depicting an example of forming a data project, according to some embodiments. In some examples, flow diagram 600 may be implemented via computerized tools including a data project interface, which may be configured to initiate and/or execute instructions to form a data project in association with, for example, a data project controller of a collaborative dataset consolidation system. A data project controller and/or a collaborative dataset consolidation system depicted in FIG. 4 may be configured to effectuate an example flow of diagram 600. At 602, a request to generate data identifying a data project may be received. For example, data representing a request to create a data project can be received via a data project interface to set forth a project objective and/or import a dataset into a data project associated with a project objective. In some examples, an imported dataset may include one or more of (1.) an external dataset formatted during ingestion as a graph data arrangement, (2.) an external dataset imported as via a link (e.g., URL) in which data remains persistent remotely, (3.) a previously-ingested dataset disposed in a collaborative dataset consolidation system (e.g., a dataset data set created/owned by another user), and (4.) any other dataset data source. A request to include a dataset as an element of a data project may be initiated by an owner-user or computing device or by any computing device identified as a collaborator. Further, a request at 602 may identify a data project to provide a request to publish an insight, as an action, whereby generation of an insight may be performed in or external to a collaborative dataset consolidation system. Responsive to the request, an insight may be integrated into a subset of insights to form an updated subset of insights, whereby the updated subset of insights may be published. The updated subset of insights may be formed collaboratively through any number of individuals or entities that can provide conclusions (or interim conclusions) based on any analysis of data in the datasets of a data project. Such collaboration propels resolution of a question or project objective that otherwise may not occur.

At 604, a graph data arrangement for a data project may be accessed, responsive to a request at 602. In some examples, a graph data arrangement may include formatted data of an ingested dataset, as well as ancillary data (e.g., metadata) that may be associated with the graph data arrangement by a data project controller so as to create, maintain, and modify a graph data arrangement as a data project. As such, at least a subset of data in a data arrangement may constitute a data project, which may be created, maintained, and modified, among other data operations, by a data project controller. In at least one case, a graph data arrangement may be accessed by identifying an associated first user account (e.g., an owner user account) and to determine whether another user account (e.g., a second user account) may be authorized to access the data project and/or its components (e.g., datasets, queries, etc.). Should a computing device that generates a request to access the graph data arrangement have authorization, then a data operation (e.g., a query, dataset importation, etc.) applied in connection with the graph data arrangement may originate from a computing device associated with a second user account (e.g., a user granted access to collaborate on data project efforts). A graph data arrangement may be based on a collaborative dataset, including an aggregation of atomized datasets. Further, a request at 602 may include or may be associated with a request to import a dataset that is to be included in a subset of datasets associated a first user account. A data ingestion controller of FIG. 4, in some examples, may be configured to ingest a dataset to generate an atomized dataset having data linked to a tabular data arrangement, whereby linked or graph data may be presented as a tabular data arrangement be in a workspace interface portion. During importation of a dataset into a data project, presentation of a contextual interface portion may be maintained contemporaneous with presentation of the tabular data arrangement. Also, data configured to present one or more of the query editor and the query results in the same interface as a tabular data arrangement may be generated.

At 606, a subset of data in a graph data arrangement for a data project may be identified. The identified subset of data may be associated with data representing a subset of insights, whereby one or more of the insights may be generated or derived by applying one or more queries against a subset of data in the graph data arrangement. In some examples, data representing one or more data operations may be identified, whereas a data operation, such as a query, may be formed in collaboration with a number of networked computing devices. Each collaborative computing device may be associated with a different user account having access to a collaborative dataset consolidation system. A subset of data may include an aggregation of multiple linked datasets. Further, a request at 602 may identify a data project for which to provide a request to publish an insight as an action. Responsive to the request, an insight may be integrated into a subset of insights to form an updated subset of insights, whereby an updated subset of insights may be published in a group of insights in a data project interface. An updated subset of insights may be formed collaboratively through any number of individuals or entities that can provide conclusions (or interim conclusions) based on any analysis of data in the datasets of a data project. Such collaboration propels resolution of a question or project objective that otherwise may not occur.

At 608, data representing a data project user interface may be generated at, for example, a data project controller. The data representing a data project user interface, or a portion thereof, may be generated at a collaborative dataset consolidation system and transmitted to a computer device for presentation on a display. At 610, data representing query results (e.g., as results of a data operation) may be generated based on execution of a query. In one example, data representing a data project user interface may include a collaborative query editor in a user interface or display, whereby a data project user interface may include a contextual interface portion and a workspace interface portion. Further, an interface portion of the data project user interface may include query results in the workspace interface portion, the query results being presented contemporaneous with presentation of a query.

At 612, a request to access an external third-party computerized data analysis tool may be received to perform an action, according to at least one embodiment. An action may include any data operation that may be performed at a data project controller and/or a collaborative dataset consolidation system, such as importing/ingesting a dataset, dataset manipulation (e.g., transformative data actions, including transformative queries), performing any type of query, analyzing query results, generating insights based on query results, publishing insights, and the like. In some examples, a request to access an external third-party computerized data analysis tool may cause activation of a data stream converter to exchange data between a collaborative dataset consolidation system and one or more external entities to facilitate the action. According to various examples, a data stream converter may include structures and/or functionalities configured to implement an applications programming interface (e.g., an API), a data network link connector (e.g., a connector, such as a web data connector), or an integration application including one or more APIs and/or one or more connectors. An example of a data stream converter includes data configured to facilitate a web connector, which may be configured to electronically couple a collaborative dataset consolidation system and an external third-party computerized data analysis tool, such as Tableau® analytic software provided by Tableau Software, Inc., Seattle, Wash., U.S.A.

A request to access an external third-party computerized data analysis tool may include executing instructions of an application programming interface, or API, to exchange data via a network with a remote computing device that may be configured to execute instructions of an application to implement the external third-party computerized data analysis tool. In some examples, a request to access an external third-party computerized data analysis tool may include generating data to form a network connector link as a data stream converter with which an external third-party computerized data analysis tool can use to access data (e.g., in a collaborative dataset consolidation system) to perform an action. For example, data accessed by an external third-party computerized data analysis tool may include one or more of query results and a subset of data in the graph data arrangement. A query result may be accessible via a URL that may be uploaded to an external third-party computerized data analysis tool.

Figure 7:
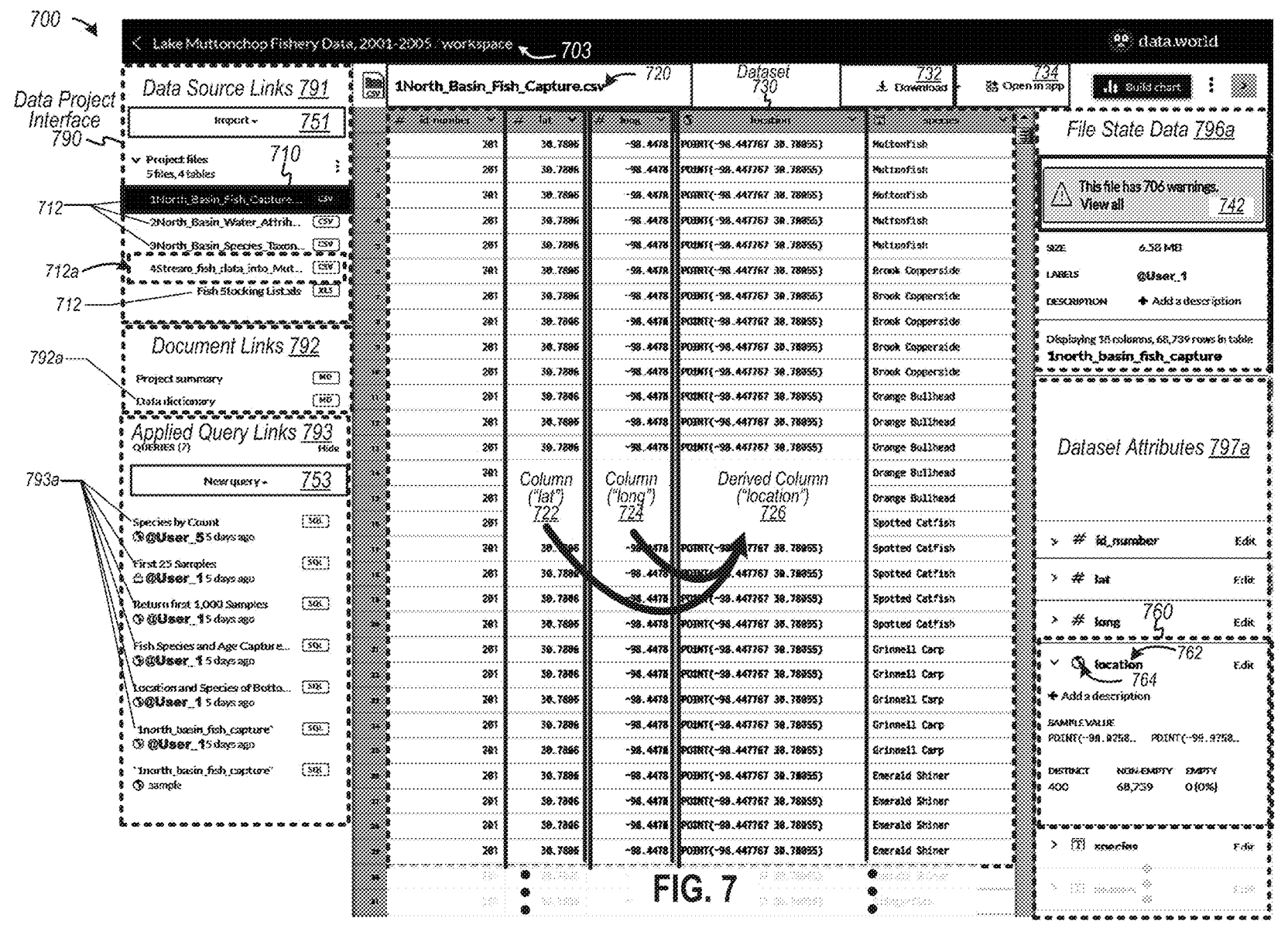

FIG. 7 is an example of a data project interface implementing a computerized tool configured to at least import, inspect, analyze, and modify data of a data source as a dataset, according to some examples. Diagram 700 includes a data project interface 790 that includes an example of a workspace directed to presenting a data source in a tabular data arrangement, which may be presented as a dataset 730. Dataset 730 may be a graph data arrangement presented in tabular form having rows and columns, which includes data (e.g., data values) that each corresponds to at least one data point (e.g., a node) in a corresponding graph data arrangement (not shown). As shown, data project interface 790 includes an interface portion, such as a contextual user interface portion that includes one or more of an interface portion presenting data source links 791, an interface portion presenting document links 792, an applied query links 793, file state data 796a, and data attributes 797a. Also, data project interface 790 includes an interface portion to present a dataset 730. Data source links 791 include a user input 751 configured to import or otherwise associate a dataset with a data project identifier 703 (e.g., Lake Muttonchop Fishery Data, 2001-2005, as a data project). Thus, process 231 of FIG. 2A is accessible within data project interface 790.

Data source links 791 also includes a number of datasets 712 and 712a that may be accessible via selection as, for example, a hypertext link. In the example shown, a dataset identifier 710 is selected to present a corresponding dataset within a workspace interface, which is shown to present dataset identifier (or file name) "1North_Basin_Fish_Capture.csv" 720 as dataset 730 in tabular form. The workspace interface also includes a user input 732 configured to download dataset 730 for further inspection, manipulation, analysis, etc., and a user input 734 configured to open dataset 730 in, or otherwise submit dataset 730 to, an external third-party computerized data analysis tool.

Further to diagram 700, an example of a workspace interface may include a file state data 796a interface portion to provide information regarding a state of a dataset, such as whether potential errant or deficient data may be included in dataset 730. A shown, warning interface portion 742 depicts that dataset 730 may include "706" errors associated with "706" warnings, which may be "cleaned" by downloading dataset 730 via user input 732. Thus, process 232 of FIG. 2A may be accessible within data project interface 790. The workspace interface may include dataset attributes 797a interface portion, which includes selectable identifiers for subsets of data (e.g., columns) in dataset 730. As shown, dataset attribute 760 is shown to be selected, whereby dataset attribute 760 expands a view to present an identifier "location" 762, and other profile-related information (e.g., a number of distinct data values, a number of non-empty cells, a percentage of empty cells, etc.). Graphic 764 describes graphically a datatype or classification, and, in this case, graphic 764 depicts that identifier 762 is as "geolocation" datatype or classification. Thus, process 233 of FIG. 2A may be accessible within data project interface 790. Note that dataset attribute 760 may be a "derived" dataset attribute 760. That is, a "location," or "geographical location," may be derived from a longitude data value and a latitude data value. As shown, a column ("lat") 722 of latitude data values and a column ("long") 724 of corresponding longitude data values may be used to generate a derived column ("location") 726, which may be used to enhance data in dataset 730.

Document links 792 portion includes an identifier 792a associated with a data dictionary that when selected, may present a composite data dictionary in the workspace interface. Also, applied query links 793 interface portion includes a user input 753 to generate a new query, and also includes identifiers 793a of queries, that when selected, may present (e.g., and optionally re-run) associated queries and present the query result in the workspace interface portion. Thus, process 232 of FIG. 2A may be accessible within data project interface 790. In view of the foregoing, data project interface 790 presents simultaneously (or nearly simultaneously) data and information relating to one or more processes of FIG. 2A in a unitary display, or may include one or more links to such processes, thereby providing access to multiple processes of FIG. 2A in data project interface 790. In various examples, data project interface 790 facilitates simultaneous access to multiple computerized tools, whereby data project interface 790 is depicted in this non-limiting example as a unitary, single interface configured to minimize or negate disruptions due to transitioning to different tools that may otherwise infuse friction in a data project and associated analysis.

Figure 9:
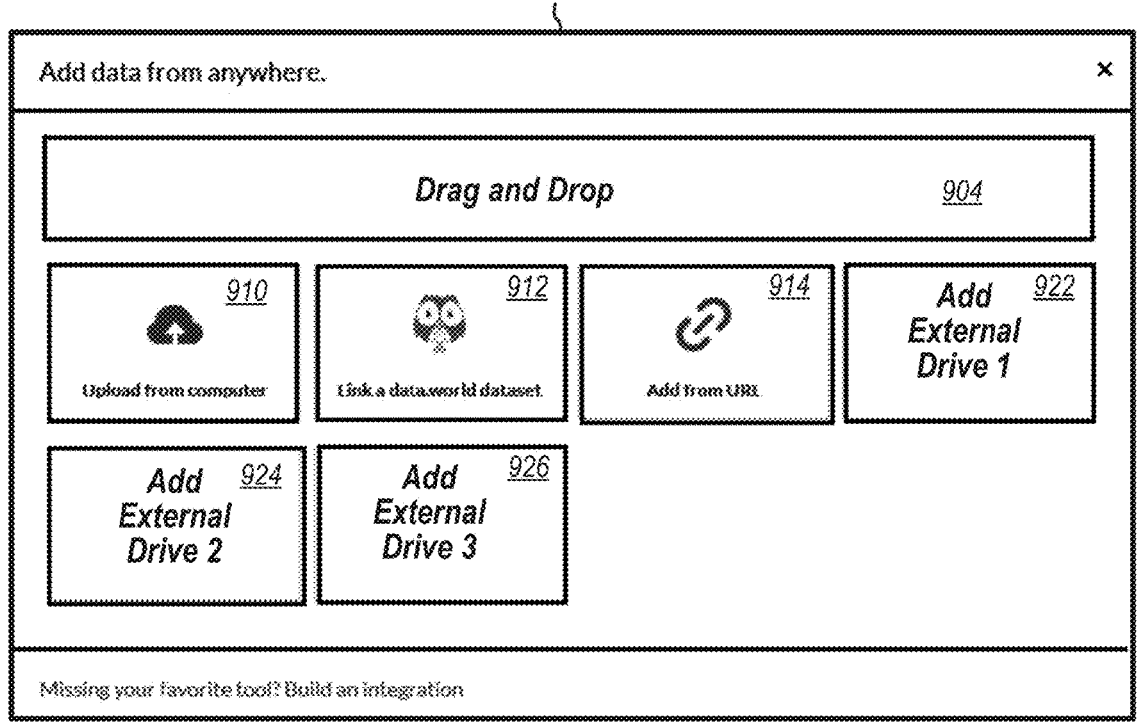
Figure 10:
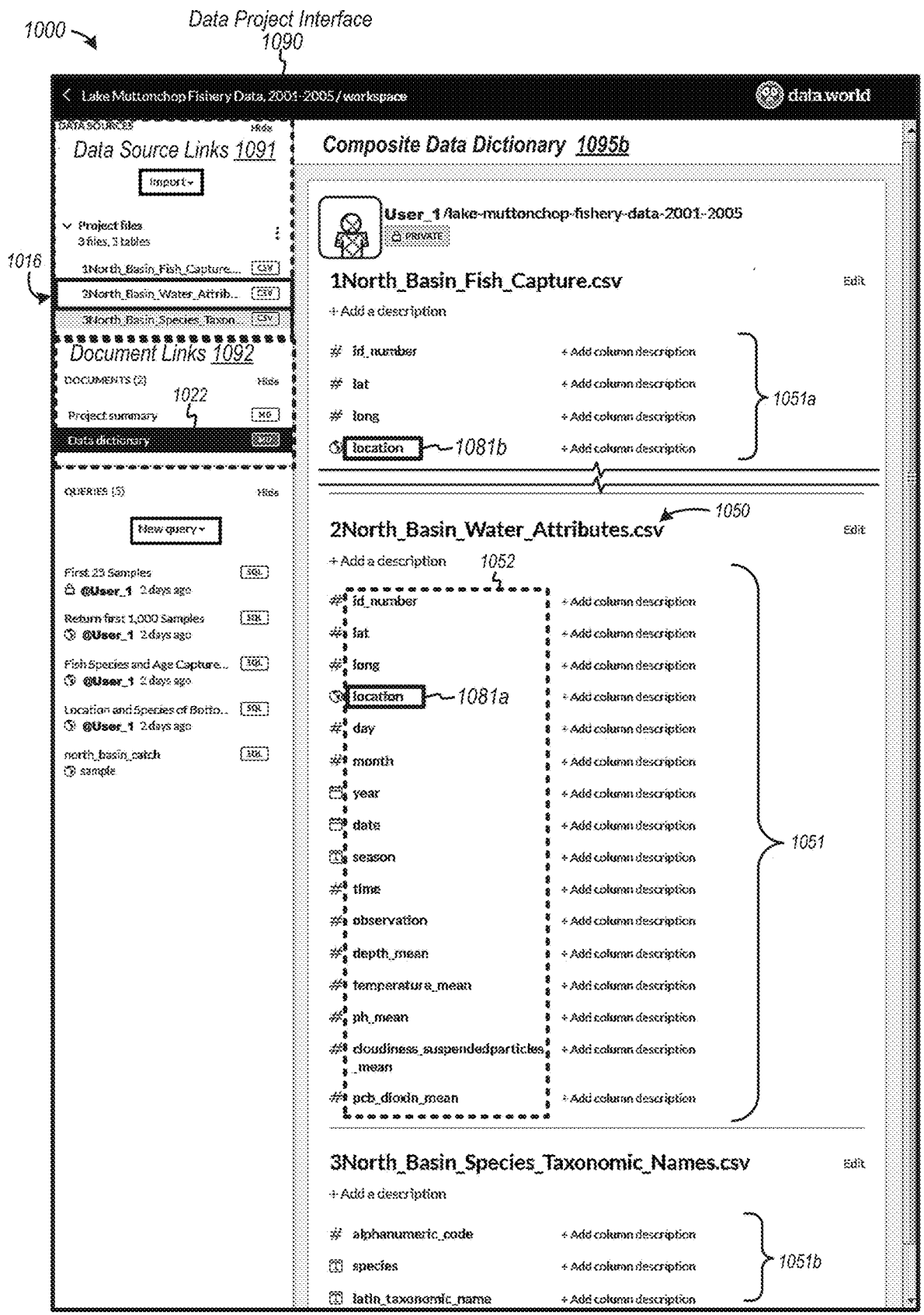

FIGS. 8 to 10 are diagrams depicting various examples of a data project interface implemented to form a composite data dictionary, according to some embodiments. In diagram 800 depicting a data project interface 890 configured to form a composite data dictionary 895b for a data project associated with identifier 803. As shown, data project interface 890 includes a data source links 891 interface portion having two (2) identifiers 812 and 814 for corresponding data sets associated with data project identifier 803. Data source links 891 is shown to include a user interface 851 to include another dataset in the data project. Data project interface 890 also includes document links 892 interface portion, which is shown in this example as having "data dictionary" user input 822 selected (e.g., via highlight text format). Selection of user input 822 presents a composite data dictionary 895b in the workspace interface portion.

Composite data dictionary 895b for a data project in a local namespace is shown as a local link identifier 830, and includes a data dictionary portion 841 for a first dataset associated with identifier 840 (e.g., 1North_Basin_Fish_Capture.cvs) and another data dictionary portion 861 for a second dataset associated with identifier 860 (e.g., 3North_Basin_Species_Taxonomic_Names.cvs). Data dictionary portion 841 includes a derived identifier 845 (e.g., as derived annotation) associated with a derived subset of data values representing geolocation points, each being derived from responding longitude and latitude coordinates. A dataset associated with identifier 840 includes identifiers 842 for subsets of data in the dataset, whereas a dataset associated with identifier 860 includes identifiers 862 for subsets of data in the dataset. Identifiers 842 and 862 may describe a datatype or classification of data in each subset. In one example, at least one of identifiers 842 and 862 may be extracted from a column header of a dataset file. Identifiers 842 and 862 may be inferred (e.g., during ingestion) by, for example, an inference engine of FIG. 4. Further, each of identifiers 842 and 862 may be annotated via selection 844 to clarify the datatype or classification of data. For example, selection 844 may be selected to replace "# id_number" with "fish tag number."

FIG. 9 depicts an interface portion with which to add a dataset to a data project, according to some examples. Diagram 900 includes interface portion 902, which may be presented in response to selection of user input ("import") 851 of FIG. 8. Referring back to FIG. 9, an interface portion may include an interface portion 904 to receive one or more files (e.g., dataset files) through user input activation of "dragging and dropping" a file into interface portion 904. User input 910 may be selected to upload a dataset file from a file location on a remote client computing device associated with the user. User input 912 may be selected to link a dataset in a collaborative dataset consolidation system to the data project. User input 914 may be selected to link (e.g., via a URL) a dataset from a remote, external computing device to the data project, whereby data stored in the external computing device maybe uploaded into a collaborative dataset consolidation system. Or, the data stored in the external computing device need not be uploaded for storage in collaborative dataset consolidation system. In this case, the data stored in an external computing device as a remote data source may persist external to a collaborative dataset consolidation system, and may be accessed when used (e.g., when reviewed, queried, etc.). Further, user inputs 922, 924, and 926 may include links to access external storage facilities, such as external data drives. In a following example depicted in FIG. 10, consider that a dataset identified as "2North_Basin_Water_Attributes.csv" is added to the data project, which causes a data project controller (not shown) to automatically compile an updated version of a composite data dictionary.

FIG. 10 is a diagram depicting automatic compilation of a composite data dictionary responsive to adding a dataset to a data project, according to some examples. Diagram 1000 includes a data project interface 1090 in which a dataset associated with an identifier 1016 is added to a data project, whereby identifier 1016 is included in data source links 1091 interface portion. Document links 1092 interface portion indicates a data dictionary 1022 is selected for presentation. A data project controller (not shown) may be configured, in real-time (or near real-time), to include data dictionaries associated with newly-added datasets, and may be further configured to exclude data dictionaries associated with newly-deleted datasets. As shown, composite data dictionary 1095*b* may be automatically compiled to include a data dictionary portion 1051 to include identifiers 1052 with associated subsets of data in an imported dataset having an identifier 1050 (e.g., "2North_Basin_Water_Attributes.csv"). Composite data dictionary 1095*b* may include a combination of groups of identifiers 1051, 1051*a* and 1051*b* from a combination or aggregation of datasets. Composite data dictionary 1095*b* may be used to facilitate queries, data review, and other data operations.

In one example, composite data dictionary 1095*b* may facilitate identifying common or similar data among datasets, which may be used to link, join, or otherwise aggregate datasets via, for example, a transmuted association. For example, data associated with identifier ("geolocation") 1081*a* of a first dataset may be equivalent or similar to data associated with identifier ("geolocation") 1081*b* with a second dataset, and a transmuted association may be formed based on data associated with identifiers 1081*a* and 1081*b*. In some examples, a transmutation of an association may be formed as between a primary key and a foreign key. An example of a transmuted association between multiple graphs is described in U.S. patent application Ser. No. 15/943,629, filed on Apr. 2, 2018, and titled "TRANSMUTING DATA ASSOCIATIONS AMONG DATA ARRANGEMENTS TO FACILITATE DATA OPERATIONS IN A SYSTEM OF NETWORKED COLLABORATIVE DATASETS."

FIG. 11 is a diagram depicting a data project interface portion configured to link an external dataset into a data project, according to some examples. Diagram 1100 includes a data project interface portion 1190*a* that may be presented in a display of a computing device responsive to activation of a user input to add a dataset via a link (e.g., a URL to an external dataset). An example of a user input that may cause activation of data project interface portion 1190*a* may include user input 914 of FIG. 9. Referring back to FIG. 11, data project interface portion 1190*a* includes a field 1110 into which a source data location (e.g., URL) may be inserted to generate a link from a data project to an external dataset in, for example, an external domain of "pasteur.epa.gov." A dataset file name may be added via field 1112. User inputs 1114 may be configured to implement a method with which to access an external data source, a method including executable instructions to request data from an external computing device or to submit executable instructions to the external computing device to cause data access for inclusion in a data project. For example, a method may be implemented as either a GET method or a POST method, or any other method, in accordance with HTTP, PHP, or any other protocols or programming language method. As a dataset at pasteur.epa.gov is intended for public access and use, a level of authorization ("auth") to access the external dataset, such as a user identifier and a password, need not be entered. User input ("none") 1115 may be selected. In some examples, activation of user input ("Save") 1180 may cause compiling (or re-compiling) a composite dataset dictionary to accommodate a newly-linked dataset persisting at a URL in field 1110. Subsequently, a composite data dictionary including identifiers for subsets of data may be used to review a composite data dictionary, as well as to create queries based on an updated composite data dictionary.

Figure 12:
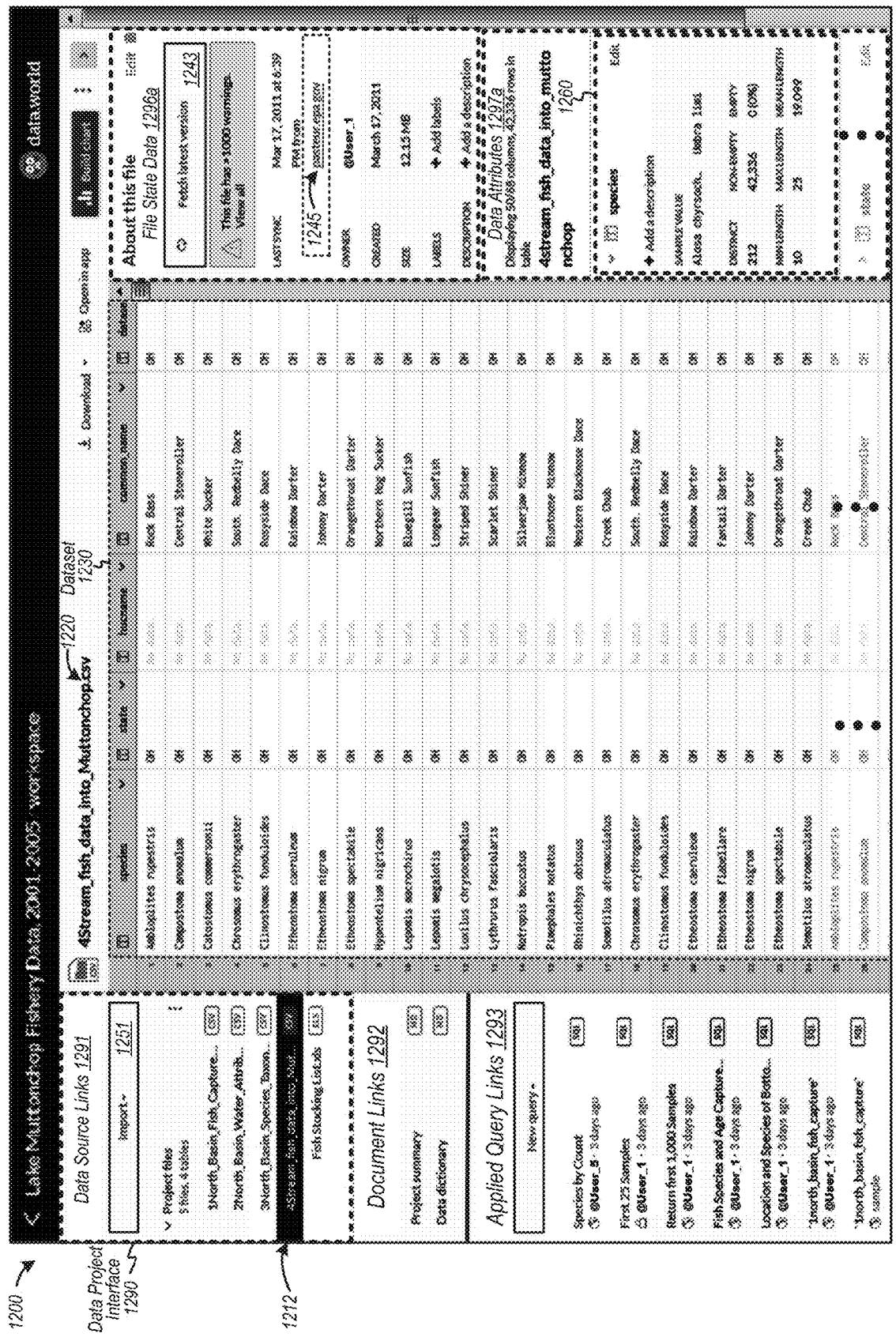
FIG. 12 is another example of a data project interface implementing a computerized tool configured to at least import, inspect, analyze, and modify data of an external data source linked into a data project as a dataset, according to some examples.

FIG. 12 is another example of a data project interface implementing a computerized tool configured to at least import, inspect, analyze, and modify data of an external data source linked into a data project as a dataset, according to some examples. Diagram 1200 includes a data project interface 1290 that includes an example of a workspace directed to presenting an external data source in a tabular data arrangement, which may be presented as a dataset 1230. The external dataset may be identified via file identifier 1220 (e.g., "4Stream_fish_data_into_Muttonchop.csv"). Dataset 1230 may be a graph data arrangement presented in tabular form having rows and columns, which includes data values each corresponding to at least one data point (e.g., a node) in a corresponding graph data arrangement (not shown). As shown, data project interface 1290 includes an interface portion, such as a contextual user interface portion that includes an interface portion presenting data source links 1291, an interface portion presenting document links 1292, and an applied query links 1293 interface portion. Data project interface 1290 also includes interface portions to present file state data 1296*a* and data attributes 1297*a*, which may include including an example of associated data attributes 1260 for an identifier "species" linked to a subset of data (e.g., a column of data including species names). Data source links 1291 include a user input 1251 configured to import a dataset not yet listed in data source links 1291 interface portion to incorporate with a data project, for example, via a URL. User input 1212 in data source links 1291 interface portion may be selected to present dataset 1230 in a workspace interface portion of data project interface 1290.

In this example, file state data 1296*a* includes file-related state data for a dataset linked into a data project, with data of the dataset persisting external to a collaborative dataset consolidation system. File state data 1296*a* interface portion includes a user input 1243 to synchronize or fetch a latest version of data residing at a remote, external location identified by a link identifier (e.g., a URL). As such, dataset 1230 (or data related thereto) may be updated to include changes in the external dataset in response to activation of user input 1243. Note that data in dataset 1230 may be updated (i.e., the external data source is accessed) when a query link in applied query links 1293 is activated. That is, when a query is opened in a workspace interface portion of data project interface 1290, the query may be executed (e.g., re-run) against a latest version of data in the external dataset. Further, activation of user input 1243 may fetch updated dataset attributes, which, in turn, may cause a composite data dictionary to recompile automatically to include an updated identifier (e.g., an updated column heading) of a subset of data.

Figure 13:
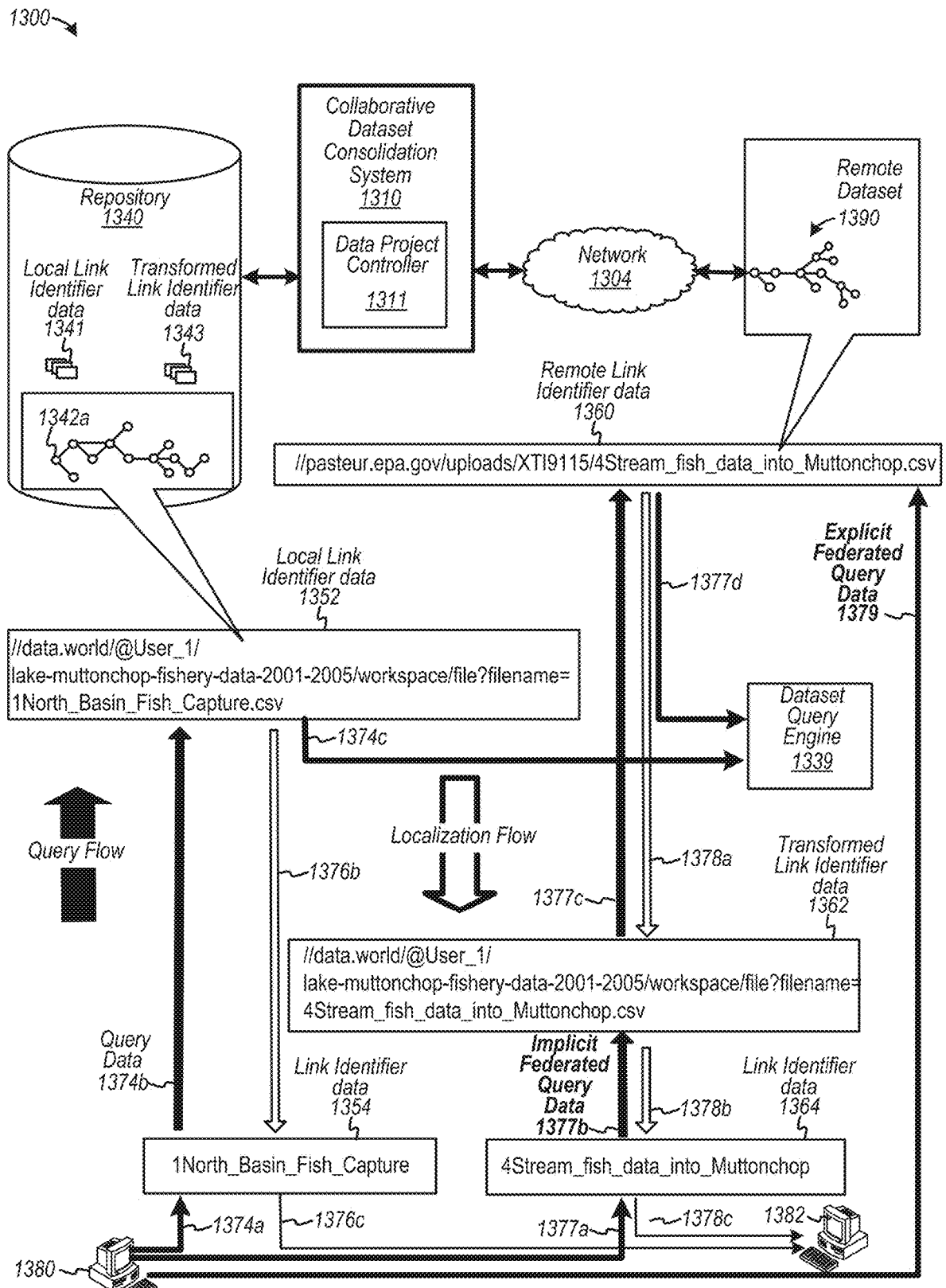
FIG. 13 is a block diagram depicting an example of localization dataset file identifiers to facilitate query formation and presentation via user interfaces, according to some examples.

FIG. 13 is a block diagram depicting an example of localization dataset file identifiers to facilitate query formation and presentation via user interfaces, according to some examples. Diagram 1300 includes a collaborative dataset consolidation system 1310 including a data project controller 1311, either of which may be coupled to a repository 1340 to access local datasets 1342*a*, or to a remote dataset 1390 via network 1304. Collaborative dataset consolidation system 1310 and/or data project controller 1311 are configured to localize dataset file identifiers to form dataset identifiers in a local namespace.

For example, collaborative dataset consolidation system 1310 may be configured to localize, for example, remote link identifier data 1360 that may link a remote and external dataset into a data project. An example of remote link identifier data 1360 includes a URL directed to an external data source in a global namespace. According to some examples, collaborative dataset consolidation system 1310 may transform remote link identifier data 1360 into a localized adaptation via path 1378a to form a transformed link identifier 1362, which may be a transformed dataset file identifier in a local namespace. Link identifier data 1364 may be formed via path 1378b based on transformed link identifier data 1362. Further, link identifier data 1364 may be formed as an associated dataset identifier (e.g., localized file name) that may be presented via path 1378c for display as a user input in a user interface portion at a computer device 1382. In some examples, data representing a relationship among link identifier data 1364, transformed link identifier data 1362, and remote link identifier data 1360 may be stored as transformed link identifier data 1343 in repository 1340. Thus, transformed link identifier data 1343 may be used to generate implicitly federated queries by using localized link identifier data 1364 to access remote dataset 1390 implicitly in a federated query. For example, a query generated in SPARQL may be configured to be automatically performed, without user intervention, as a service graph call to a remote graph data arrangement in a remote dataset. In some examples, transformed link identifier data 1362 may not be available to form a query. As such, an explicit federated query via path 1379 may implement a path identifier in a global namespace to access a remote dataset rather than using a localized version.

Similarly, collaborative dataset consolidation system 1310 may import or upload data for a dataset 1342a for local storage in repository 1340, whereby a dataset file name may be stored in association with a local namespace. For example, local link identifier data 1352 may include a dataset file identifier in a local namespace. Link identifier data 1354 may be formed via path 1376b based on local link identifier data 1352. Further, link identifier data 1354 may be formed as an associated dataset identifier that may be presented via path 1376c for display as a user input in a user interface portion at computer device 1382. In some examples, data representing a relationship between link identifier data 1354 and local link identifier data 1352 may be stored as local link identifier data 1341 in repository 1340. Thus, local link identifier data 1341 may be used to generate queries by using localized link identifier data 1354 to access local dataset 1342a explicitly in a query (e.g., a query generated in SPARQL). According to various examples, link identifier data 1354 and 1364 may be implemented as selectable (e.g., hyperlinked) user inputs disposed in a data source links interface portion, a composite data dictionary interface portion, and the like. In some examples, a query including local data may be in a form of an explicit federated query.

To illustrate utilization of link identifier data 1354 and 1364 in query formation, consider that a collaborative query editor in a data project interface is presented at a computer device 1380 for forming a query against dataset 1342a and remote data set 1390. A collaborative query editor may include a reference to dataset 1342a by entering via path 1374a link identifier data 1354 from a composite data dictionary, which is not shown (e.g., via a drag and drop user input operation). A query including link identifier data 1354 may reference local link identifier data 1352 as query data via path 1374b. Local link identifier data 1341 may provide interrelationship data between data 1354 in data 1352. Further, local link identifier data 1352 may be applied via path 1374c to a dataset query engine 1339 to facilitate performance of the query (e.g., as an explicit service graph call to a local graph data arrangement in a local data store). Next, consider that the collaborative query editor may also include another reference to remote dataset 1390 by entering link identifier data 1364 via path 1377a from a composite data dictionary, which is not shown (e.g., via a drag and drop user input operation or a text entry operation). A query including link identifier data 1364 may reference transformed link identifier data 1362 as implicit federated query data via path 1377b. Transformed link identifier data 1343 of repository 1340 may be accessed to identify remote link identifier data 1360 via path 1377c based on transformed link identifier data 1362. Further, remote link identifier data 1360 may be applied via path 1377d to dataset query engine 1339 to facilitate performance of the query on remote dataset 1390 (e.g., as an explicit service graph call).

In view of the foregoing, link identifier data 1354 and 1364 enable dataset file names and locations to be viewed as if stored locally, or having data accessible locally. Further, link identifier data 1354 and 1364 may be implemented as "shortened" dataset file names or localized file locations. As such, users other than a creator a dataset may have access to a remote dataset 1390 as a pseudo-local dataset, thereby facilitating ease-of-use when forming queries regardless of actual physical locations of datasets. Moreover, localized references may be presented in a local namespace rather than necessitating the use of an explicit use of a global namespace to form queries or perform any other data operation in association with a data project interface, according to various embodiments.

Figure 14:
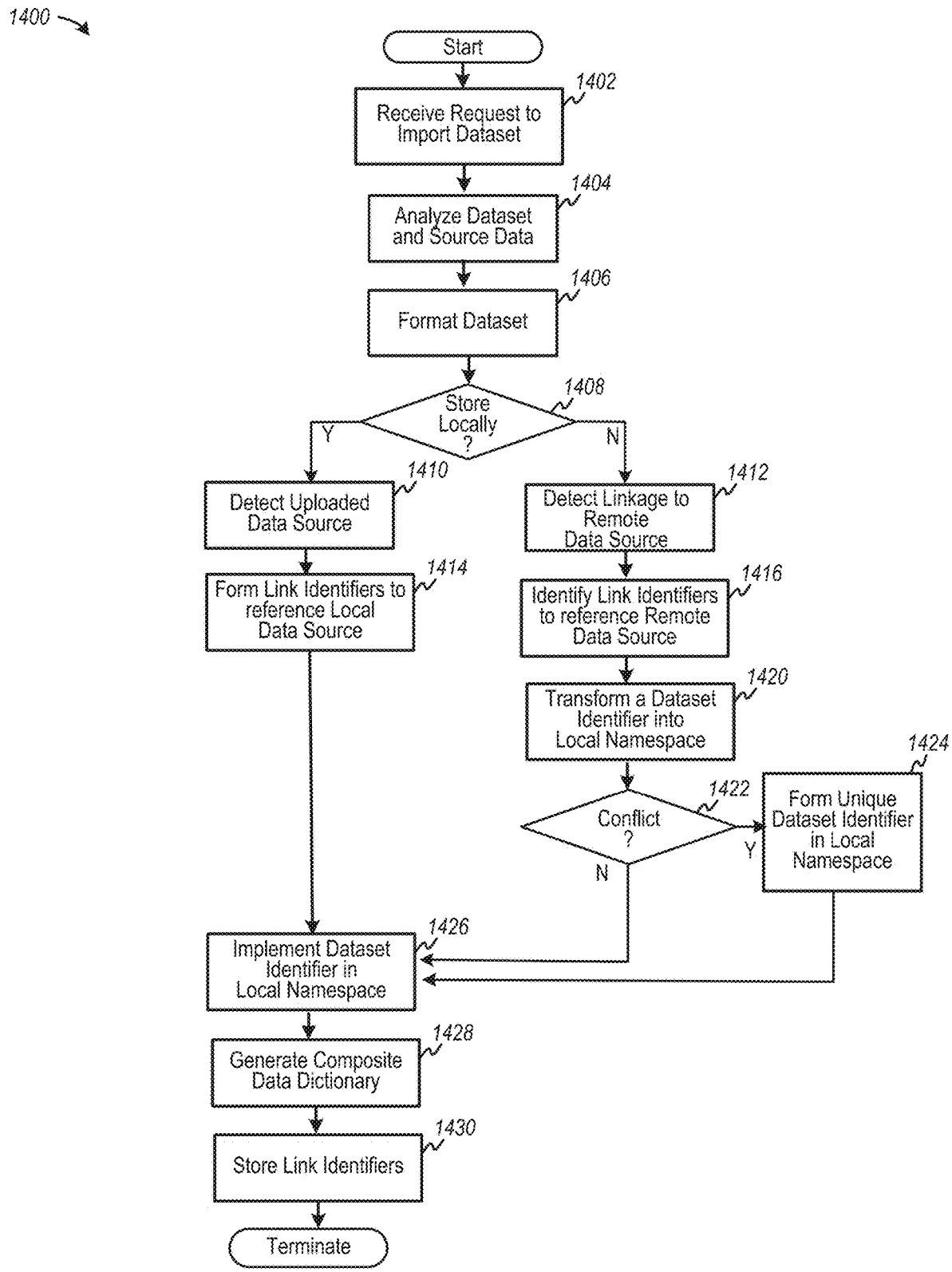
FIG. 14 is a flow diagram depicting an example of forming a composite data dictionary, according to some examples.

FIG. 14 is a flow diagram depicting an example of forming a composite data dictionary, according to some examples. Flow diagram 1400 may begin at 1402. A request to import a dataset into a data project, or otherwise associate a dataset with a data project, may be received at 1402. Further, a data arrangement in which the data representing the dataset has a first format, such as a tabular data arrangement, may be identified. In some examples, a dataset may be identified as tabular data arrangement during data ingestion at a dataset ingestion controller (not shown).

At 1404, data representing a dataset may be analyzed to determine, for example, a first subset of identifiers for subsets of data. In some examples, a dataset may be analyzed at a dataset analyzer (not shown) to determine, extract, or derive data attributes, including an identifier of a data dictionary, including, but not limited to an identifier associated with a subset of data in a dataset. For example, a subset of data in a dataset may include a column of data, and a corresponding identifier associated with a subset of data may be an annotation identifying a column header. Column header data may be extracted as annotative data from a first data arrangement for use as an identifier. As such, the extracted identifier may describe a data type and/or classification of data that describes an attribute of data in the subset of data. For example, a column of data may include numbers having a numeric datatype and an annotated column "latitude," thereby indicating the subset of data in the column includes latitude coordinate values.

In some examples, analyzing the data representing a dataset at 1404 may include determining a subset of dataset attributes for a subset of data may include characterizing data to form dataset attributes. In some examples, an annotation may be derived (e.g., automatically) to form a derived annotation for a subset of a dataset, with the derived annotation as a basis with which to form an identifier that may be included in a composite data dictionary. An example of a derived annotation includes a "location" annotation, where location indicates a geographic location. An example of a derived location is that depicted in FIG. 7, whereby a derived annotation or any other data attribute may be computed, predicted, or inferred at an inference engine of FIG. 4. Referring back to FIG. 14, analyzing data representing a dataset at 1404 to determine an identifier may include generating a data representing a request for an identifier, whereby the request may be generated for presentation in a display of a computing device. In some examples, a duplicate or conflicting identifier name may be presented in a display by which a user may activate a user input (e.g., entering a distinguishing identifier name to replace an extracted identifier). According to some examples, a composite data dictionary may include optionally unique identifiers for data attributes or dataset file identifiers. In yet another example, a data project controller may be configured to provide a user input, such as user input 844 of FIG. 8, to accept data representing a requested identifier for a subset of data, whereby activation of user input 844 may include, for example, a manually-entered annotation that may be applied as an updated identifier.

At 1406, a dataset having a first data arrangement of, for example, a tabular data arrangement may be converted into a second data arrangement as, for example, a graph data arrangement. In some examples, a format converter may be configured to format a dataset for inclusion as a graph dataset. At 1408, a determination is made as to whether to store a dataset locally, for example, within a collaborative dataset consolidation system (not shown), or whether to access a dataset as a linked remote, external dataset. At 1410, an uploaded data source (or an associated request to upload the data source) may be detected if a dataset is identified as being stored locally, such as in a data repository local to a collaborative dataset consolidation system. At 1414, link identifier data may be formed as a shortened file name (and/or location) to reference a data source as a local data source. At 1426, link identifier data referencing a locally-stored dataset may be used as hyperlinked dataset file name, as a user input, to access one or more subsets of data in the locally-stored dataset.

At 1412, linkage to a remote data source may be detected if a dataset identified for inclusion in a data project is stored remotely, such as in a remote data repository stored external to a collaborative dataset consolidation system. At 1416, link identifier data to reference a remote data source may be identified, such as remote link identifier data including a URL referencing an external data source. At 1420, a remote dataset file identifier (e.g., a remote dataset name and/or location) may be transformed to form transformed link identifier data, which may include a transformed dataset identifier in a namespace localized to a data project rather than relative to a global namespace. Thus, link identifier data may be formed at 1420 to reference a remotely dataset via a hyperlinked dataset file name, as a user input, that is transformed into a local namespace and can be used to access one or more subsets of data in the remotely-stored dataset. As one or more portions of flow 1400 may be performed automatically, an event may arise in which a determination is made as to whether a localized dataset file name or location, based on transformed dataset identifier, may conflict with a present dataset file identifier. For example, importing a remote dataset may include an identifier (e.g., a dataset file name, such as "Fishing_data.csv") that conflicts with a dataset file name already linked to a data project (e.g., "Fishing_data.csv"). In this case, a unique dataset identifier (e.g., "Fishing_data [2].csv") may be formed in a local namespace at 1424 to resolve ambiguity related to duplicative dataset file identifiers in a data project.

Flow 1400 proceeds from 1422 or 1424 to 1426, at which localized link identifier data implicitly referencing a remotely-stored dataset may be used as hyperlinked dataset file name, as a user input, to access one or more subsets of data in the remotely-stored dataset. At 1428, a composite data dictionary may be formed to include link identifier data that may explicitly reference a locally-stored dataset, or may implicitly reference a remotely-stored dataset. Alternatively, an interface portion including data source links in a data project interface may include localized link identifier data to interact with data of a dataset in a workspace interface portion, according to some examples. In some examples, a composite data dictionary may be compiled form an aggregate data dictionary that includes a first and second data dictionary each associated with a dataset. At 1430, link identifier data may be stored in a repository as, for example, local link identifier data 1341 and transformed link identifier data 1343 of FIG. 13.

Figure 15:
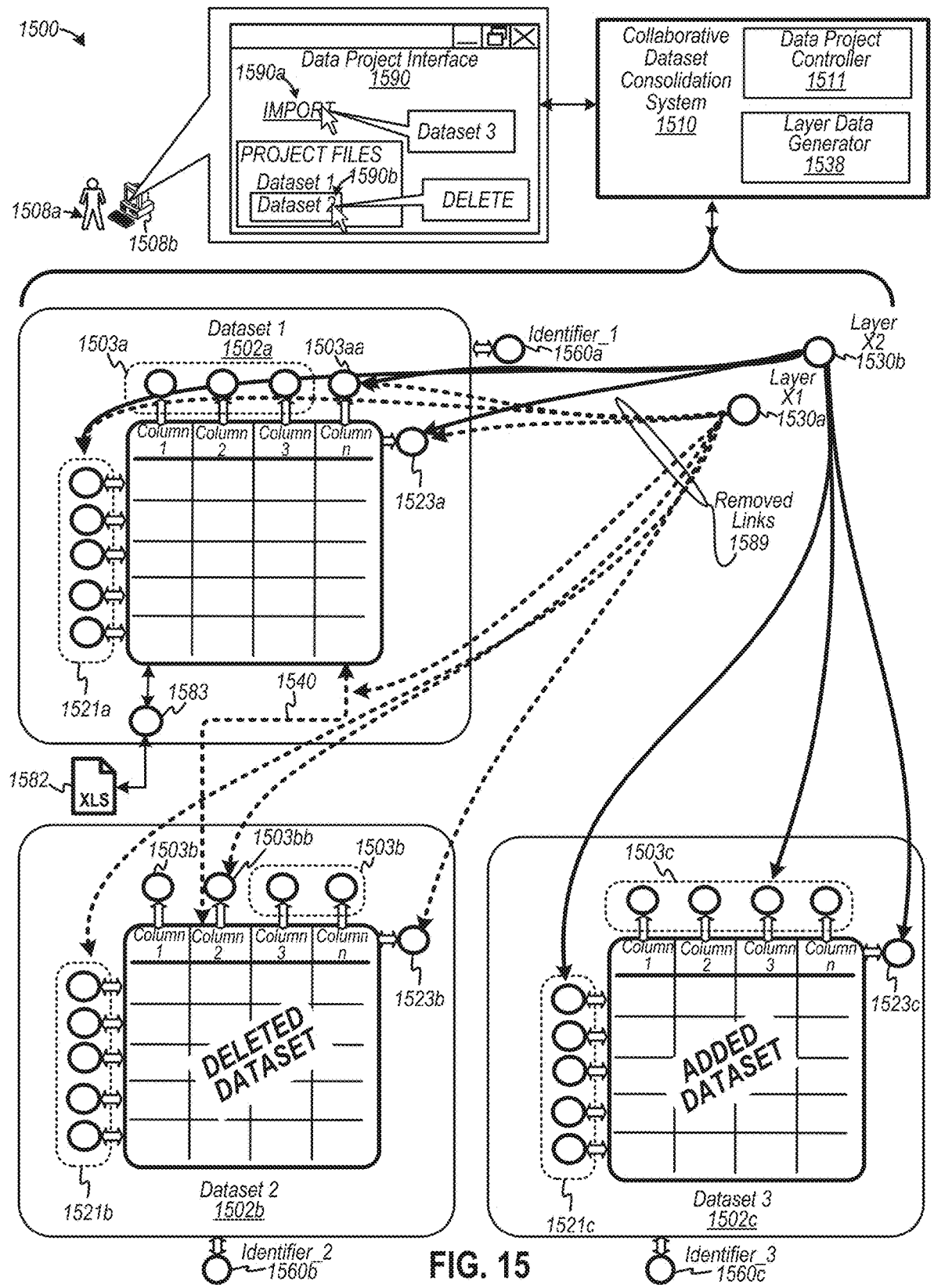
FIG. 15 is a diagram depicting modifications to linked data in a graph data arrangement constituting a data project responsive to adding and deleting datasets, according to some examples.

FIG. 15 is a diagram depicting modifications to linked data in a graph data arrangement constituting a data project responsive to adding and deleting datasets, according to some examples. Diagram 1500 includes a collaborative dataset consolidation system 1510 including a data project controller 1511 configured to manage formation, maintenance, and implementation of a data project, and a layer data generator 1538 configured to form layered relationships (e.g., layered data file) in a graph data arrangement that may supplement an underlying dataset, which may be imported or ingested into a data project in a tabular data arrangement. Layer data generator 1538 may be configured to generate referential data, such as node data (e.g., referenced by IRI, etc.), that links data via data structures (e.g., in a graph) associated with a layer. In some examples, layers of nodes and linked data may originate at underlying source data, with hierarchical layers formed thereupon to include supplemental data. One or more elements depicted in diagram 1500 of FIG. 15 may include structures and/or functions as similarly-named or similarly-numbered elements depicted in other drawings, or as otherwise described herein, in accordance with one or more examples.

In the example shown, layer data generator 1538 may be configured to extract or identify data in a data arrangement, such as raw data in an XLS data format. As shown, raw data and data arrangement of an ingested dataset may be depicted as layer ("0") 1582, which may be linked via node 1583 to tabular data arrangement ("dataset 1") 1502a. Further to the example shown, the raw source data may be disposed in a tabular data format 1502a, and layer data generator 1538 may be configured to implement row nodes 1521a and column header row 1523a to identify rows of underlying data. Column nodes 1503a and 1503aa may be implemented to identify columns of underlying data. Further, a node ("identifier_1) 1560a may be associated with dataset 1502a and may be used to link to other datasets of a data project. Other nodes and links/edges of a graph data arrangement linked to dataset 1502a are not shown so as to not obscure various detailed explanations of the various implementations. For example, consider that dataset ("2") 1502b is associated with a node ("identifier_2") 1560b that may be linked to node 1560a to aggregate datasets 1502a and 1502b. Similar to dataset 1502a, dataset 1502b may be configured to implement row nodes 1521b and column header row 1523b to identify rows of underlying data. Column nodes 1503b and 1503bb may be implemented to identify columns of underlying data. Other nodes and links/edges of a graph data arrangement linked to dataset 1502b are not shown so as to not obscure various detailed explanations of the various implementations.

To illustrate interoperation of data project controller 1511 and layer data generator 1538, consider the following example in which dataset 1502a and dataset 1502b are initially linked to a data project. As such, a user 1508a may interact via computing device 1508b to operate computerized tools set forth in a data project interface 1590 in which an interface portion indicates that "Dataset 1" and "Dataset 2" are dataset files constituting project files. Consider further, that column "n" of dataset 1502a may be associated via link 1540 with column "2" of dataset 1502b, whereby link 1540 may be linked to a first layer ("X1") node 1530a of graph data formed over a layer of other graph data. Further, row nodes 1521a and 1521b, as well as column nodes 1503a, 1503aa, 1503b, and 1503bb may be linked to first layer 1530a of graph data. Next, consider that a user input 1590b is activated to "delete" dataset 1502b from the data project, under control of data project controller 1511. Layer data generator 1538 may be configured to disassociated links between dataset 1502a and dataset 1502b responsive to deletion of dataset 1502b from the data project. As shown, links between dataset 1502a and dataset 1502b associated with a first layer node 1530a are shown as broken lines to depict removed links 1589 at a particular point in time for a data project. According to some examples, the links shown as removed links 1589 may persist as an earlier version of a dataset project, and may not be visible when reviewing, implementing, querying, or performing any data operation on the data project after dataset 1502b is deleted.

Subsequently, consider that another dataset, dataset ("3") 1560c may be added via activation of a user input ("import") 1590a in data project interface 1590, under coordination by data project controller 1511. Dataset 1560c is shown to include row nodes 1521c and column header row 1523c to identify rows of underlying data. Column nodes 1503c may be implemented to identify columns of underlying data. Other nodes and links/edges of a graph data arrangement linked to dataset 1502c are not shown so as to not obscure various detailed explanations of the various implementations. Layer data generator 1538 may be configured to form links between dataset 1502a and dataset 1502c to include dataset 1502c in the data project, whereby new links may be formed in another layer and linked via a second layer ("X2") node 1530b of graph data.

In view of the foregoing, addition and deletion of the above-described links by layer data generator 1538 further facilitates usage of a composite data dictionary, whereby identifiers in aggregated data dictionaries that are linked into a data project may be removed or added, automatically, responsive to activation of user inputs in a data project interface. Further, applied queries against datasets (e.g., a combined dataset) of a data project may also employ links that are automatically formed or removed responsive to adding or deleting datasets with a data project.

According to some examples, layer data generator 1538 may be configured to form linkage relationships of ancillary data or descriptor data to data in the form of "layers" or "layer data files." Implementations of layer data files may facilitate the use of supplemental data (e.g., derived or added data, etc.) that can be linked to an original source dataset, whereby original or subsequent data may be preserved. As such, a format converter may be configured to form referential data (e.g., IRI data, etc.) during conversion into a graph data arrangement to associate a datum (e.g., a unit of data) in a graph data arrangement to a portion of data in a tabular data arrangement. Thus, data operations, such as a query, may be applied against a datum of the tabular data arrangement as the datum in the graph data arrangement. An example of a layer data generator 1538, as well as other components of collaborative dataset consolidation system 1510, may be described in U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS."

Figure 16:
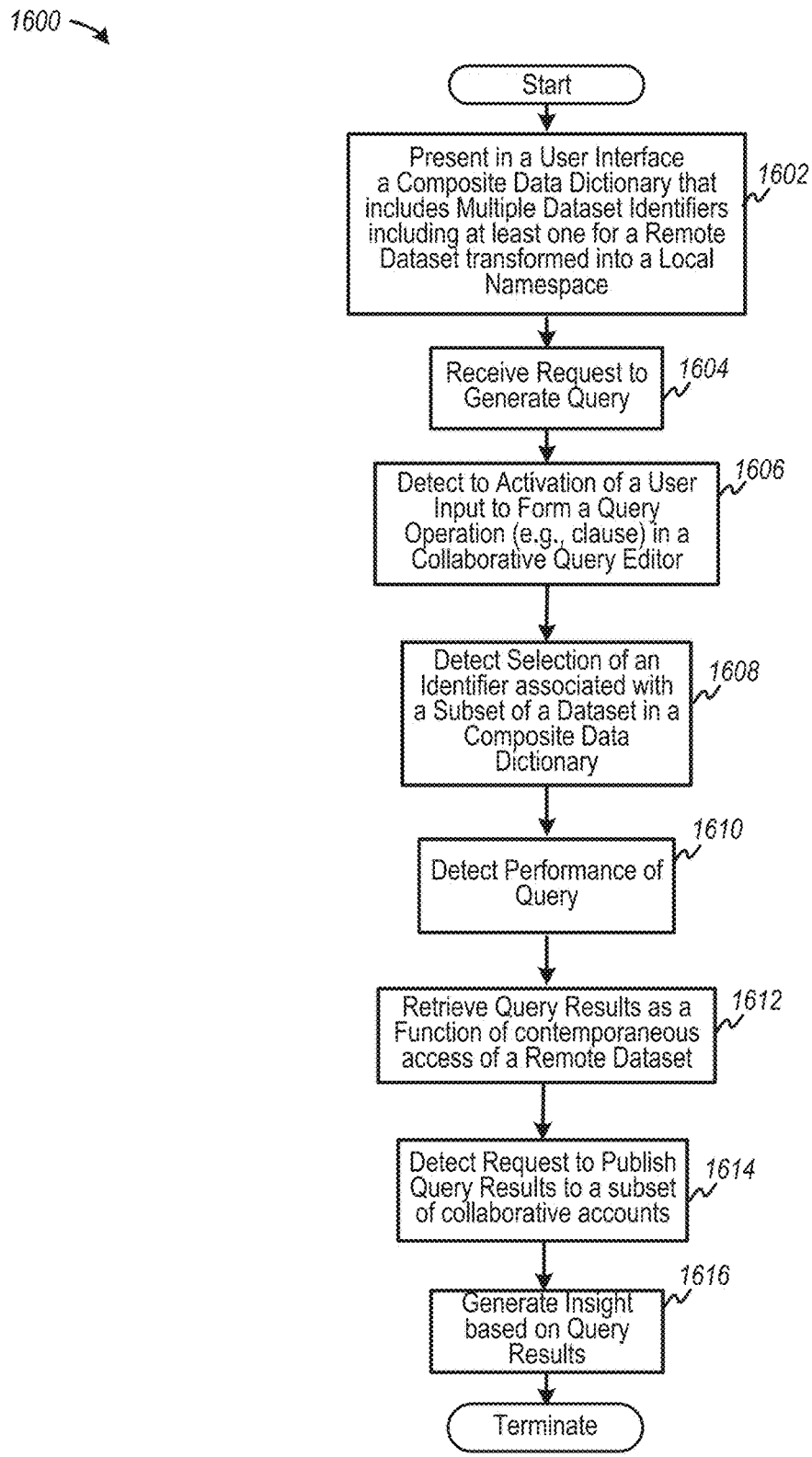
FIG. 16 is a flow diagram depicting an example of forming a query via a composite data dictionary, according to some examples.

FIG. 16 is a flow diagram depicting an example of forming a query via a composite data dictionary, according to some examples. At 1602, flow 1600 begins by presenting in a user interface a composite data dictionary that includes multiple dated identifiers. At least one of the dataset identifiers includes a reference to a remote dataset, whereby the reference to the remote dataset may be transformed into a local namespace. In one example, a localized reference to a remote dataset may be referred to as a transformed linked identifier associated with a local namespace. At 1604, a request to generate a query may be received. At 1606, activation of user input to form a query operation may be detected. An example of an activated user input is an instruction to cause implementation of, for example, a query command, clause, or query, such as a "SELECT" query clause, which may be entered into a collaborative query editor.

At 1608, a selection of an identifier associated with a subset of data in a dataset may be detected. A user input configured to receive selection of the identifier may be disposed in a composite data dictionary. A particular identifier may be selected in a query editing operation. For example, data representing an identifier may be copied-and-pasted into a collaborative query editor. Or, data representing an identifier may be transferred into the collaborative query editor by "dragging and dropping" the identifier. In some implementations, data representing an "identifier" of a subset of data in a composite data dictionary may refer to an annotation or column heading, which may describe an attribute or classification of the subset of data.

At 1610, performance of a query may be detected, whereby query results may be available. At 1612, query results may be retrieved as a function of, for example, contemporary access of a remote dataset. For example, remotely-stored data in an external dataset may be accessed via a transformed linked identifier contemporaneously with performing a query so as to apply the query to retrieved data from the external dataset. At 1614, a request to publish query results to a subset of collaborative user accounts (or associated collaborative computing devices) may be detected. In some examples, a request to publish query results may be cause publication of an insight, whereby a notification of such publication may be transmitted as a notification via an interactive collaborative activity feed, thereby notifying a subset of collaborative users to the availability of newly-formed query results. At 1616, an insight may be generated based on query results formed at 1614. Further, the generated insight may be published into a data project interface. Also, a notification that an insight has been generated may be transmitted via interactive collaborative activity feed to associated collaborative user accounts to inform collaborative users of the availability of a newly-formed insight.

Figure 17:
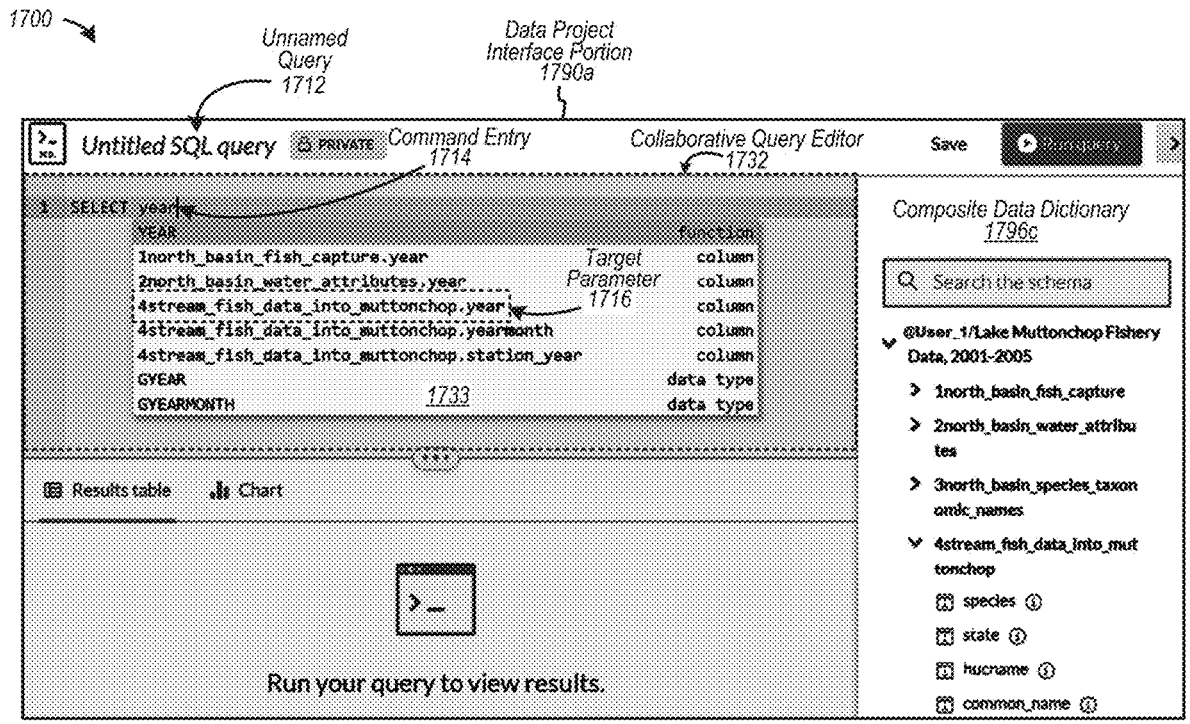
FIGS. 17 to 20 depict examples of interface portions for forming queries via a collaborative query editor, according to some examples.

FIGS. 17 to 20 depict examples of interface portions for forming queries via a collaborative query editor, according to some examples. FIG. 17 is a diagram 1700 depicting a data project interface portion 1790a that includes collaborative query editor 1732 for generating a query. As shown, the query initially is an unnamed query 1712, whereby a SELECT query command is being written to include a string "year" entered in a command entry field 1714, whereby filtering logic (not shown) may provide an auto-search feature to present or display a subset of identifiers or other data in selection window 1733 that includes a string "year" in a composite data dictionary 1796c. According to various examples, auto-search logic may be configured to perform search functions over multiple datasets and dataset dictionaries, based on a composite data dictionary, whereby the functionality of searching over multiple data dictionaries is dynamic as datasets in a composite data dictionary may be continuously changing, especially if a dataset is linked to a remote data source. In this case, the remote owner may change the data values of the remote data source, unbeknownst to a user of that dataset. As such, the search logic may be configured to adapt to the dynamism of changing data dictionaries.

If an identifier "year" is desired in a dataset "4stream_fish_data_into_muttonchop," as a target parameter 1716, rather than from other datasets, then target parameters 1716 may be included in a query.

Figure 18:
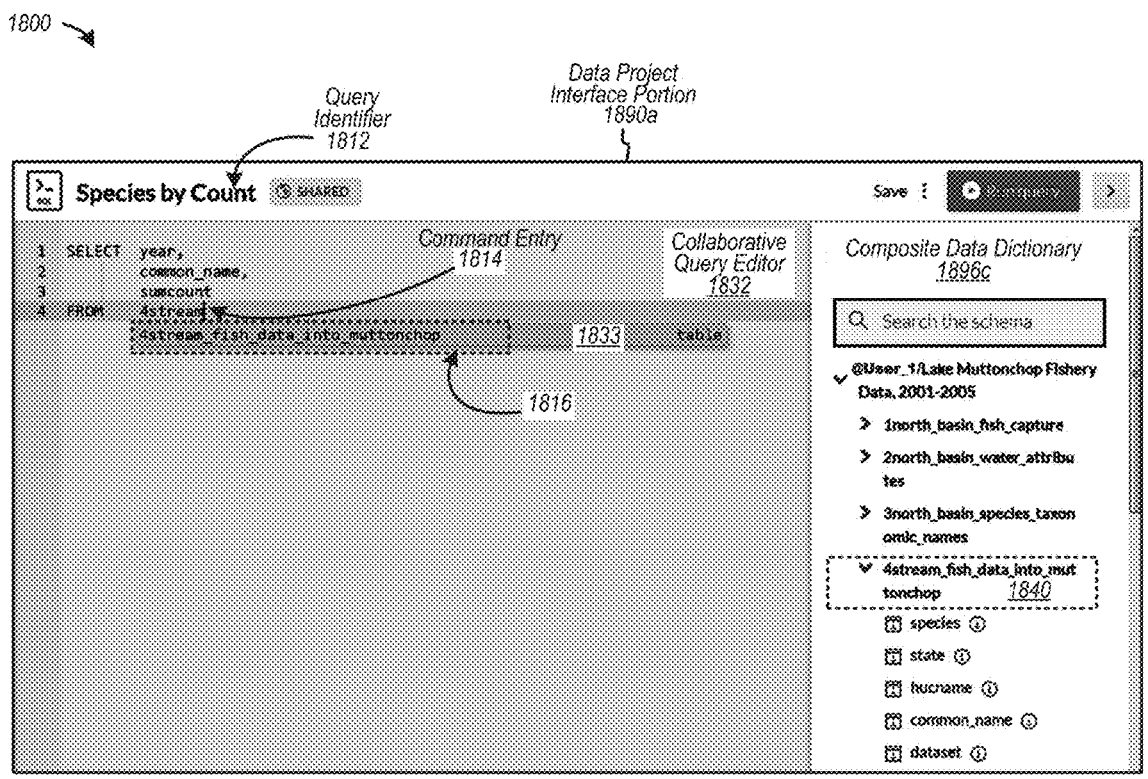

FIG. 18 is a diagram 1800 depicting a data project interface portion 1890a that includes collaborative query editor 1832 for generating a query. As shown, the query is associated with a query identifier 1812 of "Species by Count." As shown, a FROM query clause or command may be associated with a string "4Stream" entered in a command entry field 1814, whereby an auto-search feature presents a subset of identifiers of dataset identifiers in selection window 1833 that includes a dataset identifier 1840 in a composite data dictionary 1896c. If a dataset "4stream_fish_data_into_muttonchop" is desired for entry during the writing of a query, then the FROM query clause may be supplemented with target parameter 1816, which identifies a dataset for this part of the query. In various examples, data entered in command entry fields 1714 of FIG. 17 and 1814 of FIG. 18 may be entered via text interface (e.g., a keyboard), by copying and pasting, by dragging and dropping, or by other user interface operations.

Figure 19:
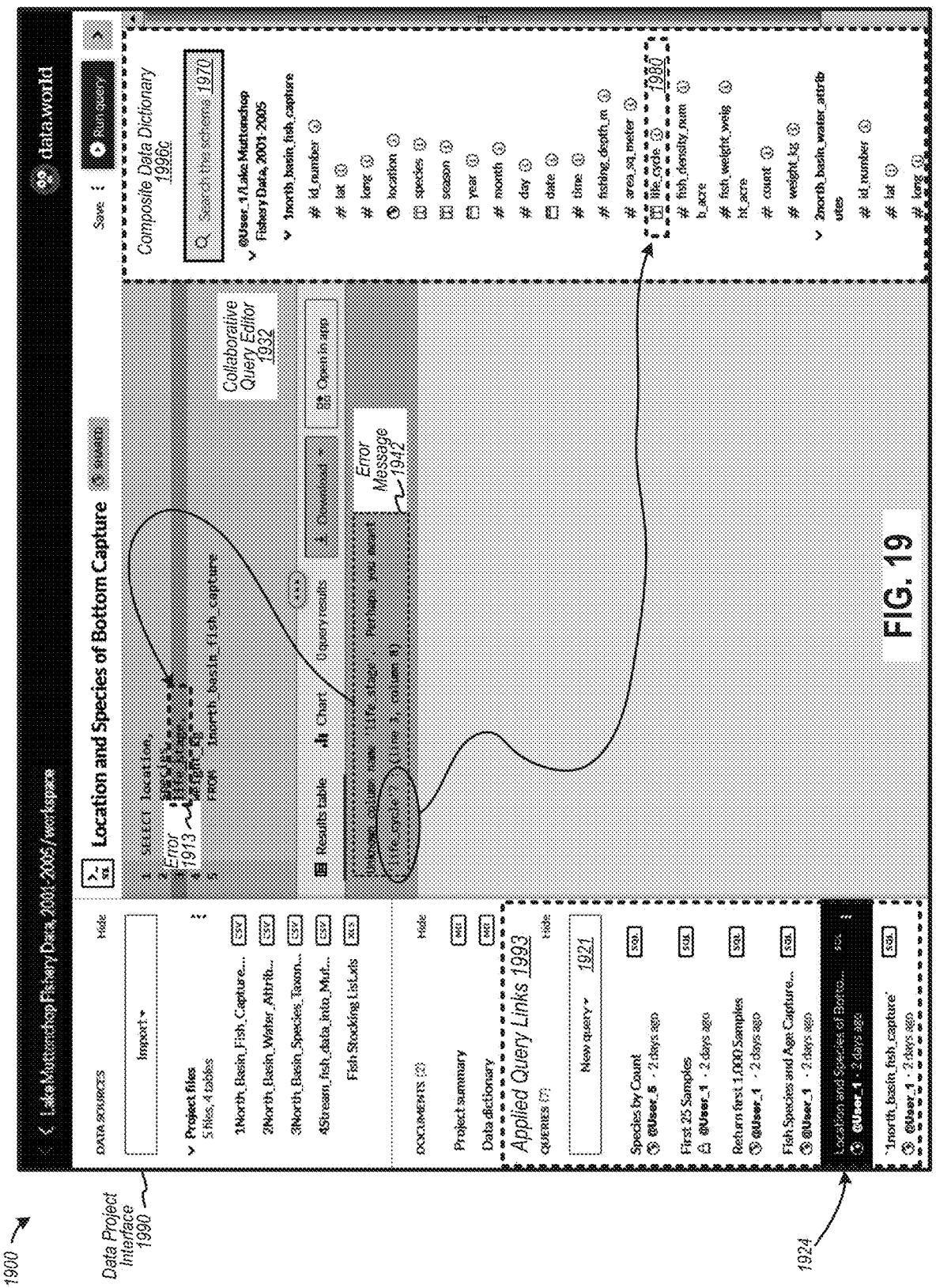
Figure 20:
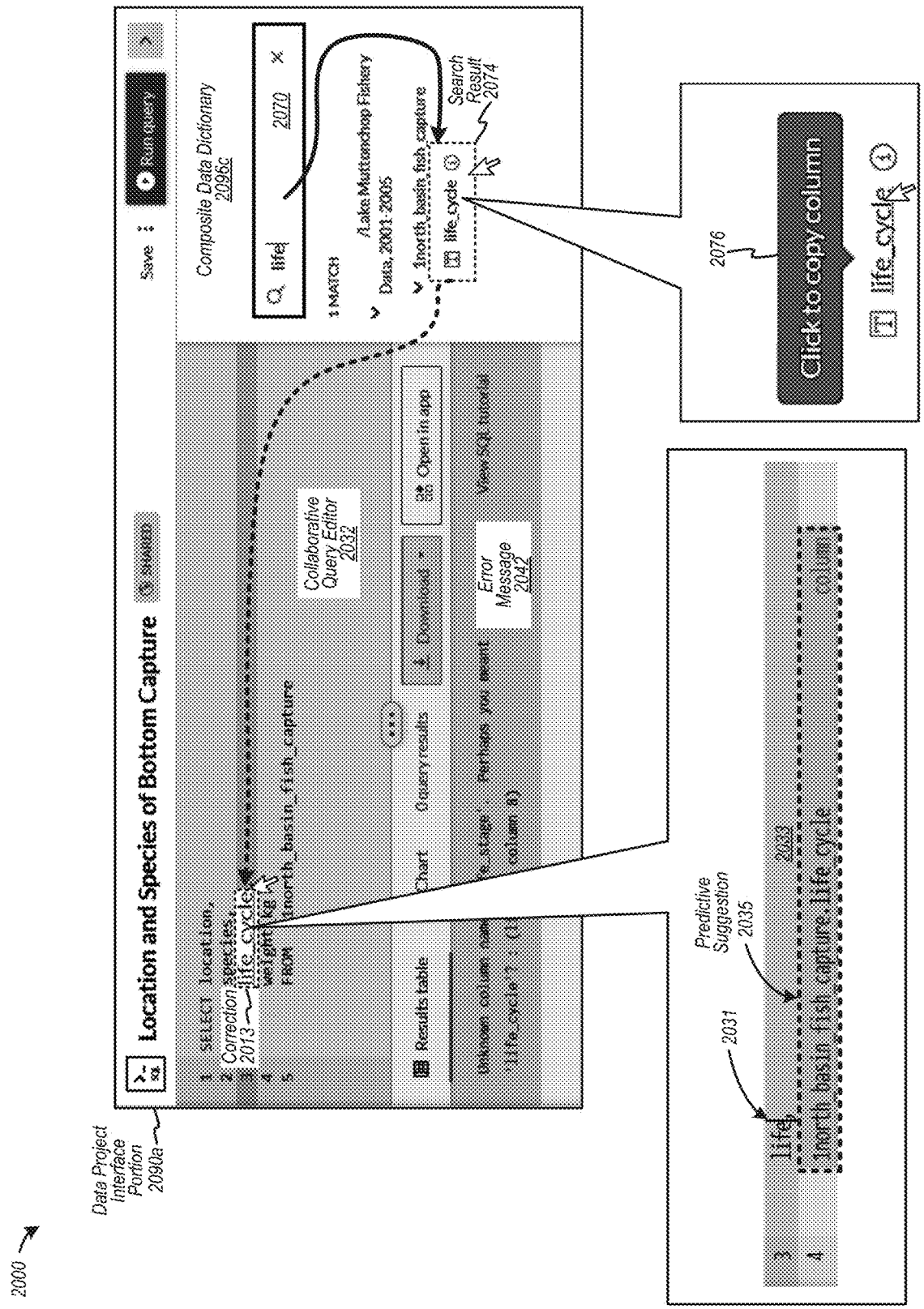

FIGS. 19 and 20 depict examples of interface portions for forming a query in view of a query-run error and correction, according to some examples. FIG. 19 is a diagram 1900 including a data project interface 1990 implemented to form a query in a collaborative query editor 1932. In this example, a query 1924 identified as "Location and Species of Bottom Capture" is selected in applied query links 1993, which also includes a user input 1921 to optionally generate a new query. During performance of a query in collaborative query editor 1932, an error message 1942 indicates detection of an error 1913 at which "life_stage" is included in a SELECT query command or clause. As shown in error message 1942, a suggested replacement of identifier ("life_cycle") 1980 in a composite data dictionary 1996c is predicted. If identifier 1980 is not visible, the term "life_cycle" (identified by identifier 1980) may be searched via entry into search field 1970.

FIG. 20 is a diagram 2000 depicting an example of correcting an error, as indicated in error message 2042, in a query entered into a collaborative query editor 2032 of a data project interface portion 2090a. An example shown, a string "life" may be entered into search field 2070 of a composite data dictionary 2096c. In some cases, a search result ("life_cycle") 2074 may be determined using autocomplete search facility logic (not shown) that filters through search results that include a string "life." Next, a cursor hovering over identifier "life_cycle" may present an instruction 2076 to "click to copy" a column heading identifier, which can be pasted into query portion 2013 to correct the query. In another example, a predictive selection 2035 may be revealed as string "life" 2031, which may be entered into a command entry field 2033. Selection of predictive suggestion 2035 may correct the error in the query.

Figure 21:
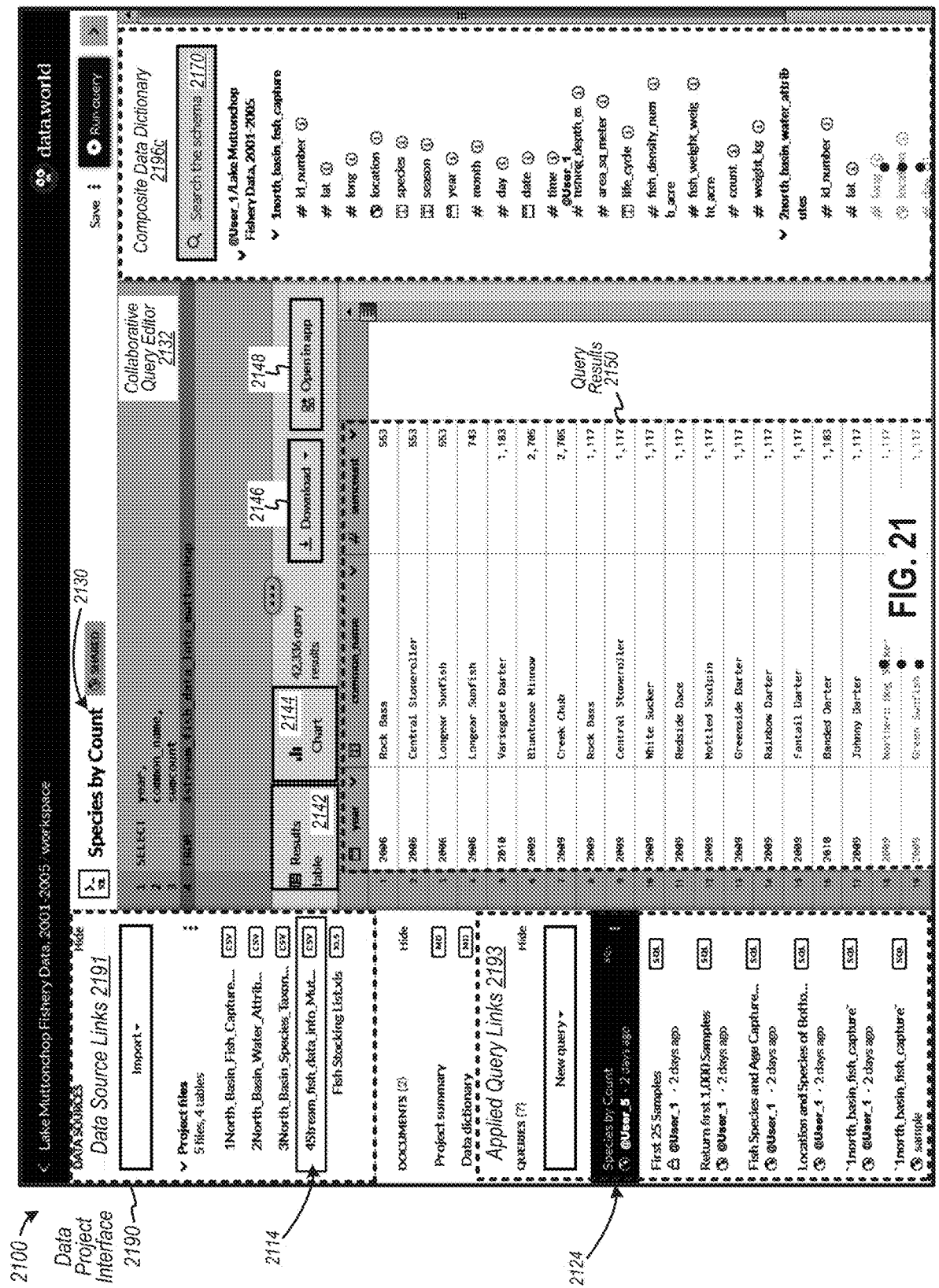
FIGS. 21 and 22 depict examples of presenting query results, according to some examples.
Figure 22:
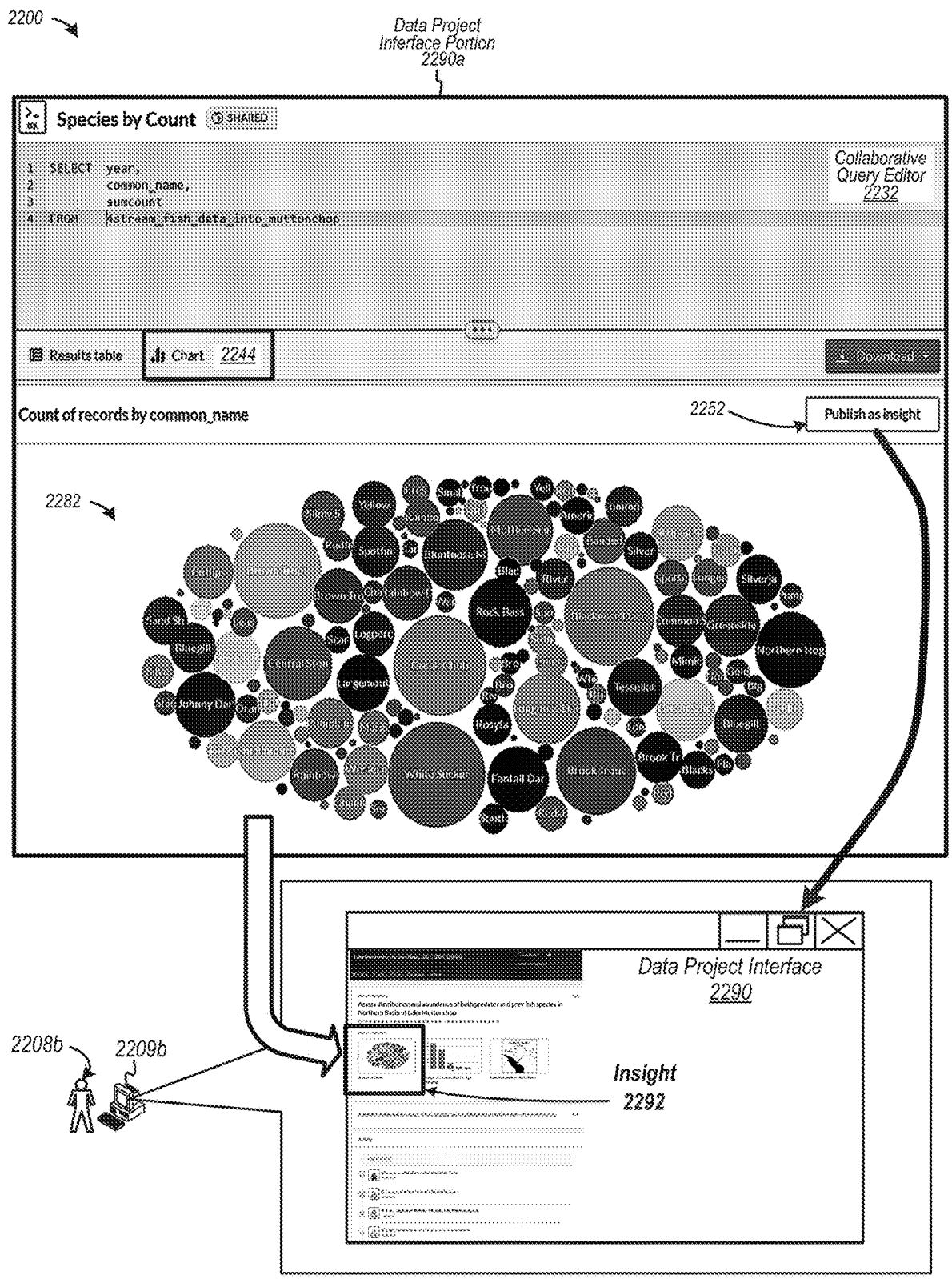

FIGS. 21 and 22 depict examples of presenting query results, according to some examples. FIG. 21 is a diagram 2100 depicting a data project interface 2190 presenting query results 2150 of a query titled "Species by Count" 2130 as a table, the format of which may be selected via user input 2142. Data source links 2191 interface portion includes a dataset identifier 2114 that identifies a dataset as selected for query in a collaborative query editor 2132. Applied query links 2193 interface portion includes selection of a query identifier 2124 that, if selected, causes a query written in collaborative query editor 2132 to "run" or execute to provide query results 2150. Further, data project interface 2190 includes a user input 2144 to present query results 2150 in a chart or graphical representation (e.g., in a visualization). Also, user input 2140 is configured to download query results 2150 and user input 2148 is configured to invoke an API, a web data connector, and/or an integration application to apply query results 2150 to an external third-party data analysis computerized tool to perform one or more data operations, such as, for example, generating an insight that can be transmitted back into a collaborative dataset consolidation system.

FIG. 22 is a diagram 2200 depicting a data project interface portion 2290a that presents query results, which may be generated by performing a query in a collaborative query editor 2232, as a visualization 2282, responsive to selection of user input 2244. To notify collaborative users and computing systems of formation of a new visualization, user input 2252 may be activated to publish visualization 2282 as an insight 2292. As shown, visualization 2282 is depicted as an insight 2292 in a data project interface 2290, which may be presented in a display of computing device 2209b associated with a user 2208b, according to some examples.

Figure 23:
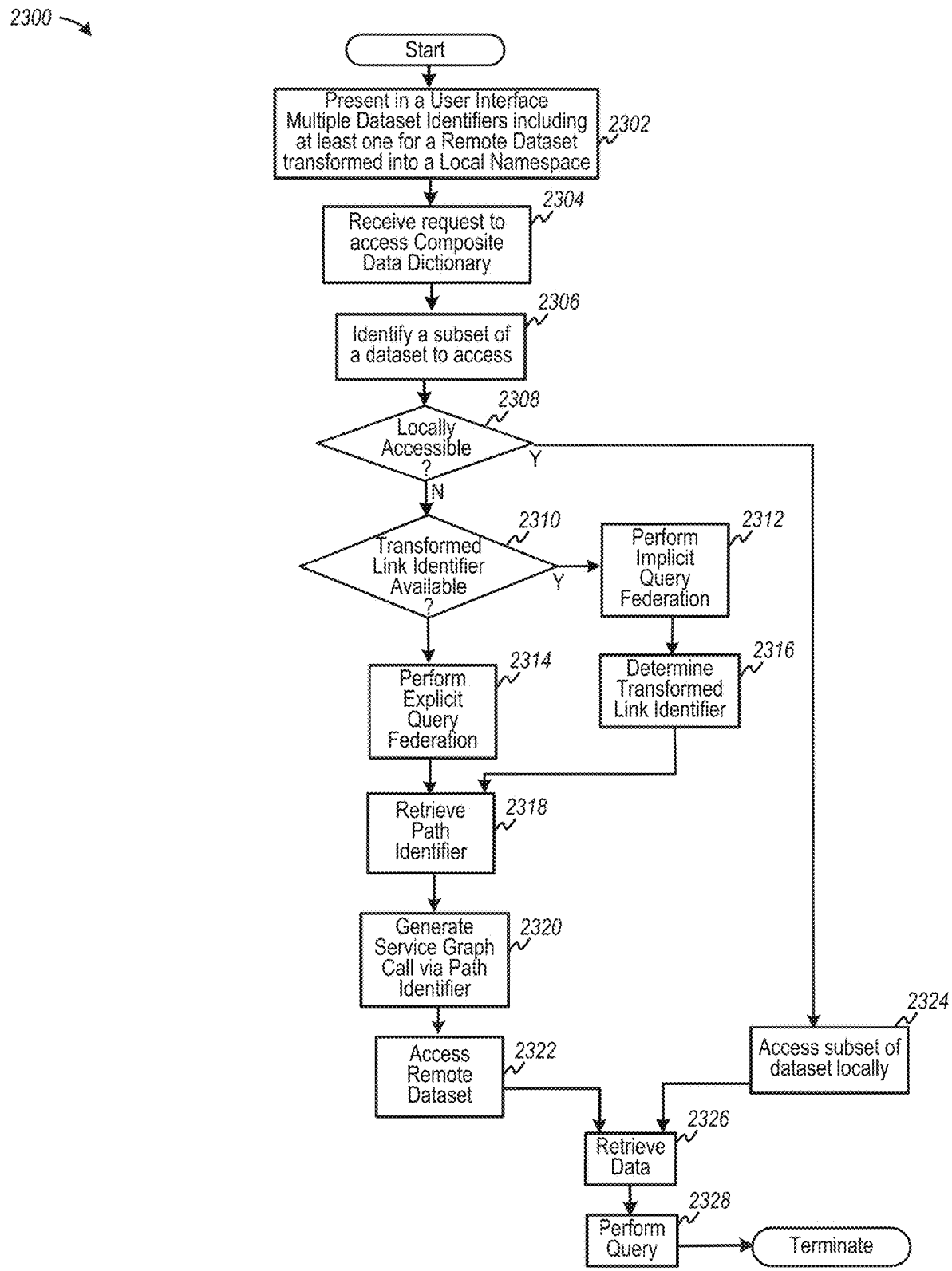
FIG. 23 is a diagram depicting implementation of a query via a composite data dictionary, according to some examples.

FIG. 23 is a diagram depicting implementation of a query via a composite data dictionary, according to some examples. Flow 2300 begins at 2302, whereby multiple dataset identifiers may be presented in a user interface, such as in a composite data dictionary. In one example, at least one dataset identifier is associated with a remotely-stored dataset, and the dataset identifier may be transformed into a local namespace (e.g., a remotely-stored dataset may be identified by a transformed link identifier data). At 2304, a request to access composite data dictionary may be received at or during formation of a query. At 2306, a subset of a dataset may be identified for access. For example, data representing a descriptive column heading as an identifier for a subset of the dataset (e.g., a subset including data derived from column data in a tabular data arrangement) may be selected for inclusion in a query. If the identifier relates to a remotely-stored dataset, then the query is written to extract data from an external data source, for example, a query run-time.

At 2308, a determination is made as to whether to locally access a dataset. If a dataset is accessible locally, then flow 2300 moves to 2324, at which a subset of a dataset may be accessed locally to extract data to generate a query result. At 2310, a determination is made as to whether a transformed link identifier is available when, for example, an identified dataset (or a portion thereof) may not be stored locally. In some cases, a query may be formed to federate over one or more remote endpoints (e.g., multiple remote endpoints). If a transformed link identifier is available at 2310, then implicit query federation may be performed in a query at 2312. In some examples, an implicitly federated query may include using a localized dataset identifier (e.g., in a local namespace) that may reference another dataset identifier in a global namespace for an external data source. At 2316, a transformed link identifier may be determined, through which a related other dataset identifier in a global namespace may be determined for accessing a remotely-stored dataset. At 2318, another dataset identifier (e.g., in a global namespace) may be retrieved as a path identifier (e.g., a URL to an external data source). In an event that a transformed link identifier may not be available at 2310, an explicitly federated query may be performed at 2314. In some examples, an explicitly federated query may include a dataset identifier in a global namespace (e.g., non-local), whereby the non-localized dataset identifier may be retrieved as a path identifier at 2318.

At 2330, a service graph call may be generated to access a remotely-store data source via a path identifier. In some examples, service graph call may be initiated in a graph-related query language command. An example of such a command may be written in SPARQL, or a variant thereof, and needs no manual intervention to initiate. At 2322, a remote dataset may be accessed to, for example, extract the data. At 2326, data may be retrieved from the remotely-stored dataset, and a query may be executed or performed upon the retrieved data at 2328.

Figure 24:
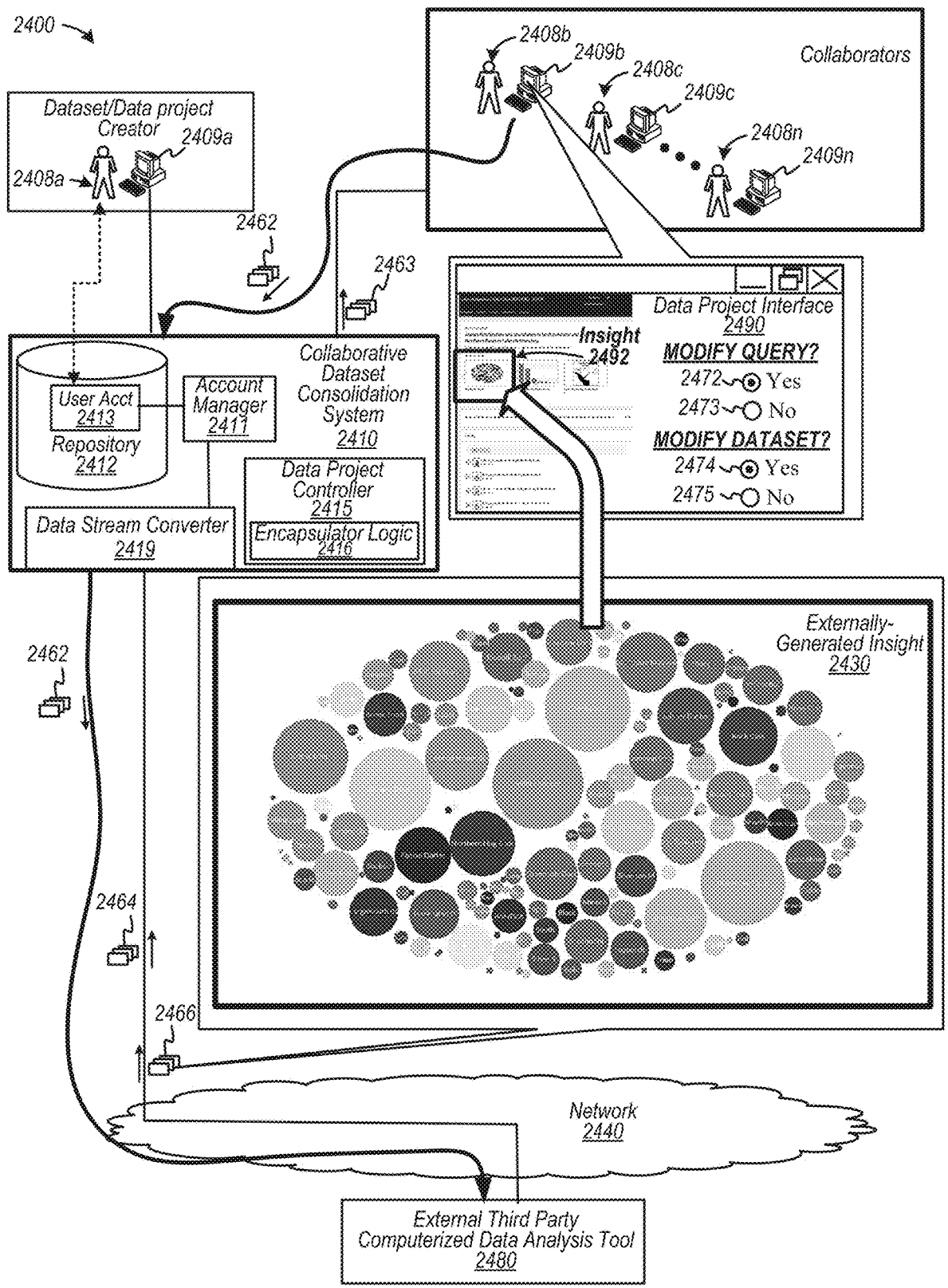
FIG. 24 is a diagram depicting a collaborative dataset consolidation system including a data stream converter to facilitate exchange of data with an external third-party computerized data analysis tool, according to some examples.

FIG. 24 is a diagram depicting a collaborative dataset consolidation system including a data stream converter to facilitate exchange of data with an external third-party computerized data analysis tool, according to some examples. Diagram 2400 depicts a collaborative dataset consolidation system 2410 including a data repository 2412, which includes user account data 2413 associated with either a user 2408a or a computing device 2409a, or both. User account data 2413 may identify user 2408a and/or computing device 2409a as creators, or "owners," of a dataset or data project accessible by a number of collaborative users 2408b to 2408n and a number of collaborative computing devices 2409b to 2409n, any of which may be granted access via an account manager 2411 (based on user account data 2413) to access a dataset, create a modified dataset based on the dataset, create an insight (e.g., visualization), and perform other data operations, or the like, depending on permission data. Collaborative dataset consolidation system 2410 may also include a data project controller 2415 including encapsulator logic 2416, and a data stream converter 2419. One or more elements depicted in diagram 2400 of FIG. 24 may include structures and/or functions as similarly-named or similarly-numbered elements depicted in other drawings, or as otherwise described herein, in accordance with one or more examples.

According to some examples, a data stream converter 2419 may be configured to invoke or implement an applications programming interface, or API, a connectors (or a web data connector), and/or integration applications (e.g., one or more APIs and one or more data connectors) to access via a network 2440 an external third-party computerized data analysis tools 2480. Data stream converter 2419 may be configured to convert data locally for implementation remotely to perform one or more data operations, such as, for example, generating an externally-generated insight 2430, which can be transmitted back into collaborative dataset consolidation system 2410. According to various examples, data stream converter 2419 may include structures and/or functionalities configured to implement an applications programming interface (e.g., an API), a data network link connector (e.g., a connector, such as a web data connector), or an integration application including one or more APIs and/or one or more connectors. A web connector implemented as data stream converter 2419 may, for example, include HTML code to couple a user interface 2490 with an external computing device to execute programmable instructions (e.g., JavaScript code). Execution of the programmable instructions may cause exchange of data between collaborative dataset consolidation system 2410 and external third-party computerized data analysis tool 2480. Note that data project interface 2490 includes user inputs 2472 and 2473 to activate formation of a modified query, and also includes user inputs 2474 and 2475 to activate modification of the dataset, for example, via an external third-party computerized data analysis tool 2480 via permissions granted in user account data 2413.

Examples of external third-party computerized data analysis tools 2480 include third-party visualization applications, programming languages, query tools, data manipulation tools, and the like. An example of data stream converter 2419 includes data configured to facilitate a web connector, which may be configured to electronically couple a collaborative dataset consolidation system 2410 and an external third-party computerized data analysis tool 2480, such as Tableau® analytic software provided by Tableau Software, Inc., Seattle, Wash., U.S.A. Another example of data stream converter 2419 includes a data connector configured to access a Power BI Desktop™ application, which is provided by Microsoft, Inc. of Seattle Wash. Yet another example of data stream converter 2419 includes, for example, implementing an API as a data connector (e.g., via an API token, among other data) to perform external queries, create charts externally, and publish insights externally, as well as internal to collaborative dataset consolidation system 2410. Examples of programming languages to perform external statistical and data analysis include "R," which is maintained and controlled by "The R Foundation for Statistical Computing" at www(dot)r-project(dot)org, as well as other like languages or packages, including applications that may be integrated with R (e.g., such as MATLAB™, Mathematica™, etc.).

Or, other applications, such as Python programming applications, MATLAB™, may be used to perform further analysis remotely, including visualization or other queries and data manipulation. For example, a query or query results generated at collaborative dataset consolidation system 2410 may be transmitted to external third-party computerized data analysis tool 2480 to perform a query externally, such as in Python, whereby query results may be imported back into collaborative dataset consolidation system 2410 as well as ancillary data used remotely. The ancillary data may be used by other collaborators to facilitate at least replicate query results without, for example, requiring direct access or authorization to access external third-party computerized data analysis tool 2480. Rather, access by a collaborator may be via user account data 2413 associated with computing device 2409a, which created a dataset or data project.

Data project controller 2415 is shown to include encapsulator logic 2416 that may be configured to encapsulate or otherwise include executable instructions to accompany data operations at external third-party computerized data analysis tool 2480. The encapsulated executable instructions may be configured to execute instructions ancillary to analysis (i.e., co-analysis), at a specific external third-party computerized data analysis tool 2480. Performance of co-analysis executable instructions is configured to capture or record ancillary data used to perform an external operation. An example of ancillary data may include a script or other instructions for creating a visualization, or a query written in a particular query programming language. Such ancillary data may be implemented as "co-analysis" executable instructions that may be executed remotely, but substantially contemporaneous to performance of an external data operation. In some examples, encapsulator logic 2416 may generate co-analysis executable instructions to accompany a request to perform an external data operation at external third-party computerized data analysis tool 2480. Responsive to execution of co-analysis executable instructions at external third-party computerized data analysis tool 2480, ancillary data (e.g., a written query performed externally) may be transmitted back to collaborative dataset consolidation system 2410 to memorialize data activity performed at remote third-party analysis tool 2480 (e.g., a query) for replication in the future and/or by other collaborators, such as collaborative devices 2409b to 2409n, which may not have direct access to data analysis tool 2480.

To continue with the example shown in FIG. 24, consider that user 2408a may perform a query via computing device 2409a at collaborative dataset consolidation system 2410, which may generate a notification 2463 via an interactive collaborative activity feed, whereby any of a number of collaborative users 2408b to 2408n and any of a number of collaborative computing devices 2409b to 2409n may receive a notification that newly-formed query results are available via activity feed data 2463. As such, a qualified collaborator, such as computing device 2409b, may generate a request via a data project interface 2490 to access a dataset or a data project responsive to receiving the notification of the newly-formed query results. In some examples, either collaborative user 2408b or collaborative computing device 2409b may be configured to access external third-party computerized data analysis tool 2480 to review, modify, query, or generate an insight via user account data 2413, which may be associated with the data project or dataset originating with a particular project objective. In some examples, either collaborative user 2408b or collaborative computing device 2409b need not have credentials, and need not be authorized to access external third-party computerized data analysis tool 2480. However, either collaborative user 2408b or collaborative computing device 2409b may access external third-party computerized data analysis tool 2480 via authorized user account data 2413 via account manager 2411 to generate, for example, a modified insight, such as at that shown as externally-generated insight 2430, or to perform any other data operation.

For example, either collaborative user 2408b or collaborative computing device 2409b may generate a request 2462 to access a dataset or data project associated with either user 2408a or computing device 2409a. As either collaborative user 2408b or collaborative computing device 2409b is an authorized collaborator, data representing request 2462 may be applied to external third-party computerized data analysis tool 2480 as a function of user account data 2413 permissions. Note that co-analysis executable instructions may accompany request 2462 for generating ancillary data at a remote computing device for transmission back into collaborative dataset consolidation system 2410. Responsive to request 2462, external third-party computerized data analysis tool 2480 may generate an insight, which may be transmitted back to collaborative data consolidation system 2410 as data 2466. Data 2466 includes data configured to provide an externally-generated insight visualization 2430. Also accompanying data 2466 is ancillary data 2464, which may include supplemental data to replicate queries and/or externally-generated insight 2430 to confirm accuracy and reliability of data analysis or insights derived therefrom, but at collaborative dataset consolidation system 2410. Furthermore, externally-generated insight 2430 may be published as an insight 2492 in a data project interface 2490, thereby providing a conclusion or interim conclusion regarding a project objective and analysis of data in view of that project objective.

Figure 25:
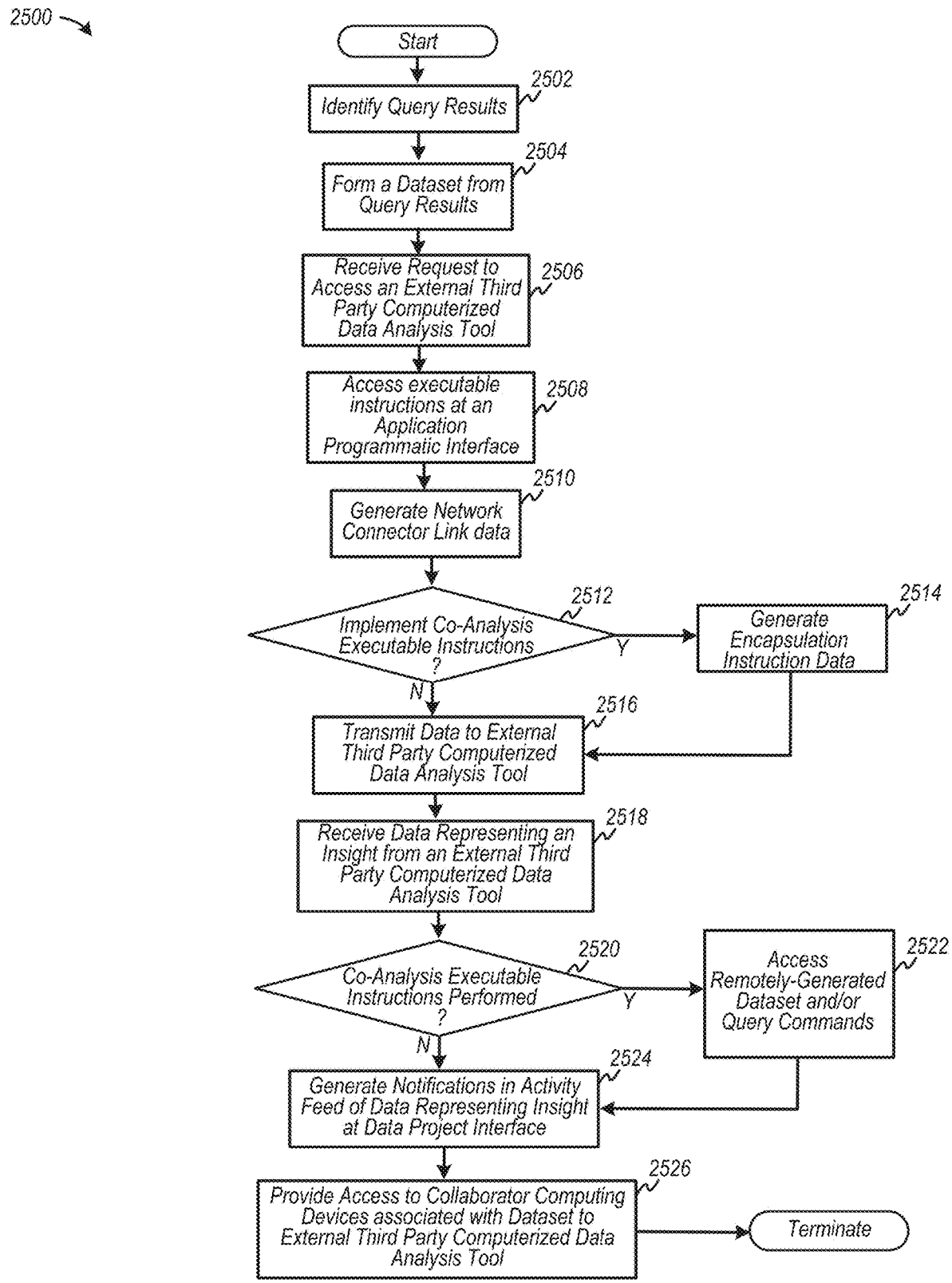
FIG. 25 is a flow diagram configured to access via a data stream converter an external third-party computerized data analysis tool to supplement functionality of a collaborative dataset consolidation system, according to some examples.

FIG. 25 is a flow diagram configured to access via a data stream converter an external third-party computerized data analysis tool to supplement functionality of a collaborative dataset consolidation system, according to some examples. In one example, flow 2500 begins at 2502, whereby query results may be identified for particular query. Optionally, some examples of other data operation results may also be identified at 2502, for further processing at an external application such as a third-party computerized data analysis tool. In one example, a new dataset may be formed optionally from a query result generated by a query at 2504. At 2506, a request to access an external third-party computerized data analysis tool may be received. Note that such a request may originate at any creator or owner of a dataset or data project, or any other collaborative user or computing device associated therewith. At 2508, executable instructions may be accessed to perform, for example, an application programming interface ("API") or a web data connector, or a combination thereof, at least according to some examples. At 2510, network connector data may be generated to facilitate data exchange between a collaborative dataset consolidation system and an external third-party data analysis tool.

At 2512, a determination is made as to whether to implement co-analysis executable instructions with which to transmit to an external third-party computerized data analysis tool for execution to provide ancillary data back to the collaborative dataset consolidation system. If co-analysis executable instructions are to be included, encapsulation data is generated to include the co-analysis executable instructions at 2514. The encapsulated data including co-analysis executable instructions may be transmitted along with a data operation request to the external third-party computerized data analysis tool. At 2516, a request to perform an external data operation and/or encapsulated instruction data may be transmitted to an external third-party computerized data analysis tool. At 2518, data representing an insight may be received from the external third-party computerized data analysis tool, responsive to performing an external data operation.

At 2520, a determination is made as to whether co-analysis executable instructions have been executed to perform a particular function externally. If so, a remotely-generated dataset and/or implemented query commands may be accessed at 2522 for further analysis or to memorialize for subsequent analysis and review. At 2524, notifications may be generated for dissemination in an interactive collaborative activity feed, whereby data representing newly-formed insights for a data project may be made available via a data project interface, according to some examples. At 2526, access may be provided to any other collaborative computing device associated with a dataset or data project to access an external third-party computerized data analysis tool for further analyses, insight generation, data review, and any other data operation, via user data access facilitated by a creator or owner of a dataset or a data project, in at least some examples.

Figure 26:
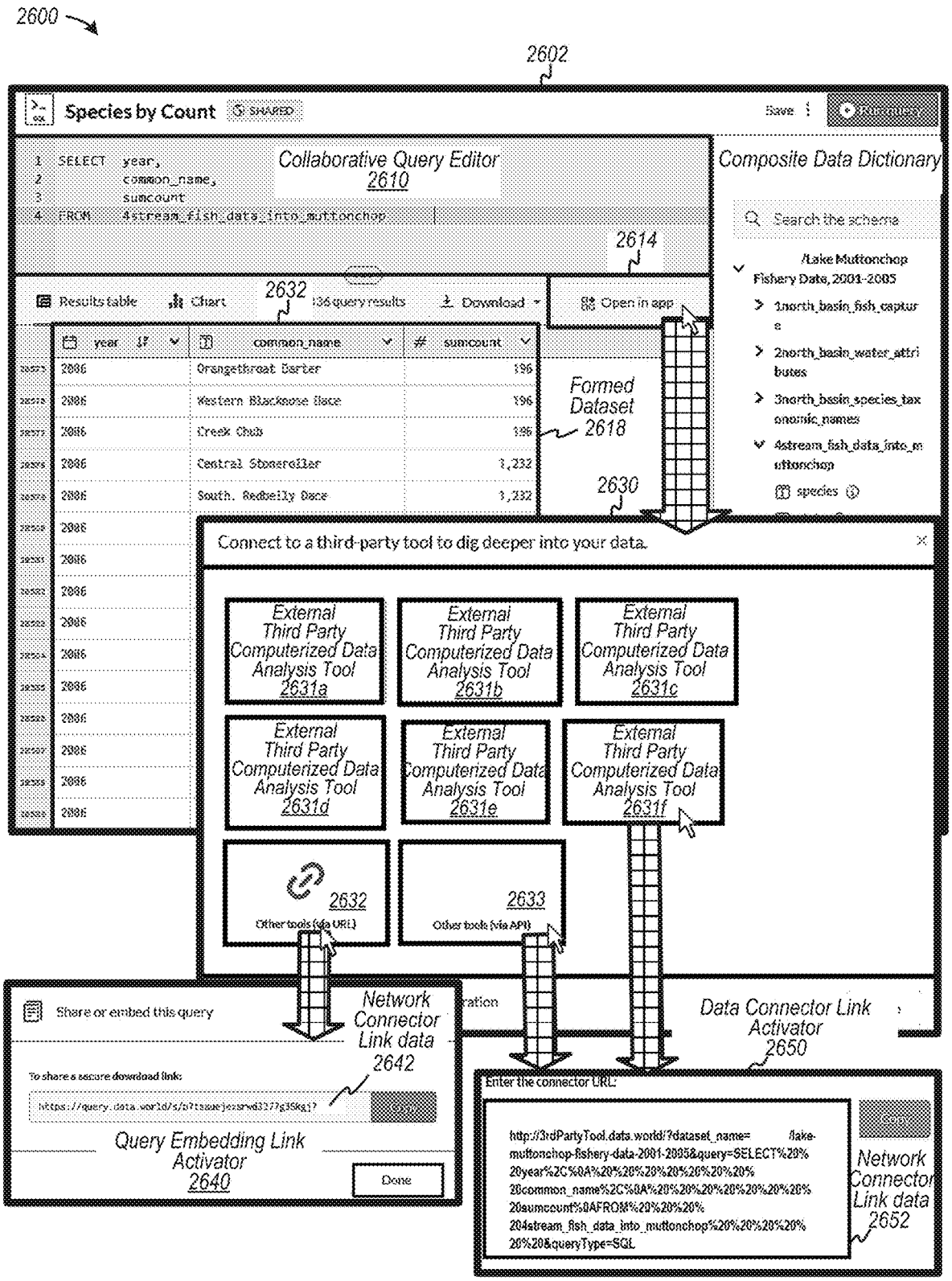
FIG. 26 is a diagram depicting a portion of a data project interface configured to implement user inputs to access external third-party computerized data analysis tools, according to some examples.

FIG. 26 is a diagram depicting a portion of a data project interface configured to implement user inputs to access external third-party computerized data analysis tools, according to some examples. Diagram 2600 depicts a data project interface portion 2602 including a query entered into a collaborative query editor 2610, when executed provides for query results 2632 in a tabular form, which may be formed to generate a newly-formed datasets 2618. Responsive to activation of user input 2614, a data project controller (not shown) may be configured to facilitate access to an API or web data connector via, for example, interface portion 2630. In the example shown, interface portion 2630 includes a number of user inputs 2631a to 2631f to a unique external third-party computerized data analysis tool for further data analysis and insight generation external to a collaborative dataset consolidation system, according to some examples.

In one example, a user interface 2632 may be configured to receive a request to generate access via an API using a URL to an external application. Responsive to activation of user input 2632, network connector link data 2642 (e.g., a URL directed to a location in a collaborative dataset consolidation system) may be generated for access in a query embedding link activator 2640 interface portion. Network connector link data 2642 may be used via an API to exchange data with an external third-party computerized data analysis tool, at least in some examples. In another example, either a user input for an external third-party computerized data analysis tool (e.g., 26310 or user input 2633 may be selected to generate a data connector link activator 2650 interface portion, which may include a URL as a network connector link data 2652. Network connector link data 2652 may be included as an input into an external third-party computerized data and analysis tool, at least in some examples, to facilitate an exchange of data to provide external data operations, such as querying, insight generation, insight publication, and any other data or operation.

Figure 27:
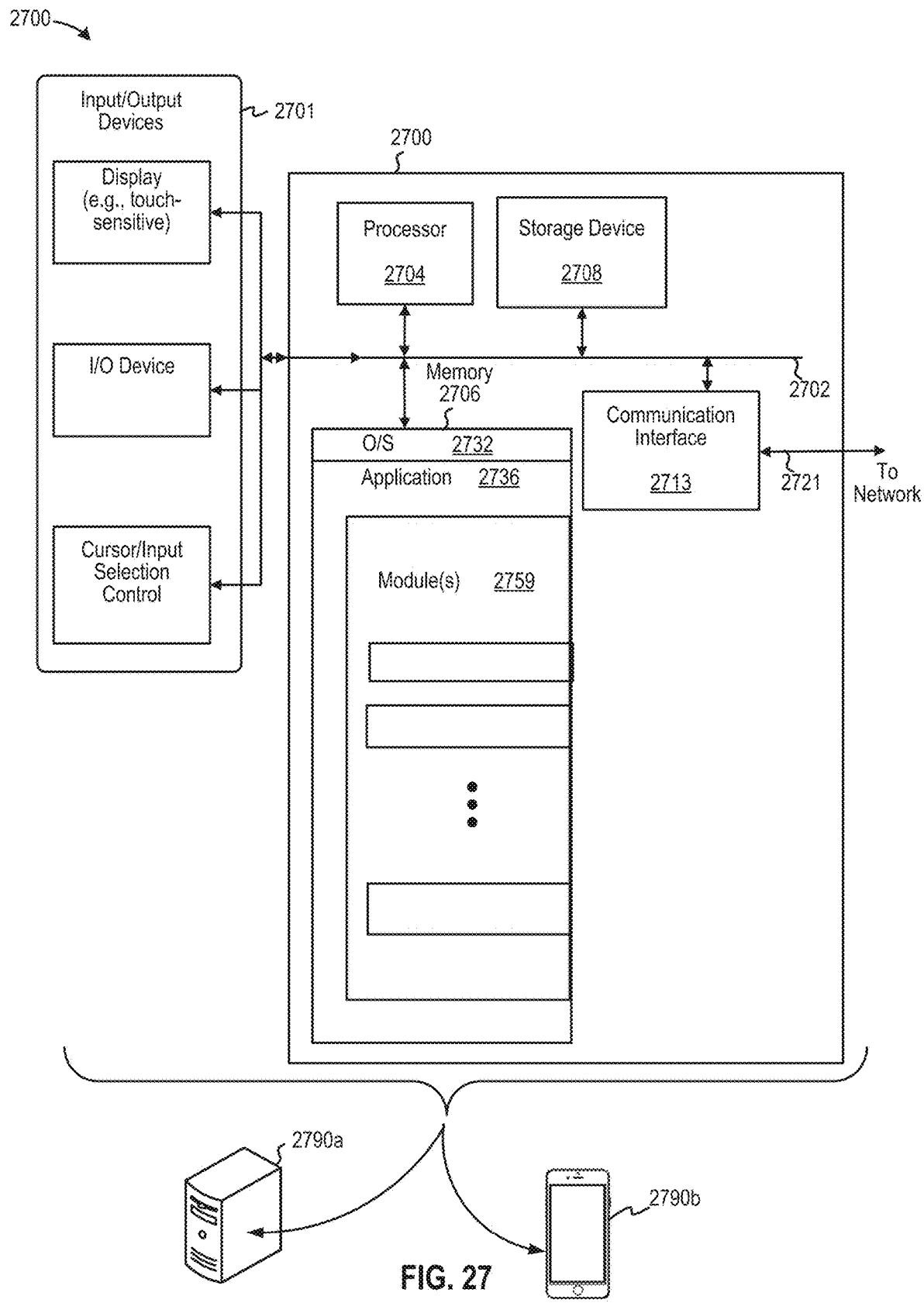
FIG. 27 illustrates examples of various computing platforms configured to provide various functionalities to any of one or more components of a collaborative dataset consolidation system, according to various embodiments.

FIG. 27 illustrates examples of various computing platforms configured to provide various functionalities to any of one or more components of a collaborative dataset consolidation system, according to various embodiments. In some examples, computing platform 2700 may be used to implement computer programs, applications, methods, processes, algorithms, or other software, as well as any hardware implementation thereof, to perform the above-described techniques.

In some cases, computing platform 2700 or any portion (e.g., any structural or functional portion) can be disposed in any device, such as a computing device 2790a, mobile computing device 2790b, and/or a processing circuit in association with initiating the formation of collaborative datasets, as well as analyzing datasets via user interfaces and user interface elements, according to various examples described herein.

Computing platform 2700 includes a bus 2702 or other communication mechanism for communicating information, which interconnects subsystems and devices, such as processor 2704, system memory 2706 (e.g., RAM, etc.), storage device 2708 (e.g., ROM, etc.), an in-memory cache (which may be implemented in RAM 2706 or other portions of computing platform 2700), a communication interface 2713 (e.g., an Ethernet or wireless controller, a Bluetooth controller, NFC logic, etc.) to facilitate communications via a port on communication link 2721 to communicate, for example, with a computing device, including mobile computing and/or communication devices with processors, including database devices (e.g., storage devices configured to store atomized datasets, including, but not limited to triplestores, etc.). Processor 2704 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 2700 exchanges data representing inputs and outputs via input-and-output devices 2701, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 2701 may be implemented as, or otherwise substituted with, a user interface in a computing device associated with a user account identifier in accordance with the various examples described herein.

According to some examples, computing platform 2700 performs specific operations by processor 2704 executing one or more sequences of one or more instructions stored in system memory 2706, and computing platform 2700 can be implemented in a client-server arrangement, peer-to-peer arrangement, or as any mobile computing device, including smart phones and the like. Such instructions or data may be read into system memory 2706 from another computer readable medium, such as storage device 2708. In some examples, hard-wired circuitry may be used in place of or in combination with software instructions for implementation. Instructions may be embedded in software or firmware. The term "computer readable medium" refers to any tangible medium that participates in providing instructions to processor 2704 for execution. Such a medium may take many forms, including but not limited to, non-volatile media and volatile media. Non-volatile media includes, for example, optical or magnetic disks and the like. Volatile media includes dynamic memory, such as system memory 2706.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 2702 for transmitting a computer data signal.

In some examples, execution of the sequences of instructions may be performed by computing platform 2700. According to some examples, computing platform 2700 can be coupled by communication link 2721 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 2700 may transmit and receive messages, data, and instructions, including program code (e.g., application code) through communication link 2721 and communication interface 2713. Received program code may be executed by processor 2704 as it is received, and/or stored in memory 2706 or other non-volatile storage for later execution.

In the example shown, system memory 2706 can include various modules that include executable instructions to implement functionalities described herein. System memory 2706 may include an operating system ("O/S") 2732, as well as an application 2736 and/or logic module(s) 2759. In the example shown in FIG. 27, system memory 2706 may include any number of modules 2759, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 2759 of FIG. 27, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 2759 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 2759 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 2759 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
  receiving a request to generate data identifying a data project, the request also importing the data using a link coupled to a source of the data, the data being persistently remote from the data project;
accessing a graph data arrangement associated with the data project, the graph data arrangement being an aggregated dataset including multiple linked datasets;
identifying a subset of data in the graph data arrangement data representing a subset of insights derived from one or more queries applied against the subset of data in the graph data arrangement;
generating at a data project controller data representing a data project user interface to present at a computing device, the data project user interface including a collaborative query editor to receive a query;
generating query results based on execution of the query; and
receiving a request to access an external third-party computerized data analysis tool to perform an action.

2. The method of claim 1 further comprising:
receiving a command to publish an insight as the action;
integrating the insight into the subset of insights to form an updated subset of insights; and
publishing the updated subset of insights.

3. The method of claim 1 wherein identifying the subset of data in the graph data arrangement data comprising:
identifying data representing the one or more queries are formed in collaboration with a plurality of computing devices, each computing device associated with a different user account having access to a collaborative dataset consolidation system.

4. The method of claim 1 wherein accessing the graph data arrangement comprises:
identifying the graph data arrangement associated with a first user account;
determining a second user account is authorized to access the graph data arrangement; and
facilitating formation of the query based on data originating in association with the second user account.

5. The method of claim 1 wherein generating the data representing the data project user interface further comprising:
causing presentation of the collaborative query editor in a user interface including a contextual interface portion and a workspace interface portion.

6. The method of claim 5 further comprising:
presenting the query results in the workspace interface portion.

7. The method of claim 5 further comprising:
receiving a request to import a dataset to include in a subset of datasets associated the first user account;
ingesting the dataset to generate an atomized dataset having data linked to a tabular data arrangement; and
presenting the tabular data arrangement in the workspace interface portion.

8. The method of claim 7 further comprising:
maintaining presentation of the contextual interface portion.

9. The method of claim 7 further comprising:
generating data to present the tabular data arrangement in the same interface as one or more of the query editor and the query results.

10. The method of claim 1 wherein receiving the request to access the external third-party computerized data analysis tool further comprises:
executing instructions of an application programming interface to exchange data via a network with a remote computing device configured to execute an application to implement the external third-party computerized data analysis tool.

11. The method of claim 1 wherein receiving the request to access the external third-party computerized data analysis tool further comprises:
generate data to form a network connector link with which the external third-party computerized data analysis tool implements to access one or more of the query results and the subset of data in the graph data arrangement.

12. The method of claim 11 further comprising:
generating encapsulated instruction data configured to execute at the external third-party computerized data analysis tool; and
transmitting the one or more of the query results, the subset of data in the graph data arrangement, and the encapsulated instruction data to the external third-party computerized data analysis tool.

13. The method of claim 1 further comprising:
receiving data representing one or more of an external query result and the insight; and
receiving external data implemented to form the external query result and the insight at the external third-party computerized data analysis tool.

14. The method of claim 13 wherein receiving the external data comprises:
receiving other query commands executed at the external third-party computerized data analysis tool to form the external query result and the insight.

15. The method of claim 13 further comprising:
providing access to one or more of the external query result and the insight via a first user account to a computing device associated with a second user account.

16. The method of claim 1 wherein the aggregated dataset including the multiple linked datasets comprises an atomized dataset that includes linked data points comprising triples formatted to comply with a Resource Description Framework ("RDF") data model.

17. An apparatus comprising:
a memory including executable instructions; and
a processor, responsive to executing the instructions, is configured to:
receive a request to generate data identifying a data project, the request also being configured to import the data using a link coupled to a source of the data, the data being persistently remote from the data project;
access a graph data arrangement associated with the data project, the graph data arrangement being an aggregated dataset including multiple linked datasets;
identify a subset of data in the graph data arrangement data representing a subset of insights derived from one or more queries applied against the subset of data in the graph data arrangement;
generate at a data project controller data representing a data project user interface to present at a computing device, the data project user interface including a collaborative query editor to receive a query;
generate query results based on execution of the query; and
receive a request to access an external third-party computerized data analysis tool to perform an action.

18. The apparatus of claim 17 wherein the processor is further configured to:
   receive a command to publish an insight as the action;
   integrate the insight into the subset of insights to form an updated subset of insights; and
   publish the updated subset of insights.

19. The apparatus of claim 17 wherein a subset of the instructions to cause the processor to identify the subset of data in the graph data arrangement data further causes the processor to:
   identify data representing the one or more queries are formed in collaboration with a plurality of computing devices, each computing device associated with a different user account having access to a collaborative dataset consolidation system.

20. The apparatus of claim 17 wherein the processor is further configured to:
   access data representing a aggregated dataset including the multiple linked datasets comprises an atomized dataset that includes linked data points comprising triples formatted to comply with a Resource Description Framework ("RDF") data model.

\* \* \* \* \*